US009355552B2

(12) United States Patent
Murphy, Jr. et al.

(10) Patent No.: US 9,355,552 B2
(45) Date of Patent: May 31, 2016

(54) ELECTRONIC BUILDING INFORMATION (EBIC) SYSTEM

(71) Applicant: EBIC Preparedness Solutions, LLC, Leonia, NJ (US)

(72) Inventors: John J. Murphy, Jr., Leonia, NJ (US); Walter Greenberg, Alpharetta, GA (US)

(73) Assignees: John J. Murphy, Jr., Leonia, NJ (US); Walter Greenberg, Alpharetta, GA (US)

( * ) Notice: Subject to any disclaimer, the term of this patent is extended or adjusted under 35 U.S.C. 154(b) by 0 days.

(21) Appl. No.: 14/277,906

(22) Filed: May 15, 2014

(65) Prior Publication Data

US 2015/0048953 A1 Feb. 19, 2015

Related U.S. Application Data

(60) Provisional application No. 61/823,153, filed on May 14, 2013.

(51) Int. Cl.
*G08B 25/14* (2006.01)
*B66B 5/02* (2006.01)
*G01C 21/20* (2006.01)
*H04W 4/04* (2009.01)

(52) U.S. Cl.
CPC ................ *G08B 25/14* (2013.01); *B66B 5/021* (2013.01); *B66B 5/024* (2013.01); *G01C 21/206* (2013.01); *H04W 4/043* (2013.01)

(58) Field of Classification Search
CPC .................. B66B 5/021–5/024; G01C 21/206; G01C 17/38; H04W 4/043; G08B 25/14
See application file for complete search history.

(56) References Cited

U.S. PATENT DOCUMENTS

| | | | | | |
|---|---|---|---|---|---|
| 5,979,607 | A * | 11/1999 | Allen | 187/390 |
| 6,000,505 | A * | 12/1999 | Allen | 187/391 |
| 8,209,205 | B1 * | 6/2012 | McElroy | G05B 19/418 700/100 |
| 2003/0171879 | A1 * | 9/2003 | Pittalwala | F17D 5/00 702/34 |
| 2004/0163325 | A1 * | 8/2004 | Parrini et al. | 52/1 |
| 2004/0243321 | A1 * | 12/2004 | Pittalwala | F17D 5/00 702/34 |
| 2007/0107371 | A1 * | 5/2007 | Plocher et al. | 52/745.05 |
| 2007/0158411 | A1 * | 7/2007 | Krieg | G06Q 10/10 235/380 |
| 2007/0171049 | A1 * | 7/2007 | Argasinski | 340/539.13 |
| 2007/0219645 | A1 * | 9/2007 | Thomas et al. | 700/29 |
| 2007/0257937 | A1 * | 11/2007 | Rye et al. | 345/617 |
| 2007/0272497 | A1 * | 11/2007 | Kawai | 187/393 |
| 2007/0278044 | A1 * | 12/2007 | Hikita et al. | 187/247 |
| 2008/0129484 | A1 * | 6/2008 | Dahl et al. | 340/501 |
| 2008/0196978 | A1 * | 8/2008 | Siikonen et al. | 187/384 |
| 2008/0302609 | A1 * | 12/2008 | Siikonen et al. | 187/247 |
| 2009/0038891 | A1 * | 2/2009 | Kawai | 187/247 |
| 2009/0038892 | A1 * | 2/2009 | Kawai et al. | 187/387 |
| 2009/0043504 | A1 * | 2/2009 | Bandyopadhyay et al. | 701/213 |
| 2009/0127030 | A1 * | 5/2009 | Hikita et al. | 187/387 |
| 2010/0200336 | A1 * | 8/2010 | Hikita et al. | 187/247 |

(Continued)

*Primary Examiner* — Hai Phan
*Assistant Examiner* — Orlando Bousono
(74) *Attorney, Agent, or Firm* — Cantor Colburn LLP

(57) ABSTRACT

The electronic Building Information Card (eBIC) system provides a systematic and comprehensive approach for building information maintenance to assist first responders and building owners in an emergency response. The eBIC solution is built to the essential elements for each building along with a cross vertical view of the building. This provides the first responder a quick size-up assessment, an easy to read graphic view format and further support emergency operations for each building.

15 Claims, 96 Drawing Sheets

(56) References Cited

U.S. PATENT DOCUMENTS

2010/0213011 A1* 8/2010 Hikita et al. .................. 187/247
2011/0108365 A1* 5/2011 Hikita et al. .................. 187/247
2011/0114424 A1* 5/2011 Manabe ........................ 187/384
2011/0120812 A1* 5/2011 Manabe ........................ 187/384
2011/0128159 A1* 6/2011 Hikita et al. ............... 340/815.4
2011/0270584 A1* 11/2011 Plocher et al. .................... 703/1
2012/0130632 A1* 5/2012 Bandyopadhyay et al. .. 701/446
2012/0260313 A1* 10/2012 Gomez ............................ 726/3
2013/0047120 A1* 2/2013 Albright ....................... 715/810
2013/0060729 A1* 3/2013 Massey ......................... 707/600
2013/0138342 A1* 5/2013 Zaid et al. ..................... 701/526
2013/0138471 A1* 5/2013 McElroy .............. G05B 19/418 705/7.26
2013/0166195 A1* 6/2013 Bandyopadhyay et al. .. 701/412
2013/0166202 A1* 6/2013 Bandyopadhyay et al. .. 701/501
2013/0205214 A1* 8/2013 Gazdzinski ................... 715/728
2013/0205257 A1* 8/2013 Albright ....................... 715/810
2013/0264074 A1* 10/2013 Lewis et al. ..................... 169/46
2013/0297060 A1* 11/2013 Sundling, Jr. ...... G06Q 10/0631 700/100
2014/0313984 A1* 10/2014 Diamond et al. ............. 370/329
2015/0019124 A1* 1/2015 Bandyopadhyay et al. .. 701/410

* cited by examiner

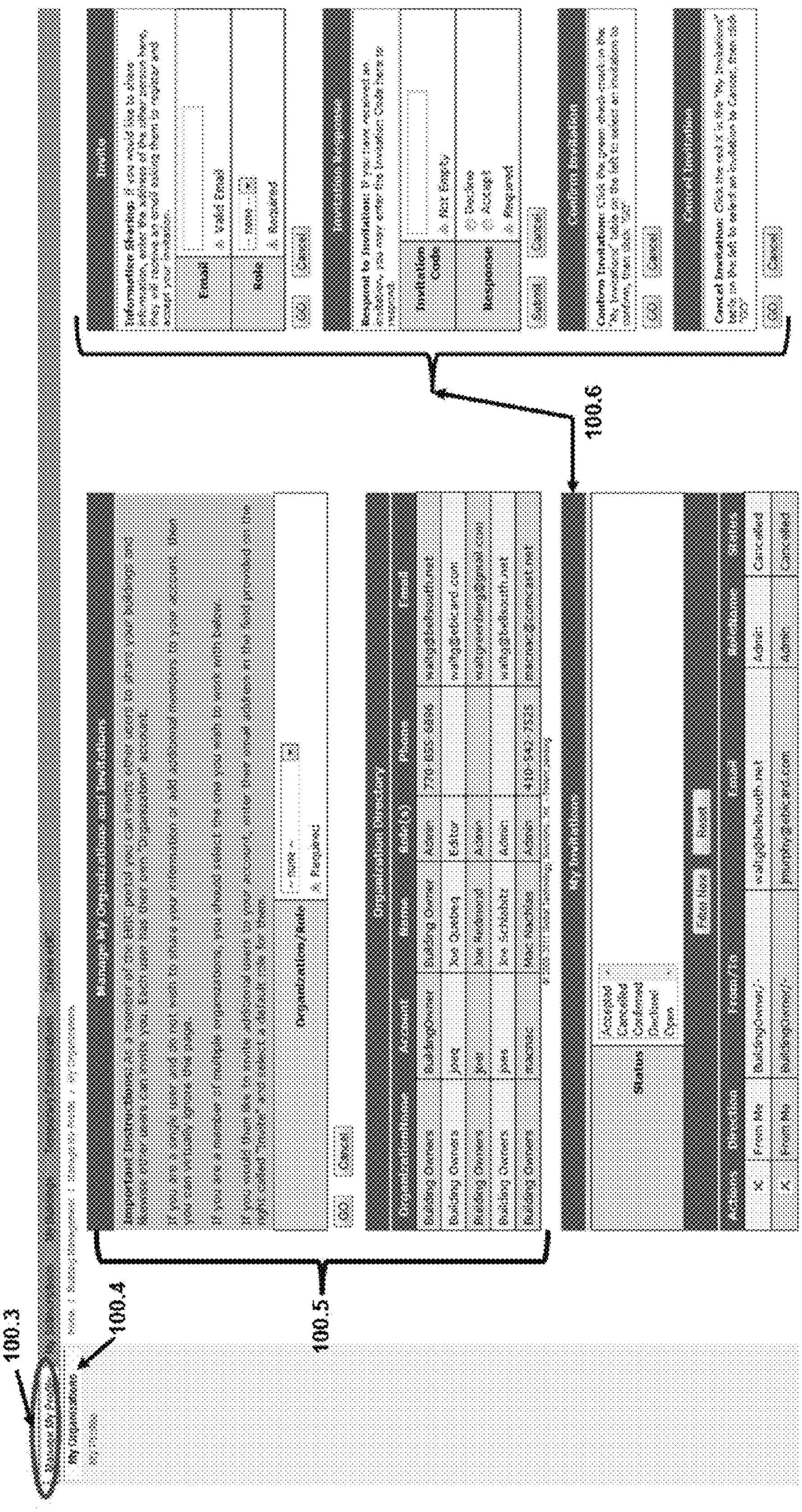
Figure 1 - A

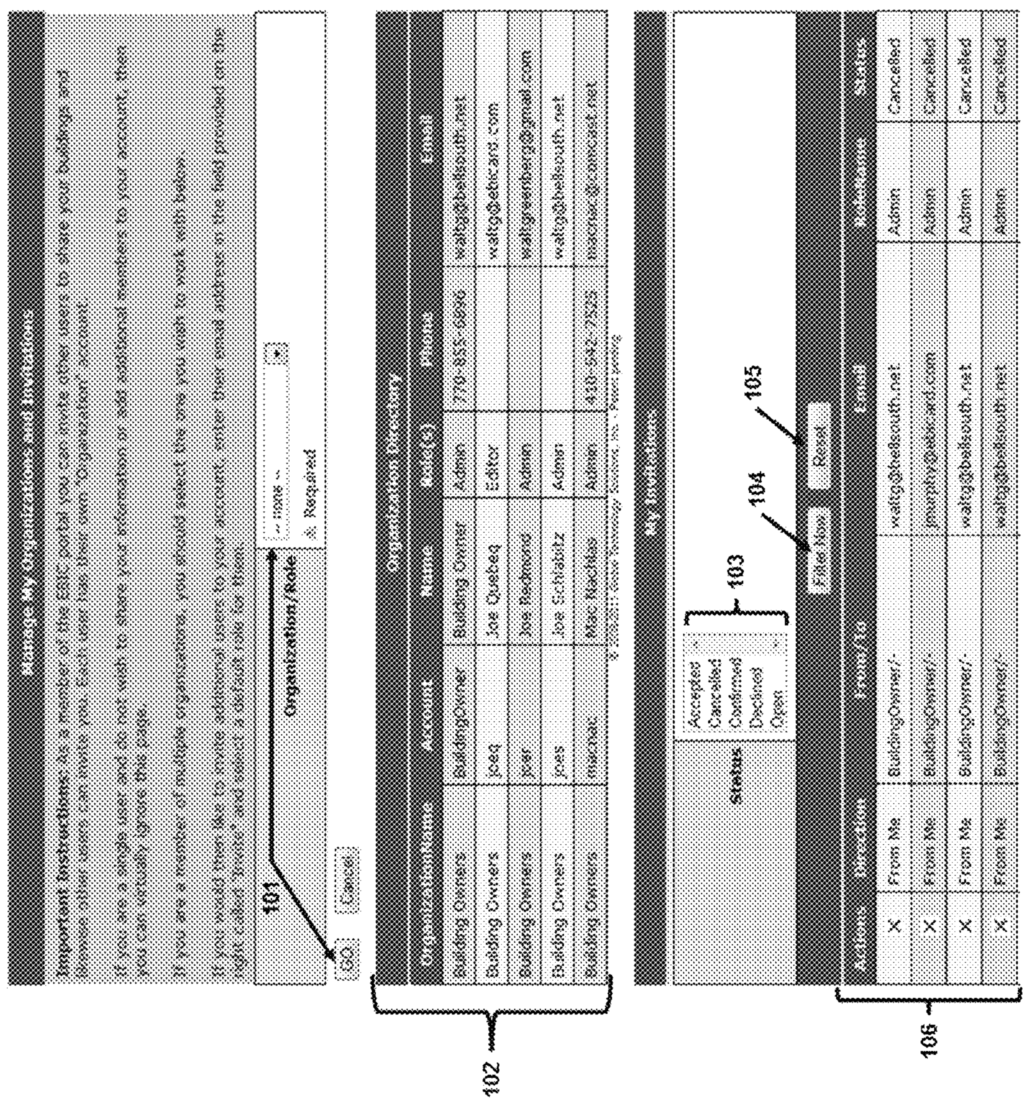
Figure 1 - B

Figure 1 - C
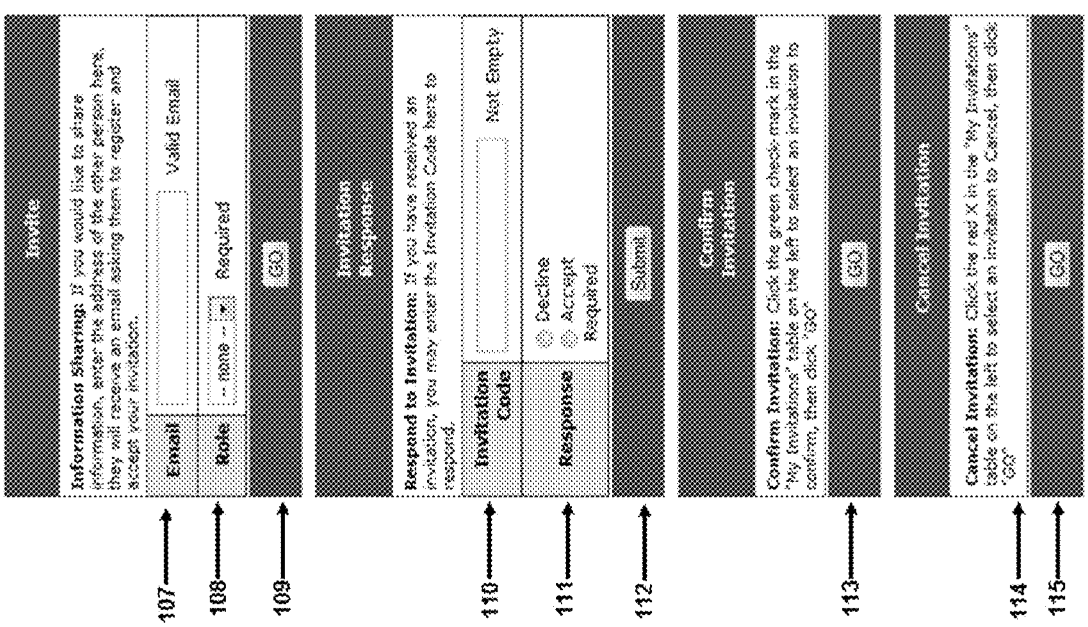

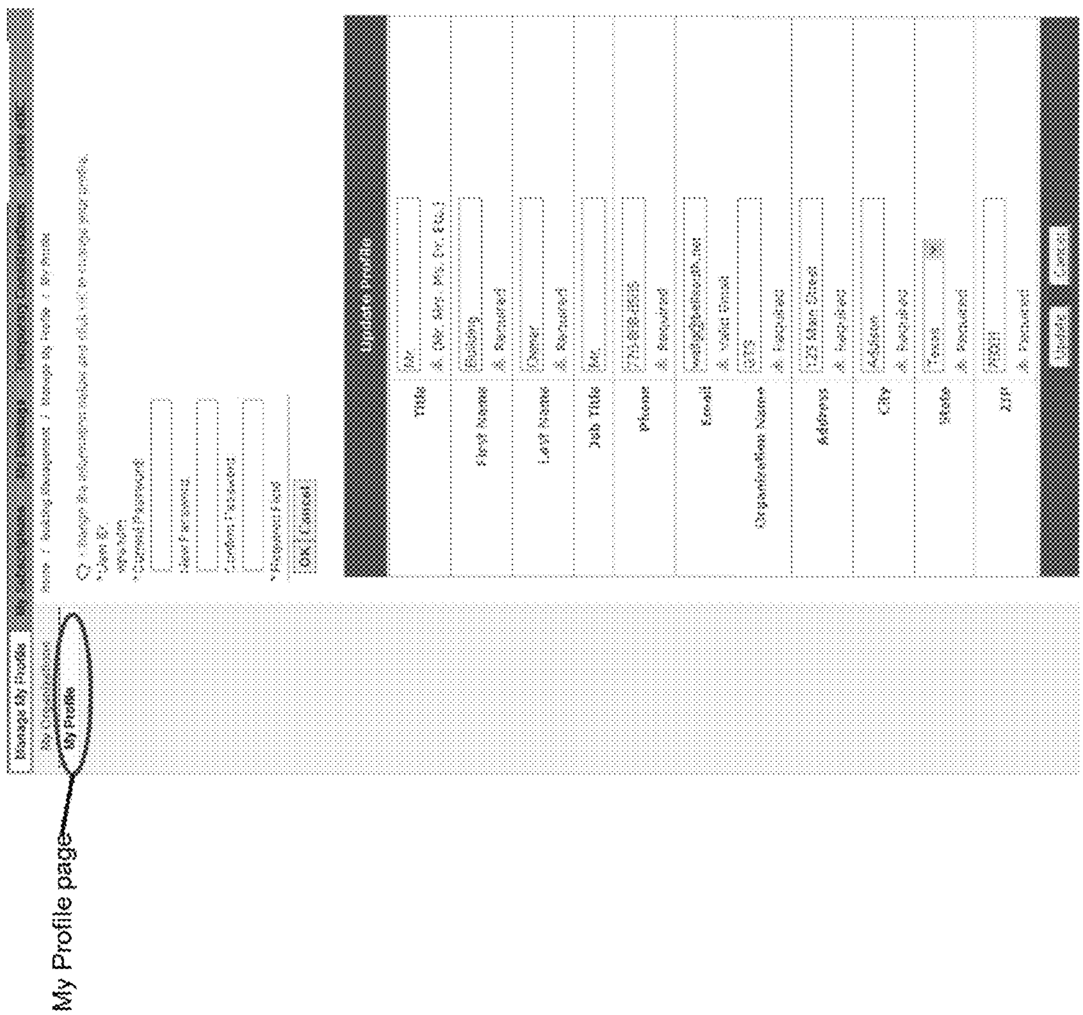
Figure 1 - D

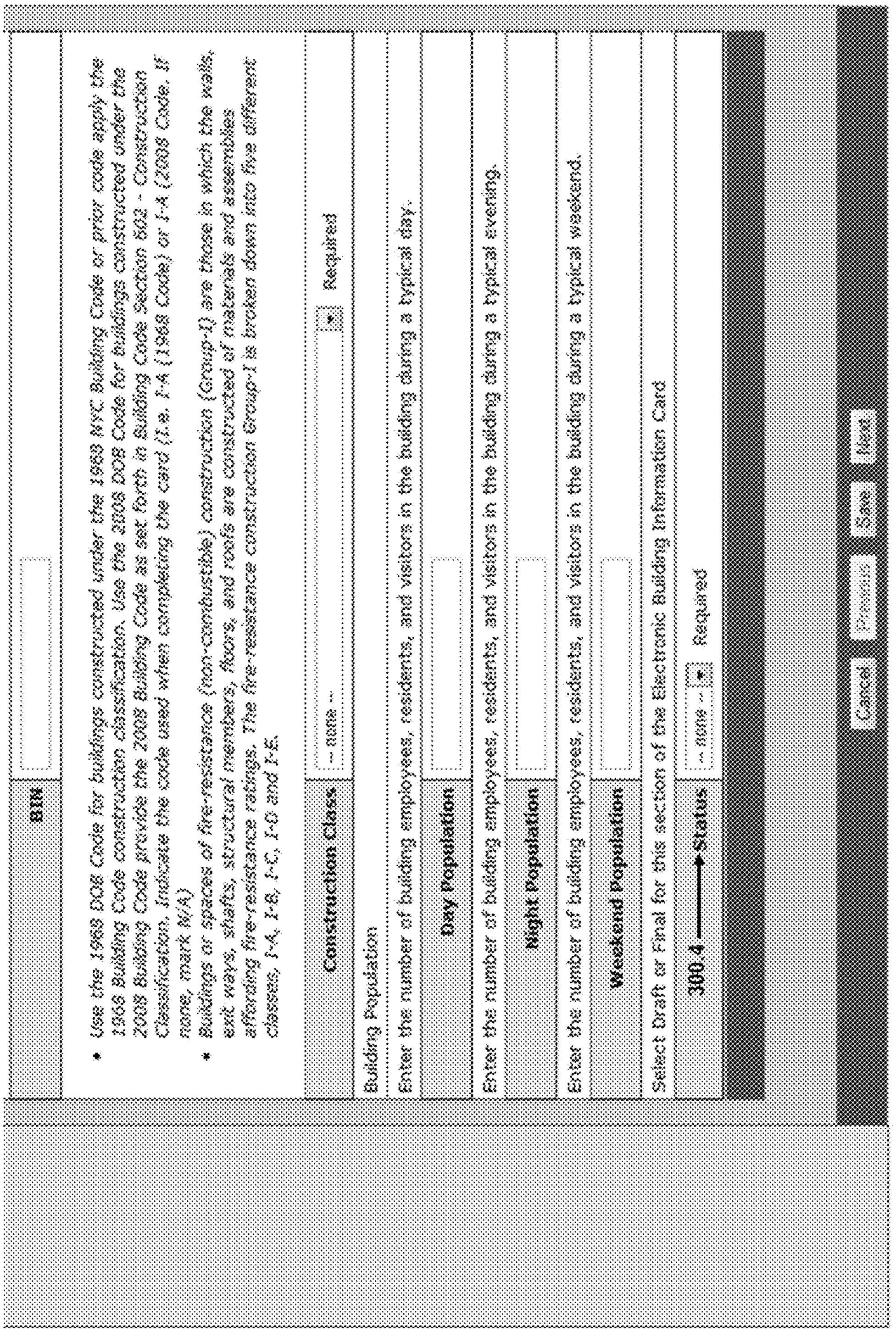
Figure 3 - A

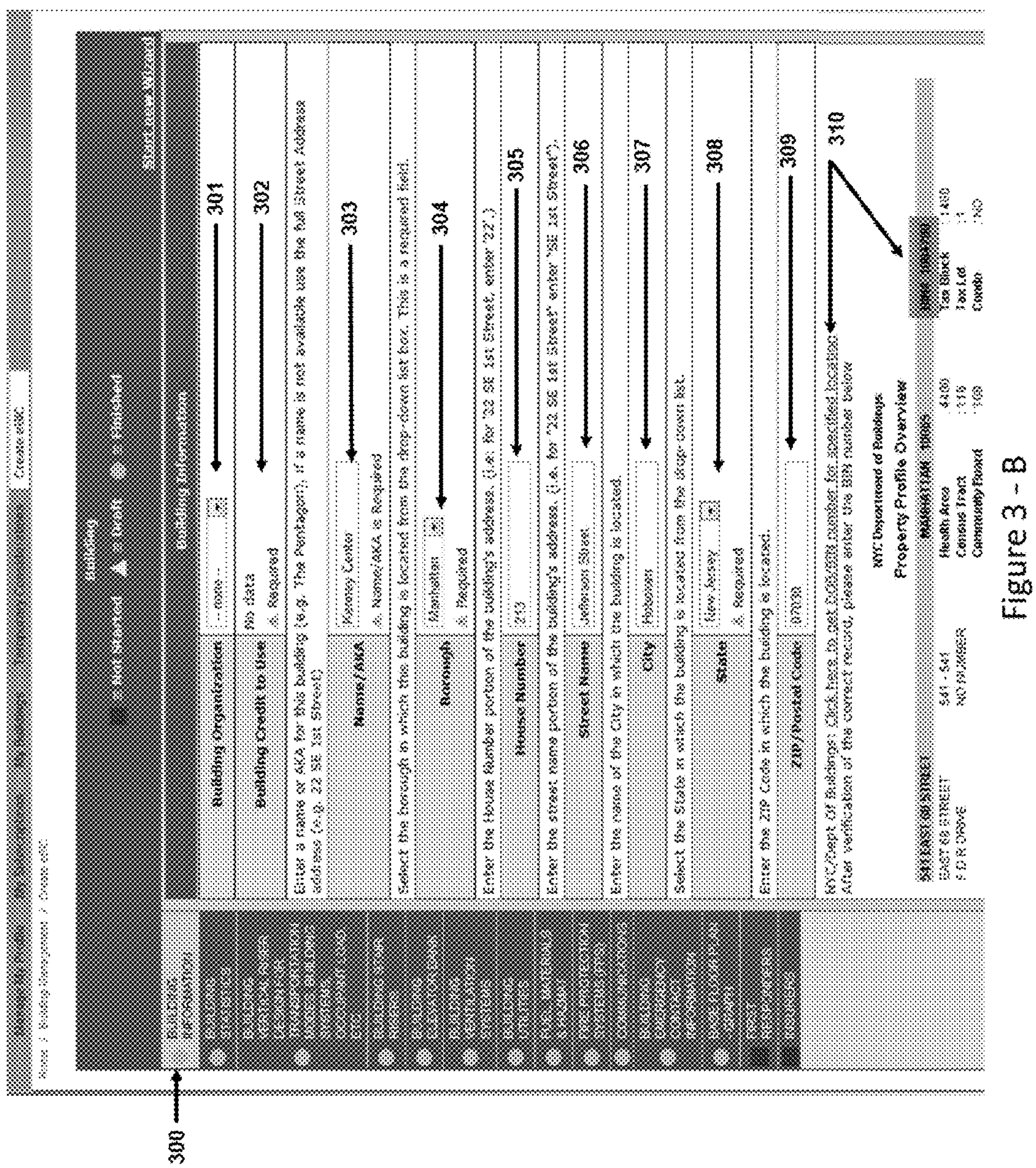
Figure 3 - B

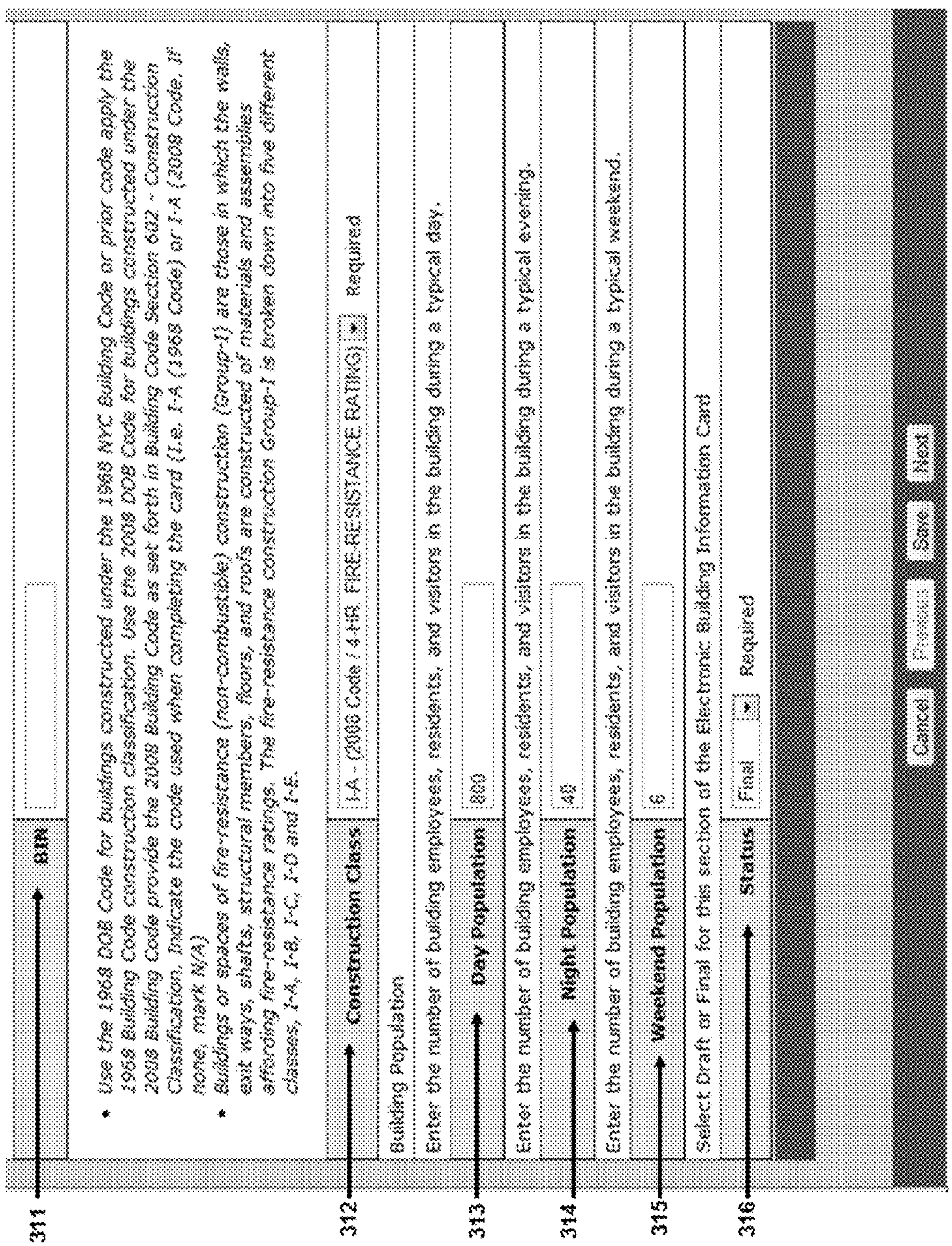
Figure 3 - C

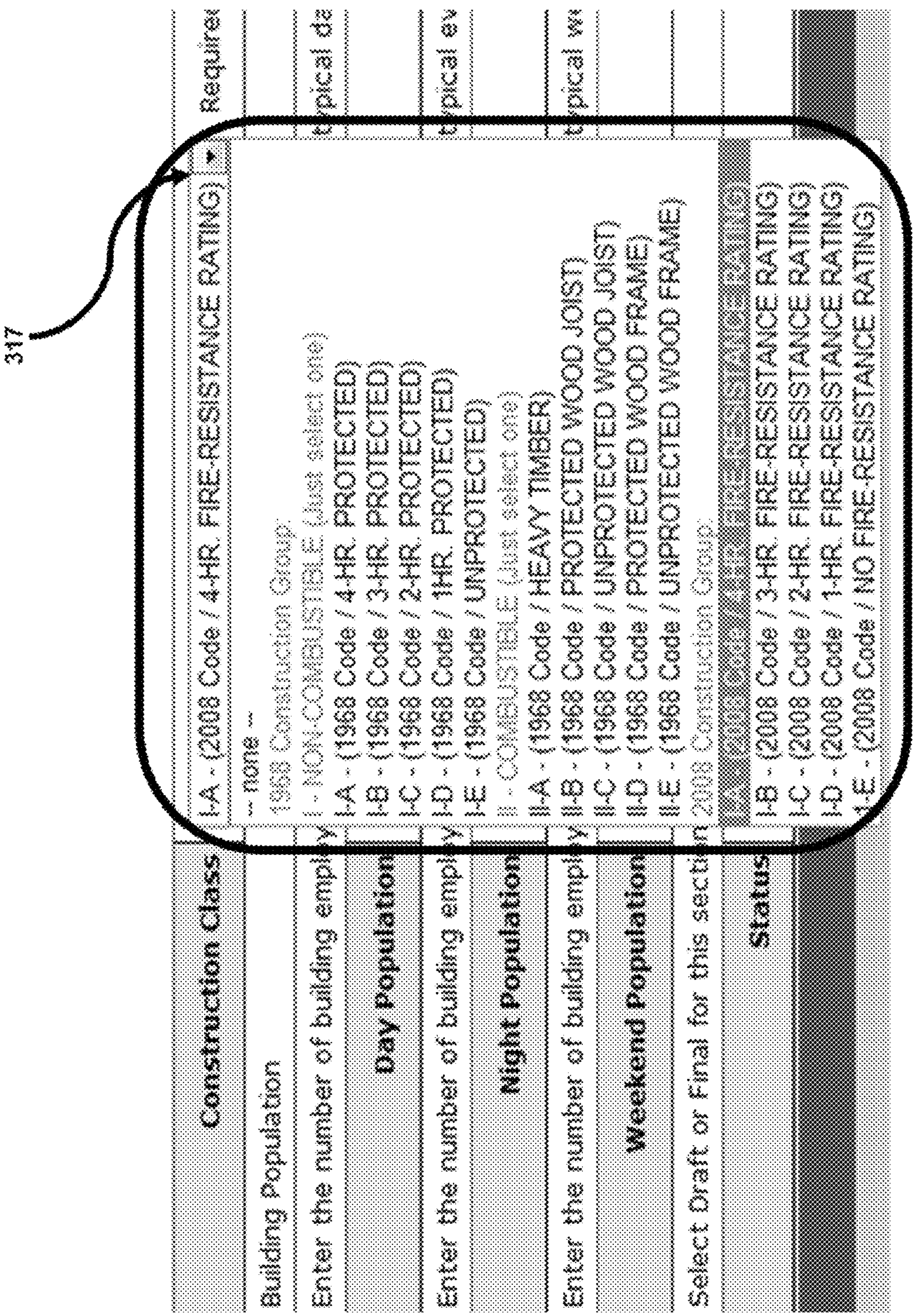
Figure 3 - D

400

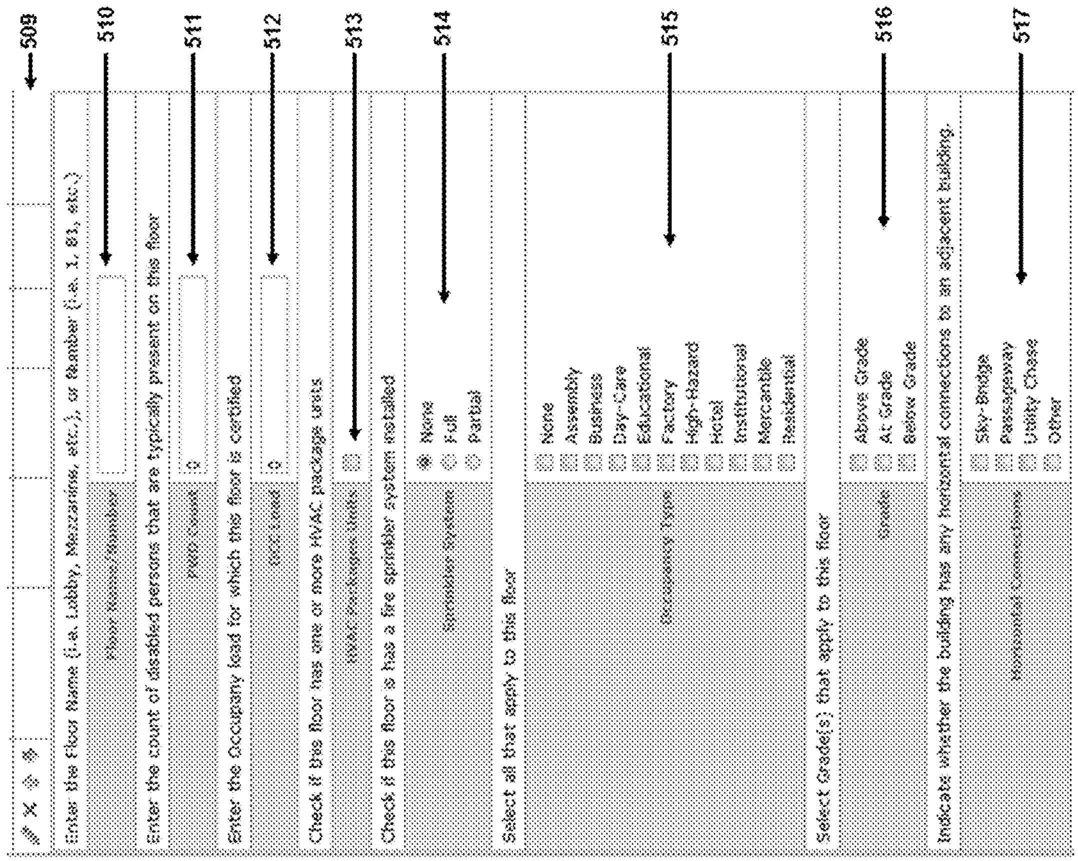
Figure 5 - A

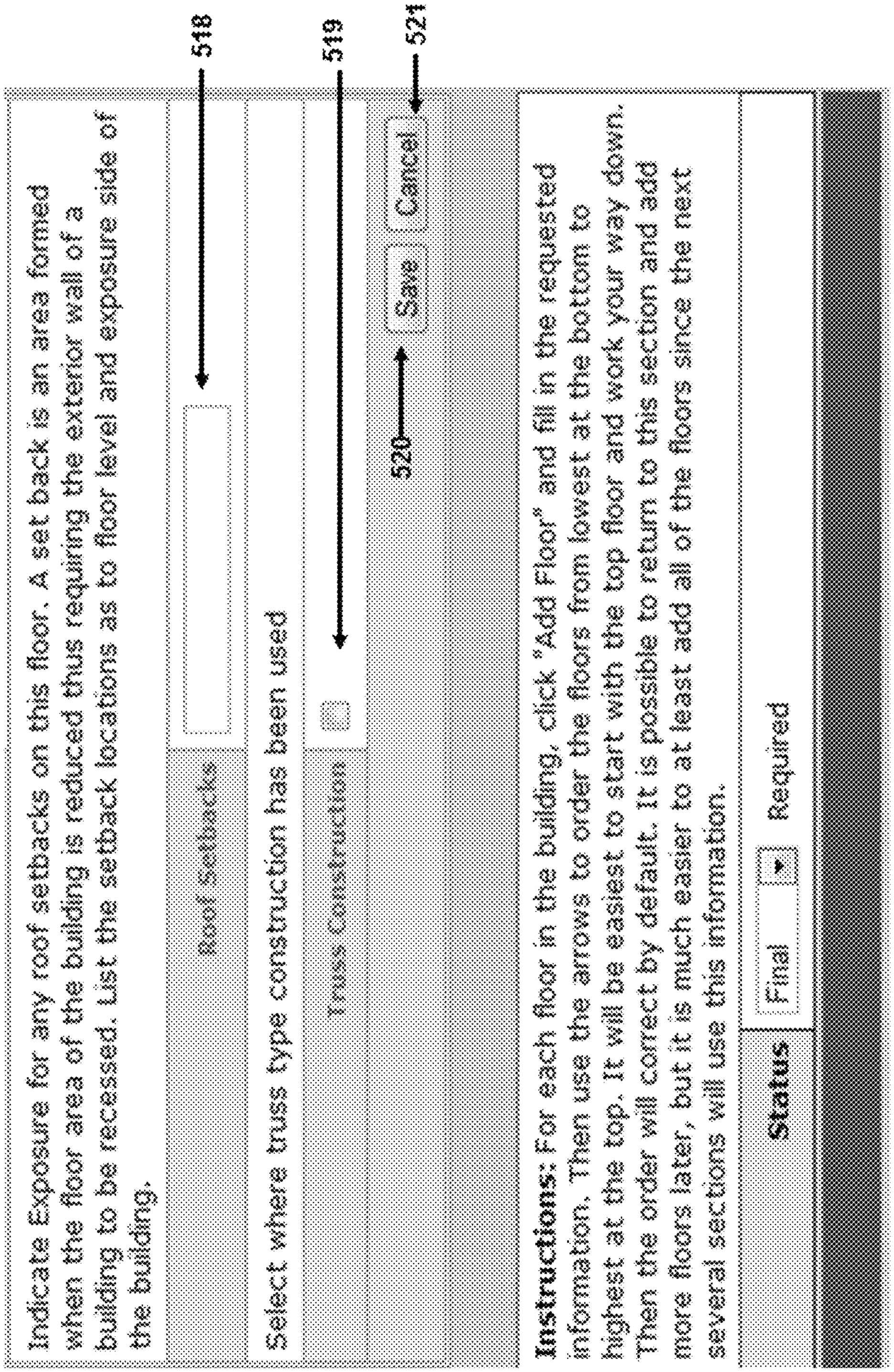
Figure 5 - B

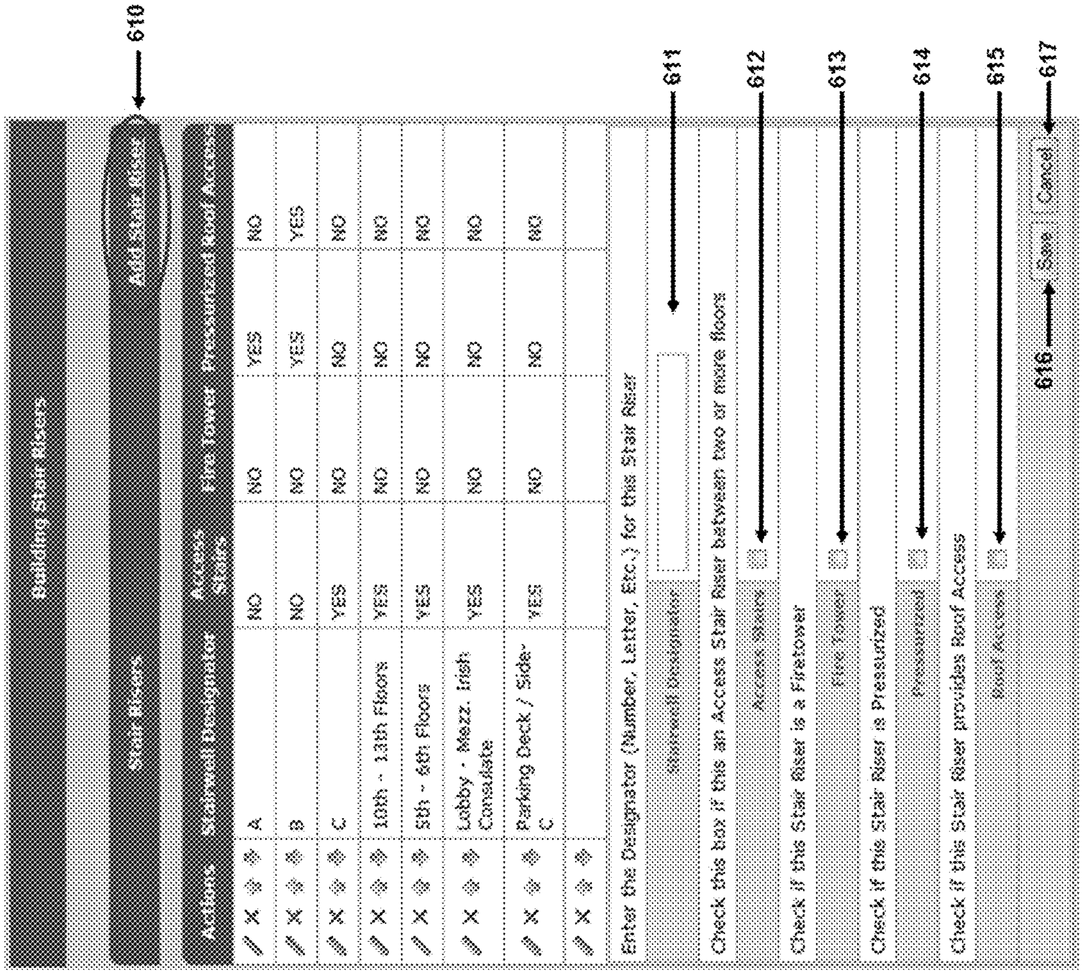
Figure 6 - A

Figure 6 - B
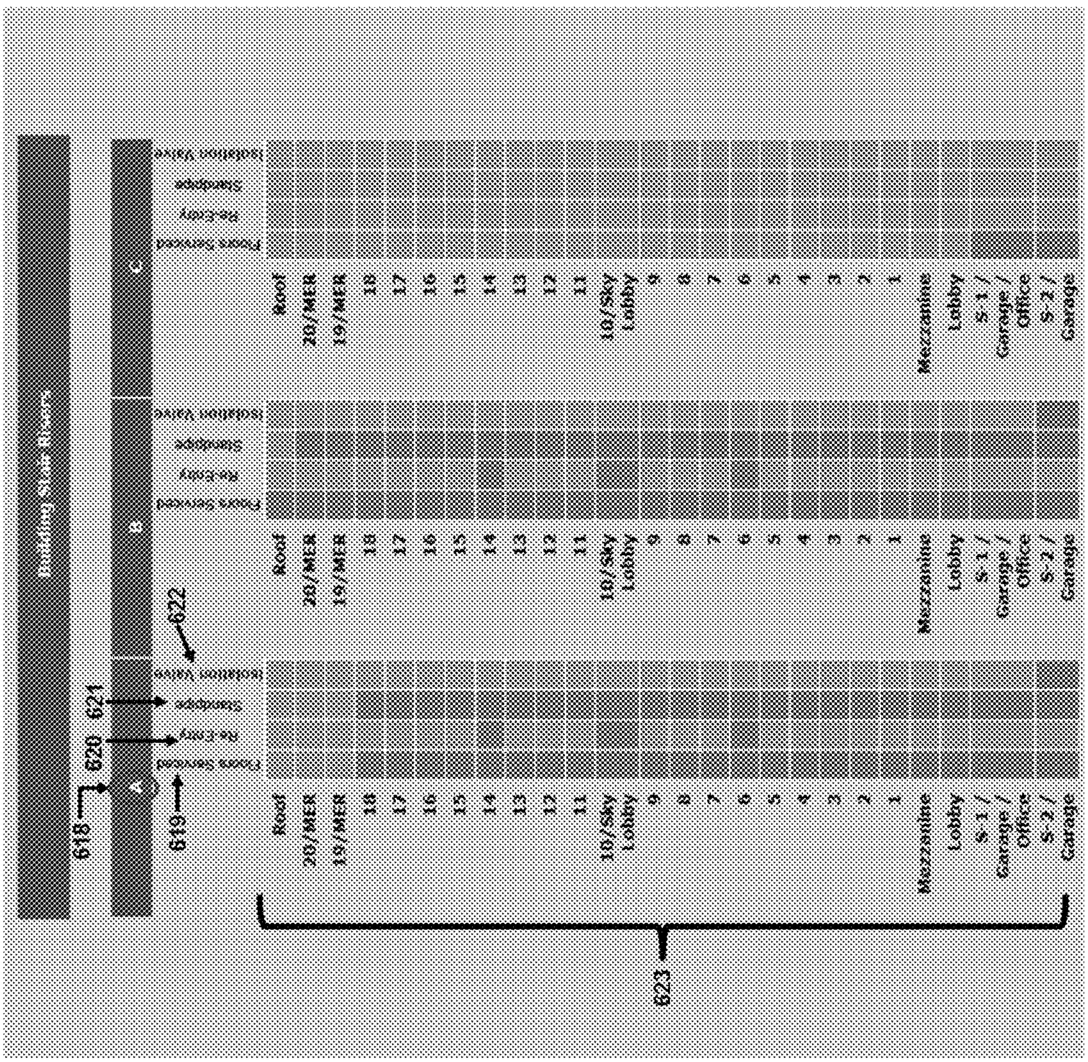

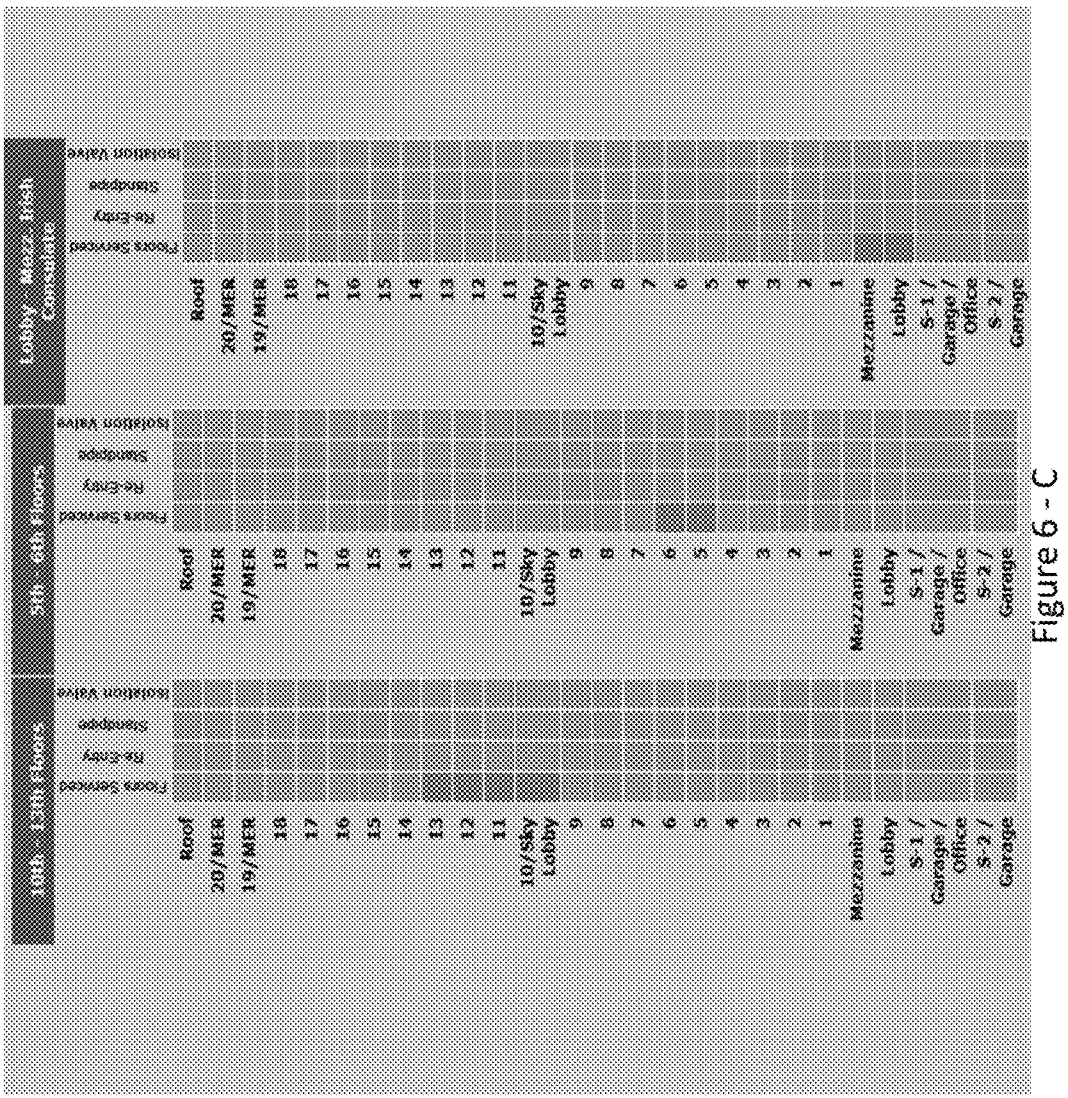
Figure 6 - C

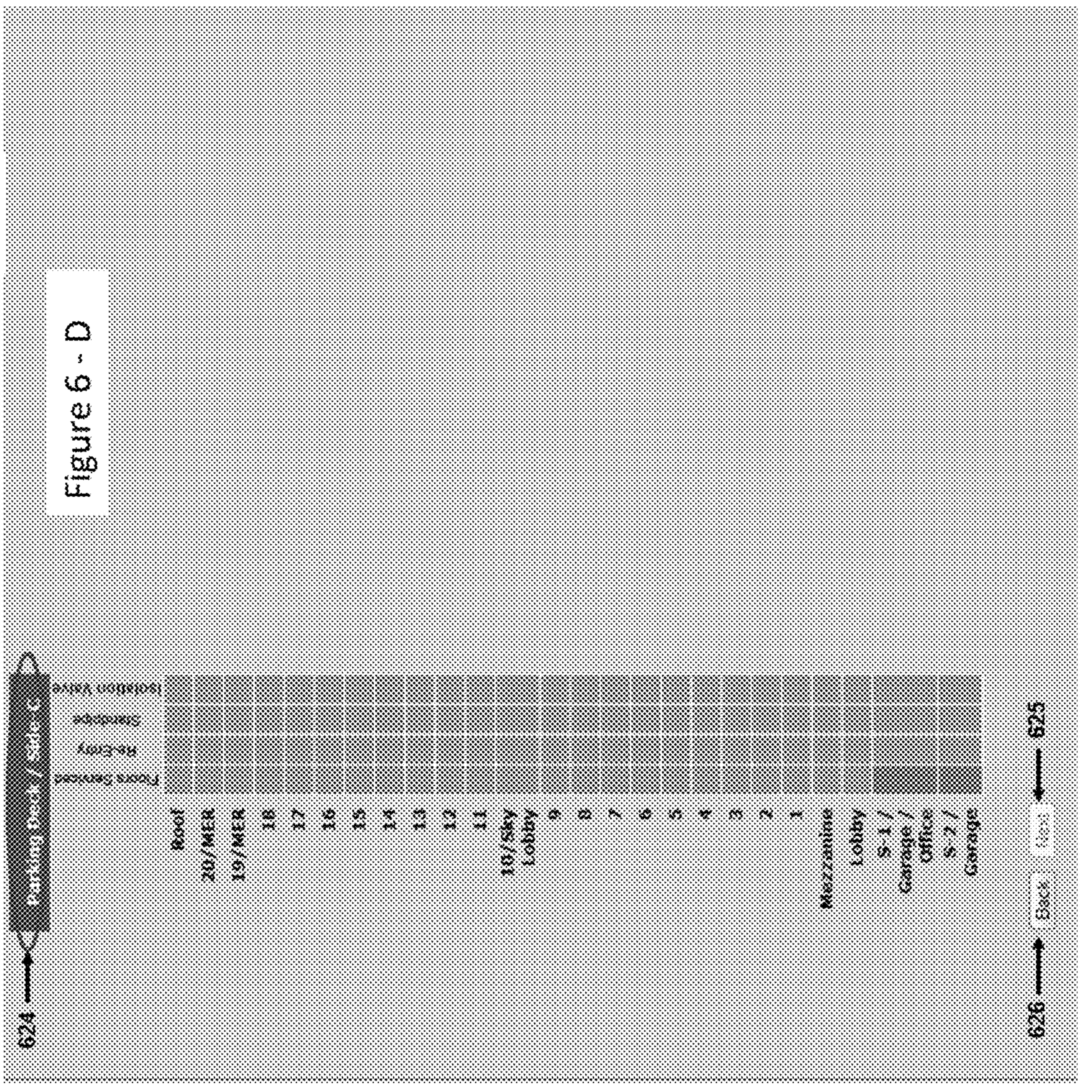
Figure 6 - D

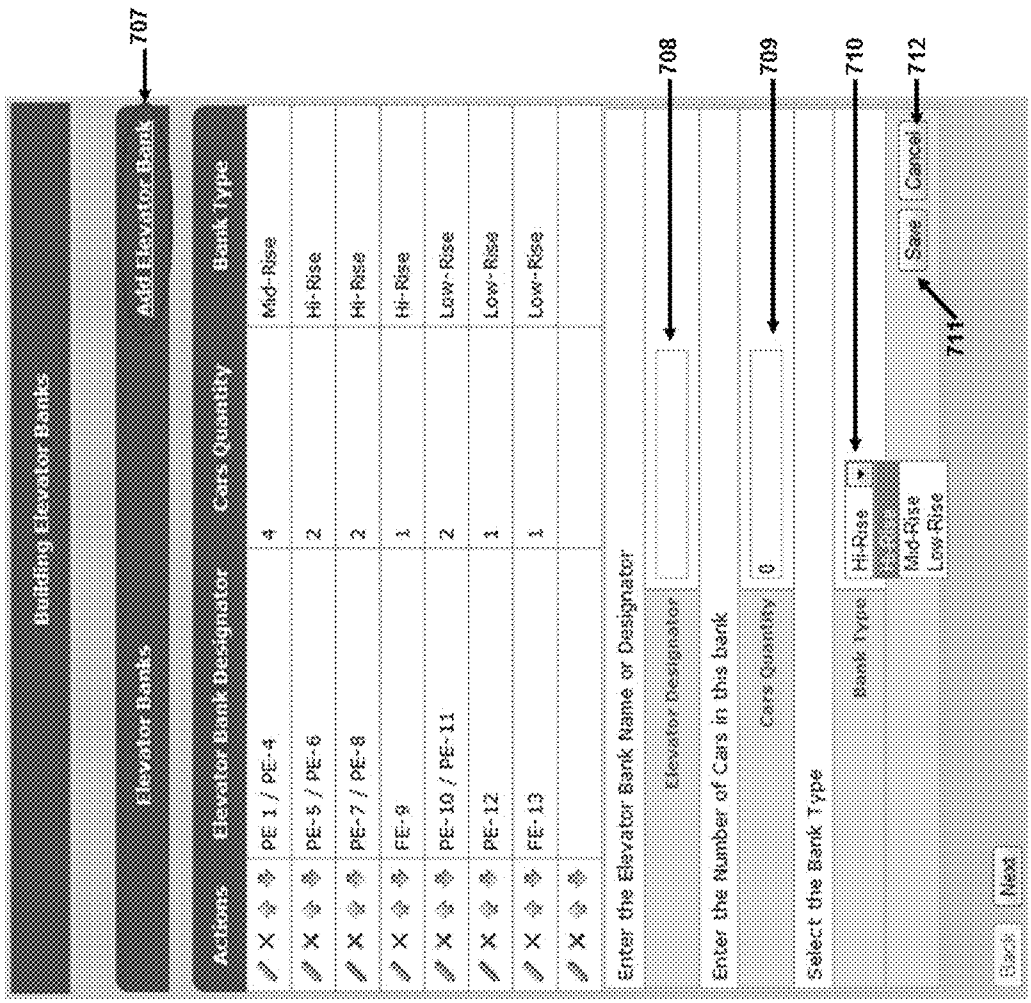
Figure 7 - A

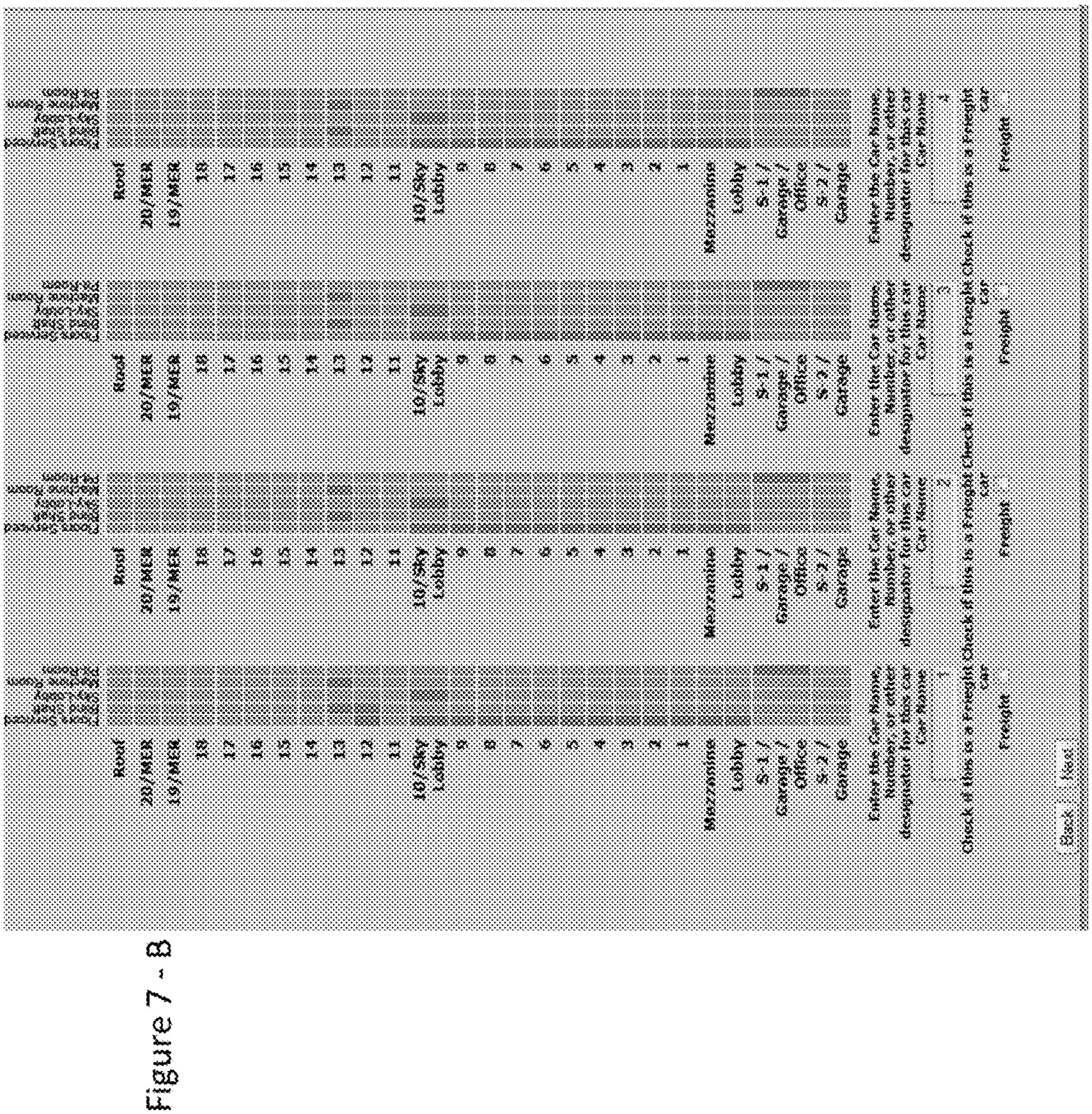
Figure 7 - B

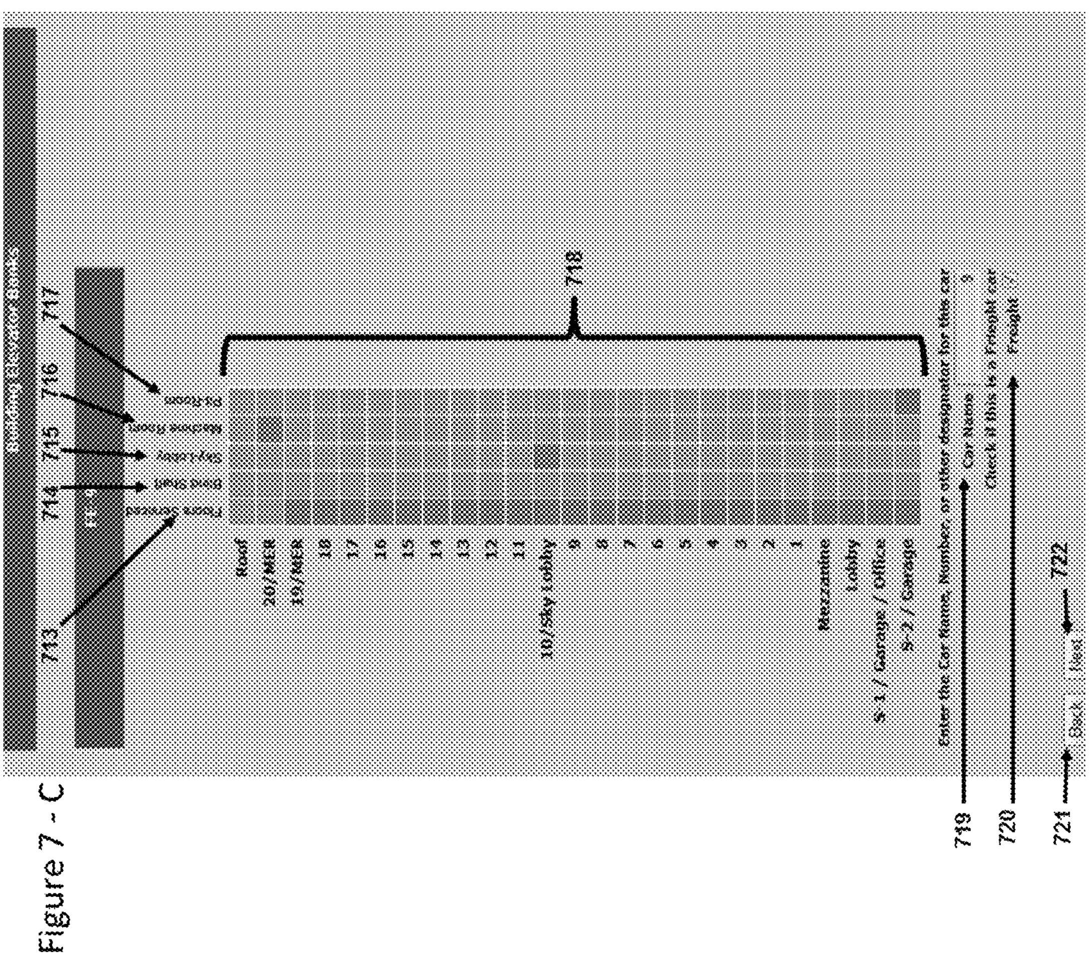
Figure 7 - C

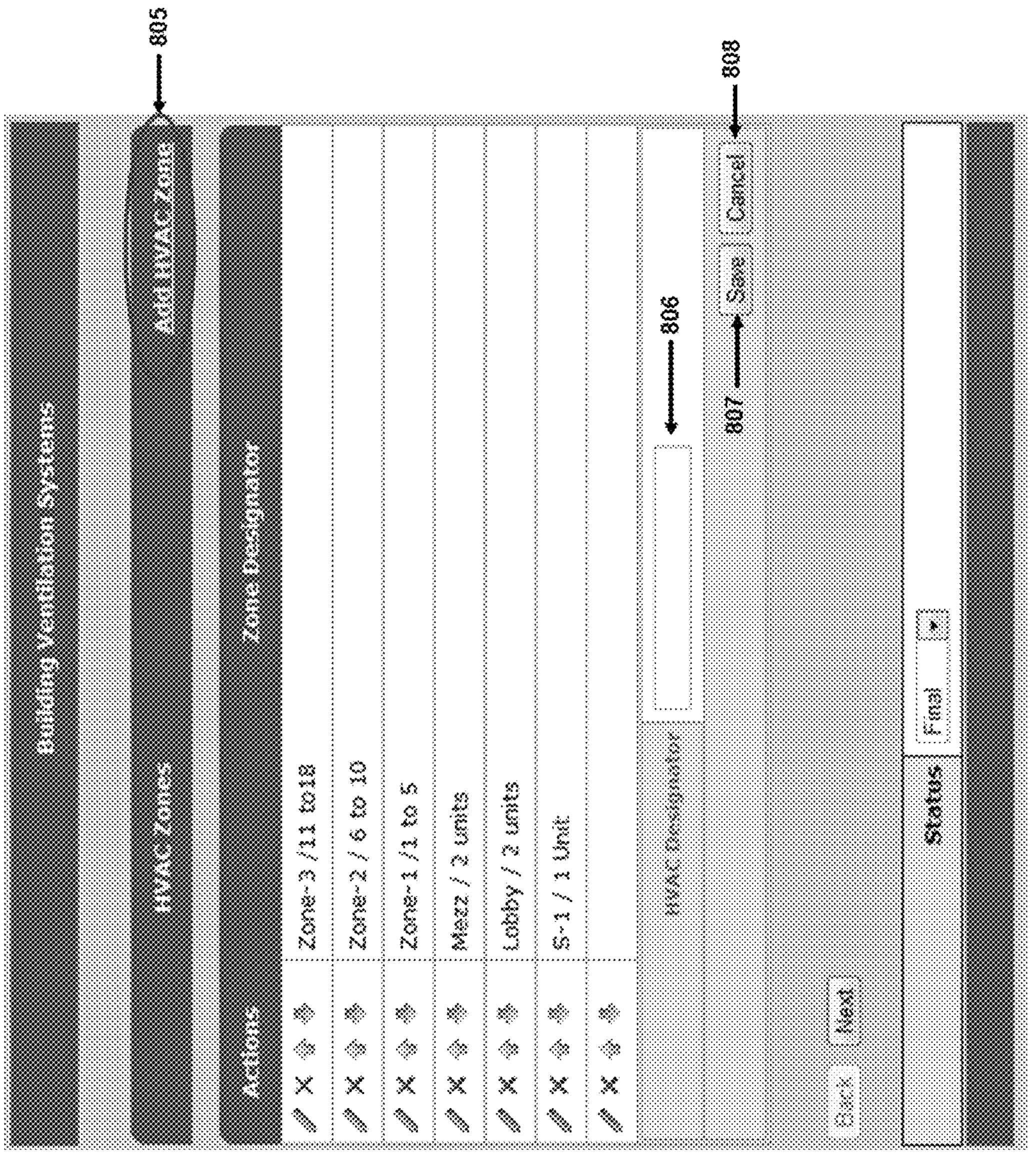
Figure 8 - A

Figure 8 - B
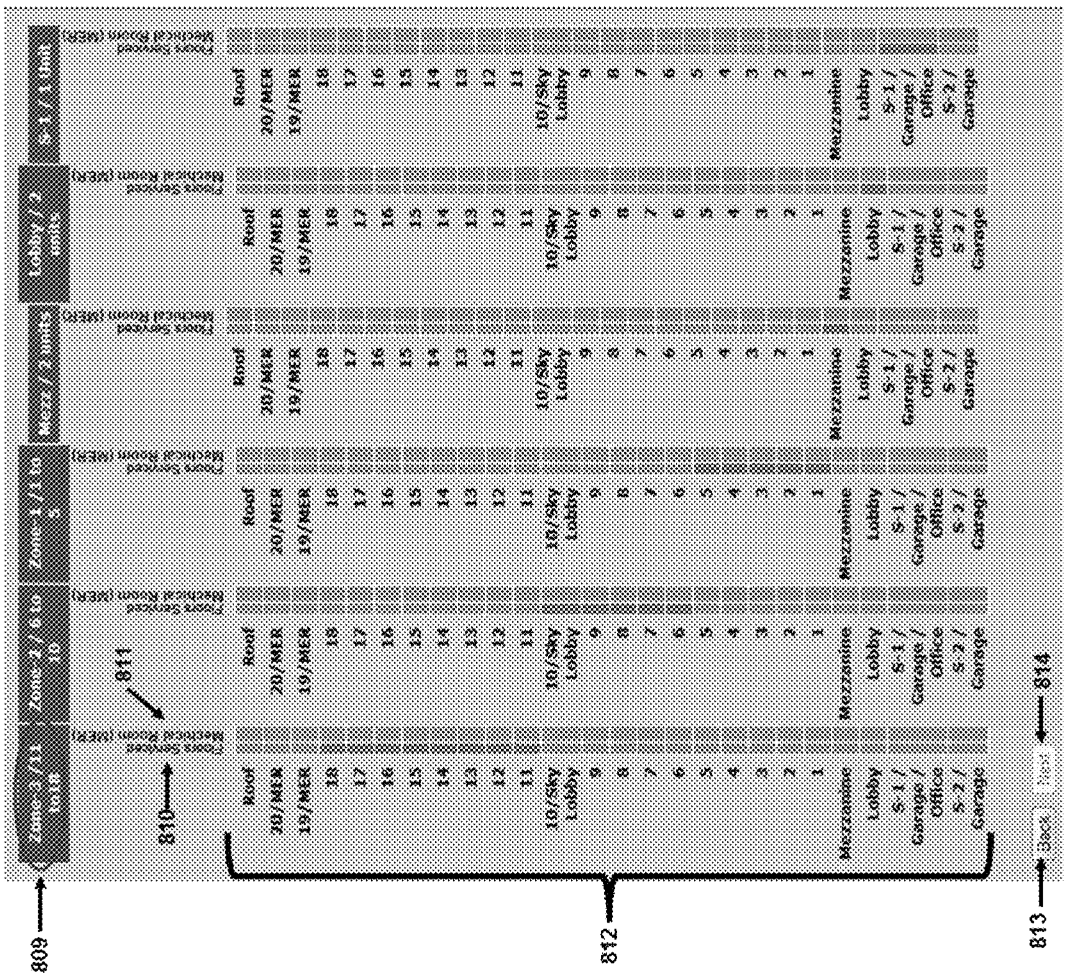

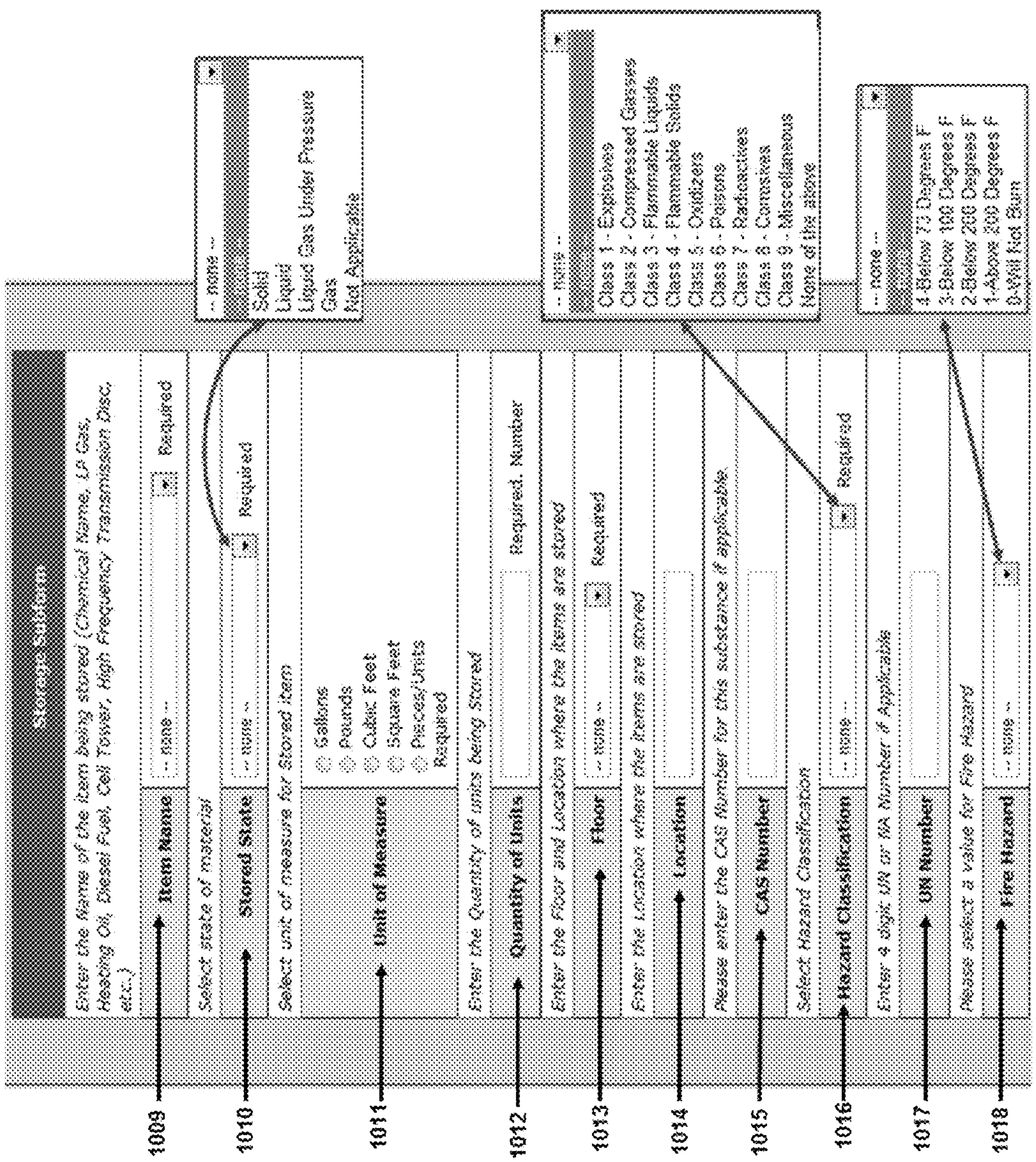
Figure 10 - A

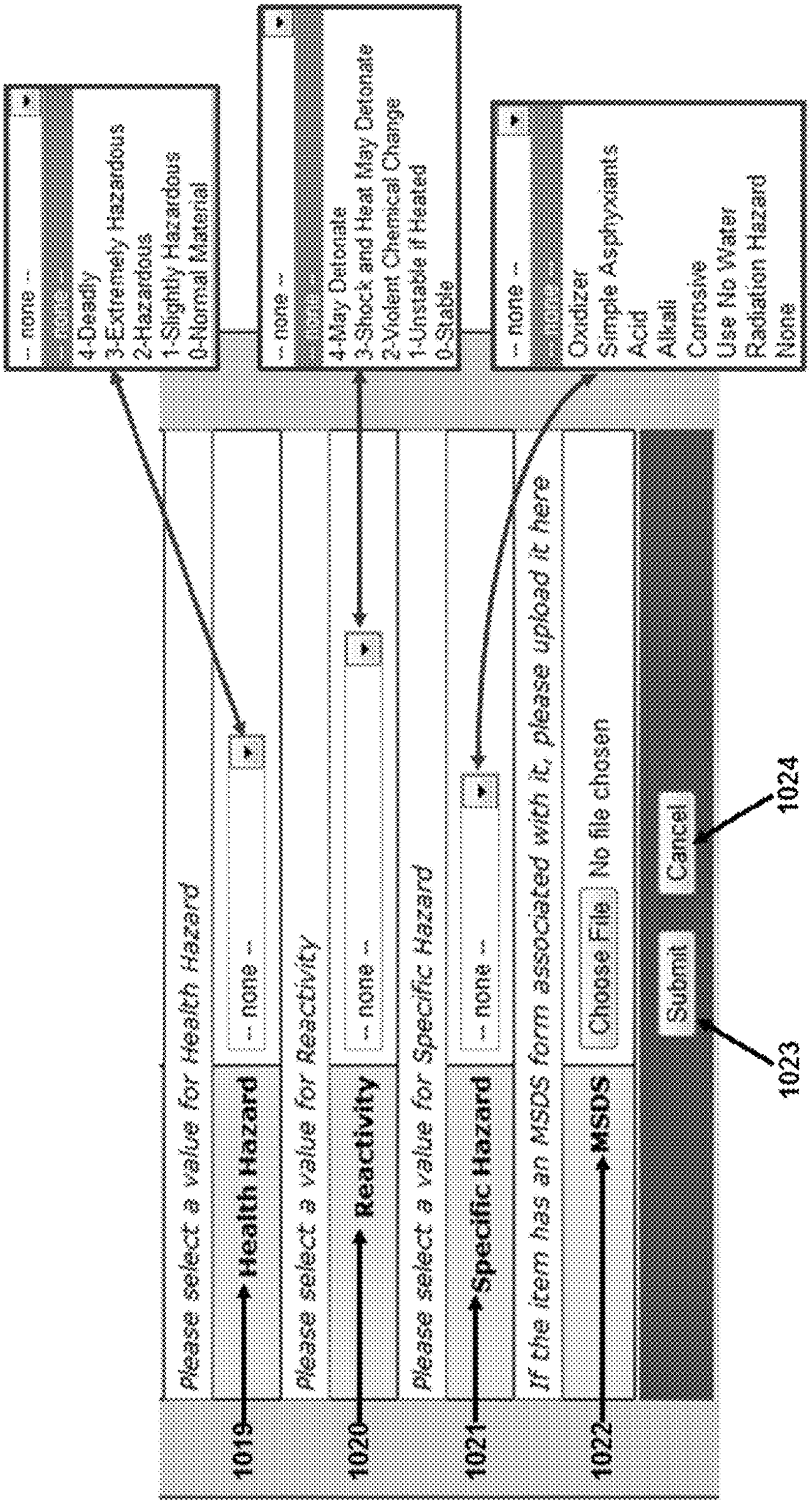
Figure 10 - B

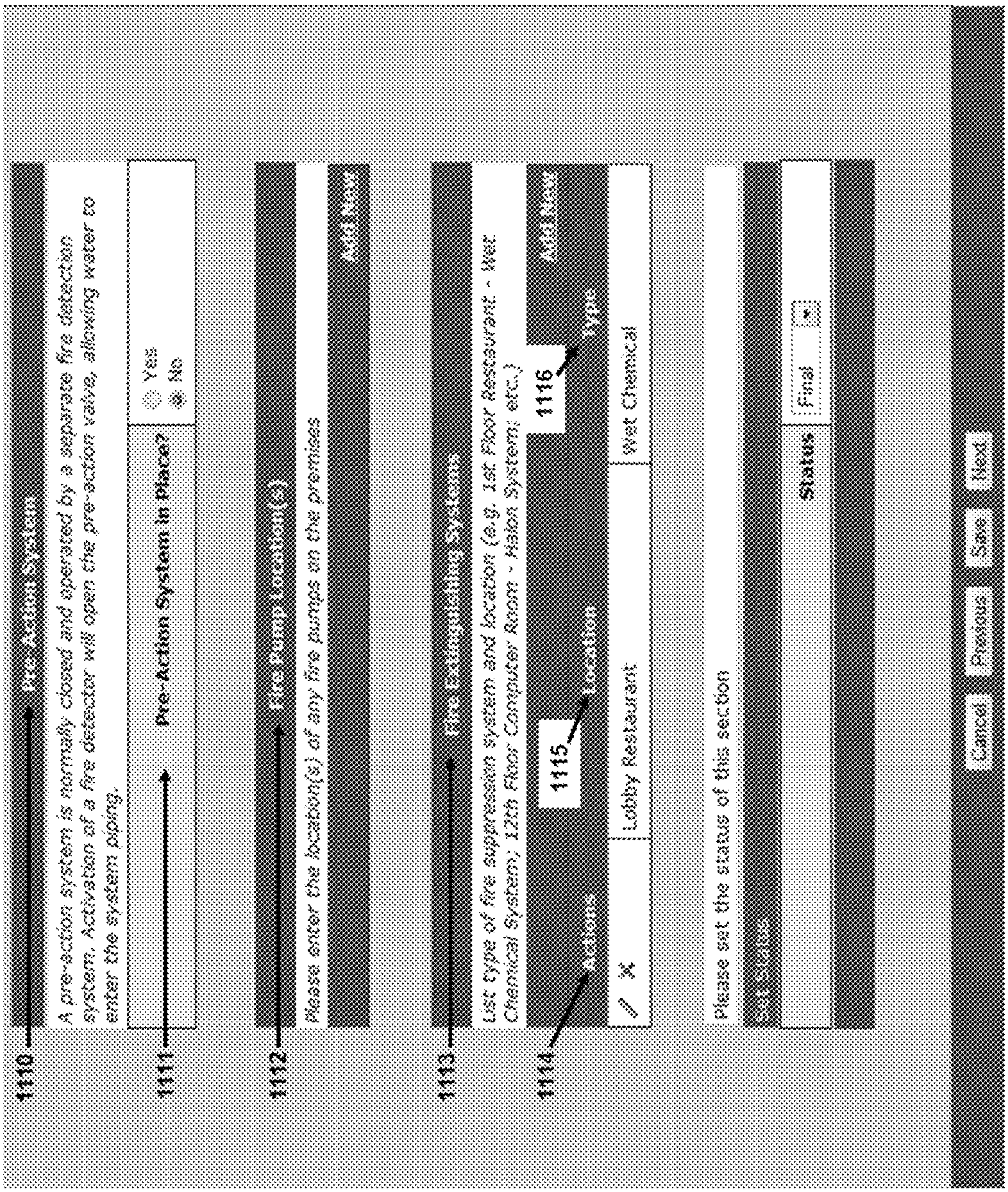
Figure 11 - A

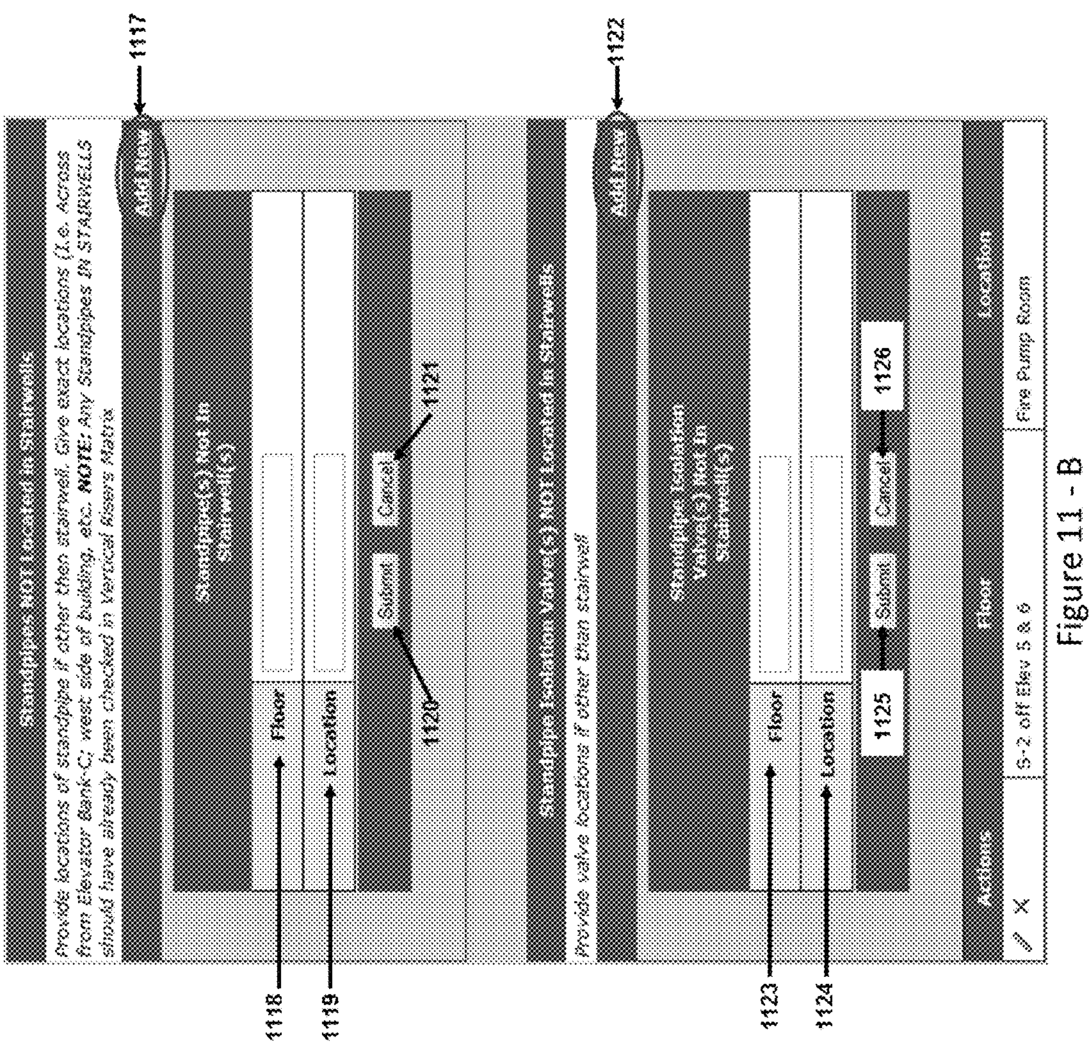
Figure 11 - B

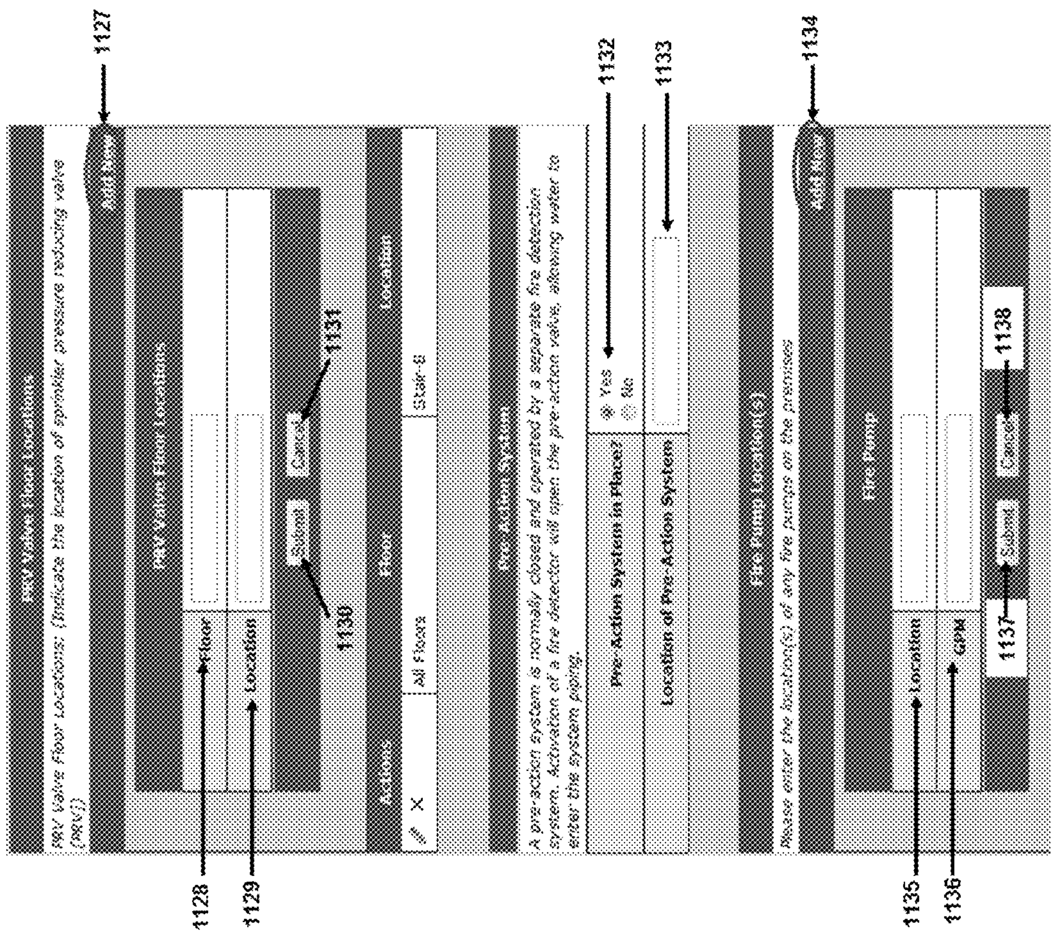
Figure 11 - C

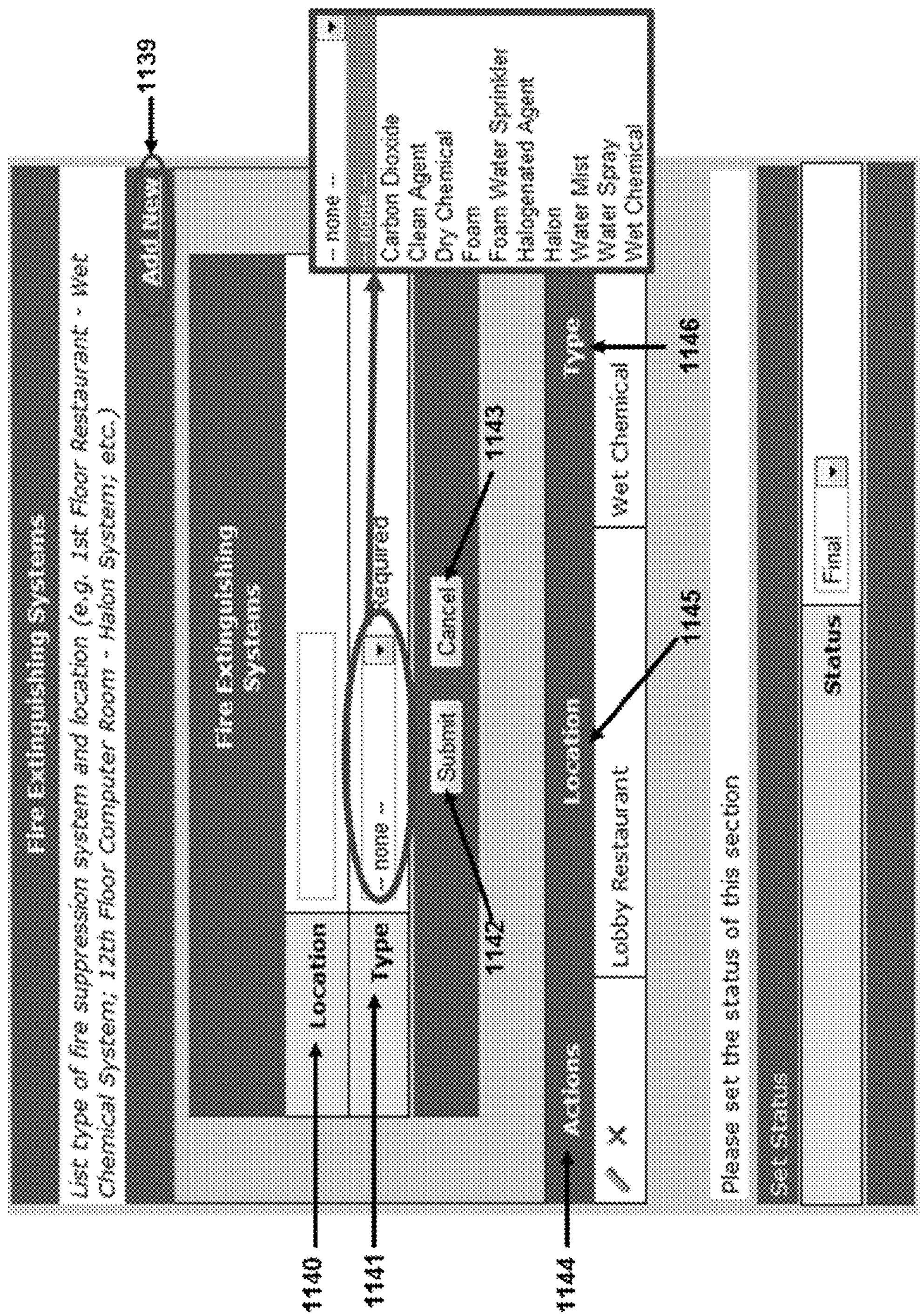
Figure 11 - D

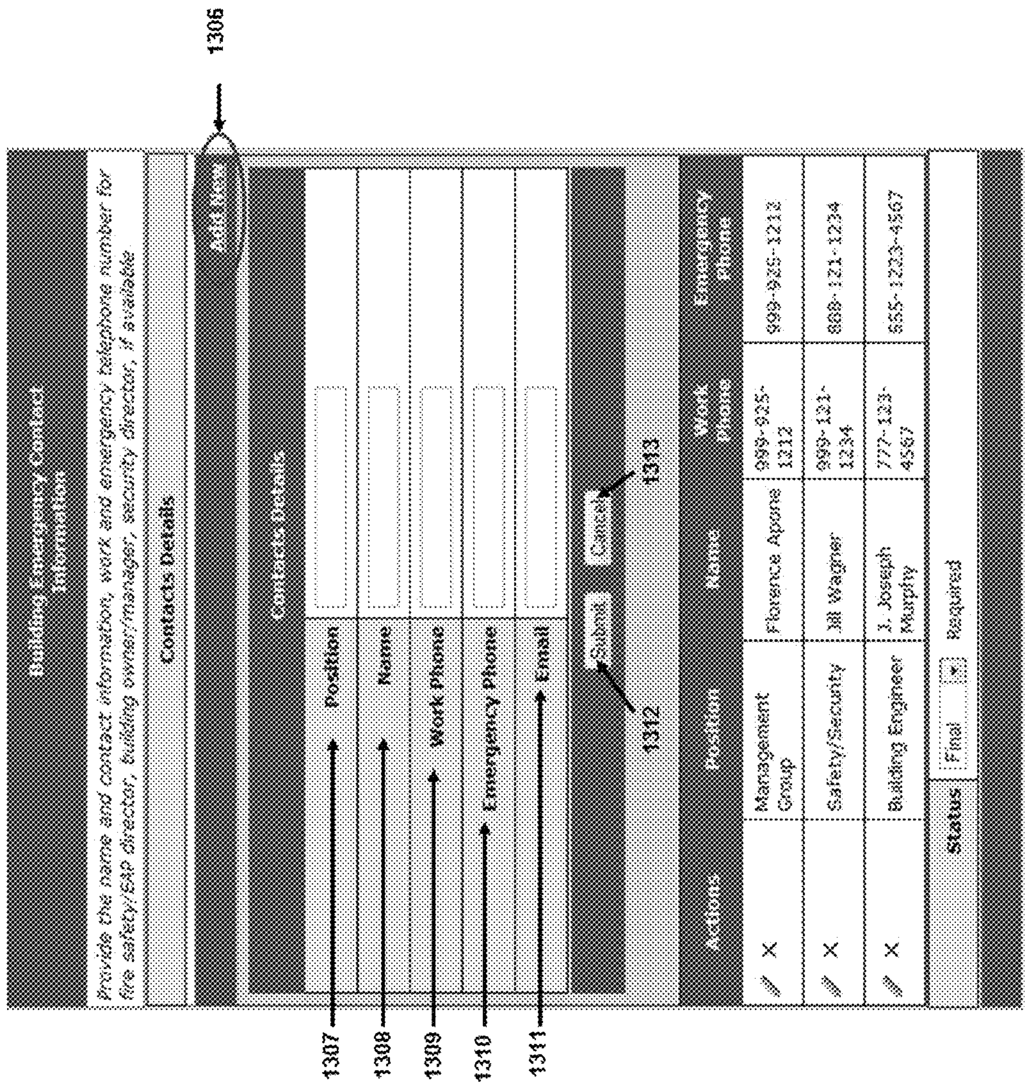
Figure 13 - A

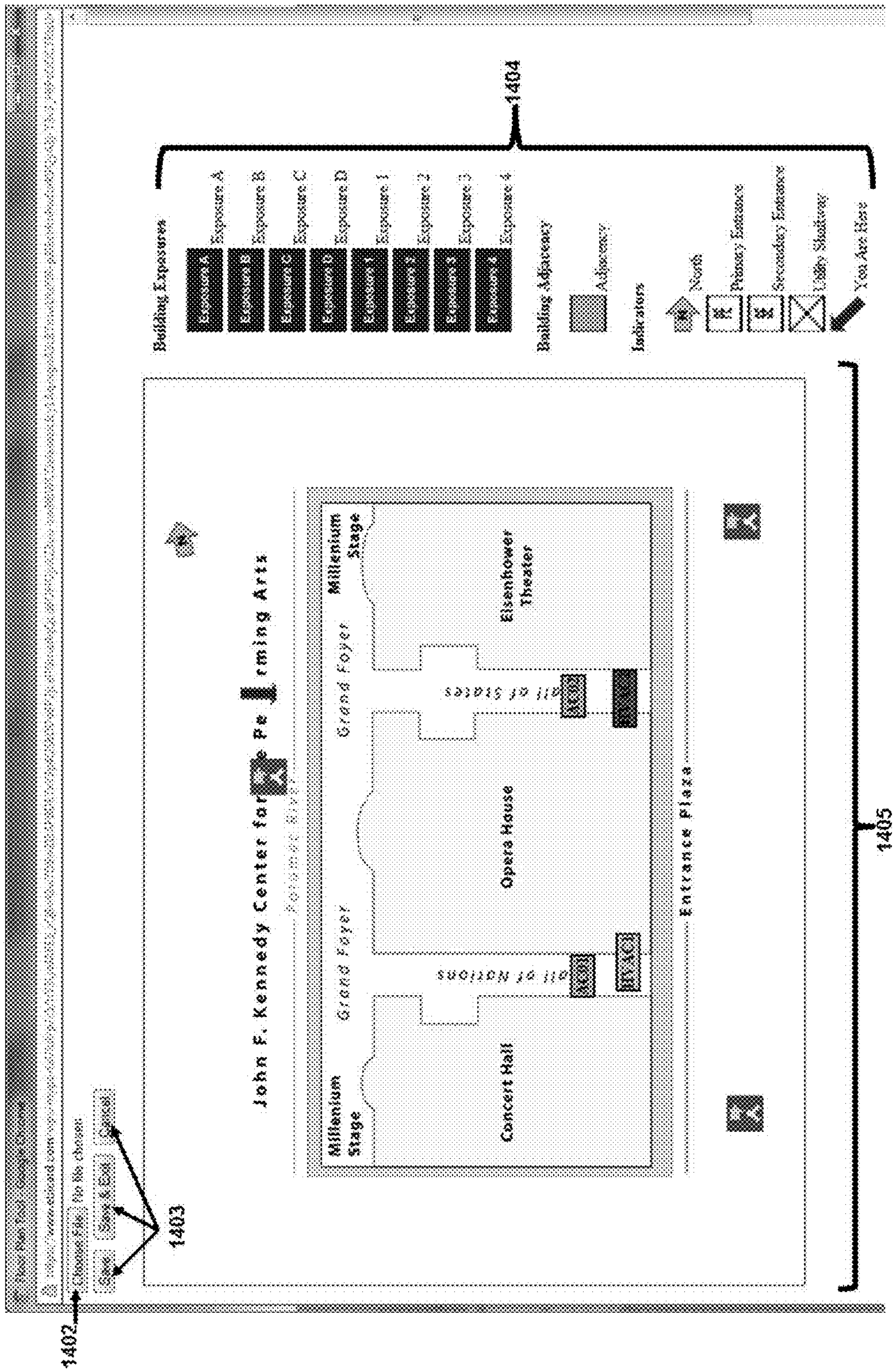
Figure 14 - A

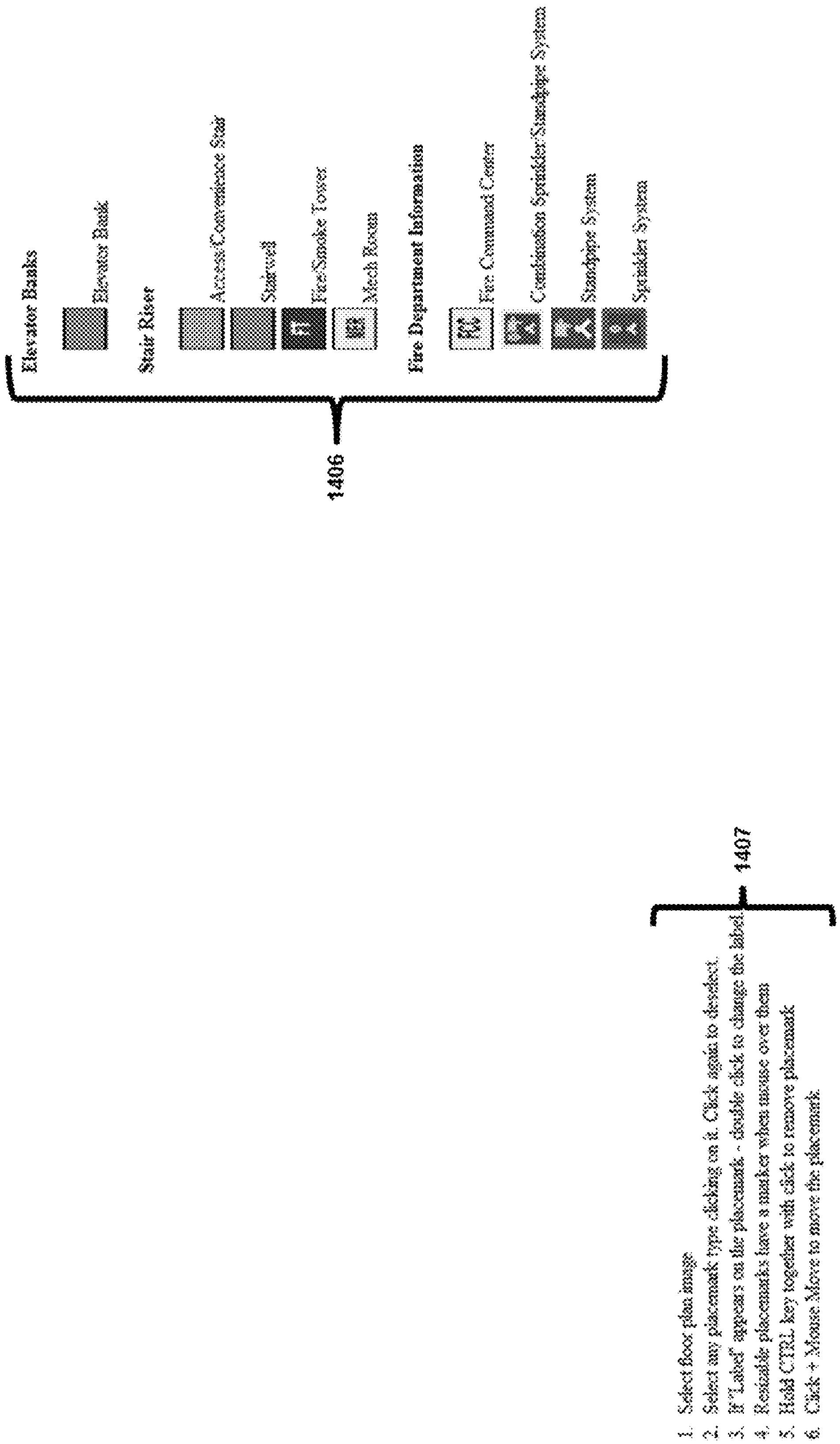
Figure 14 - B

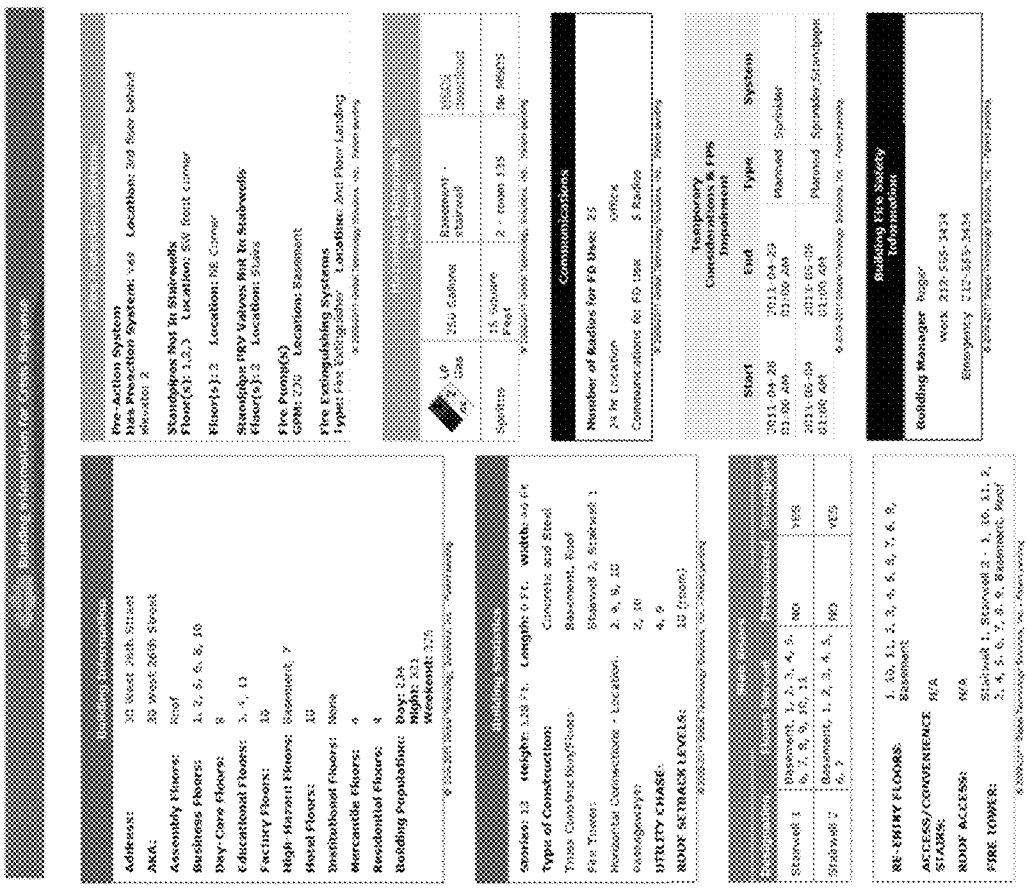
Figure 15-A

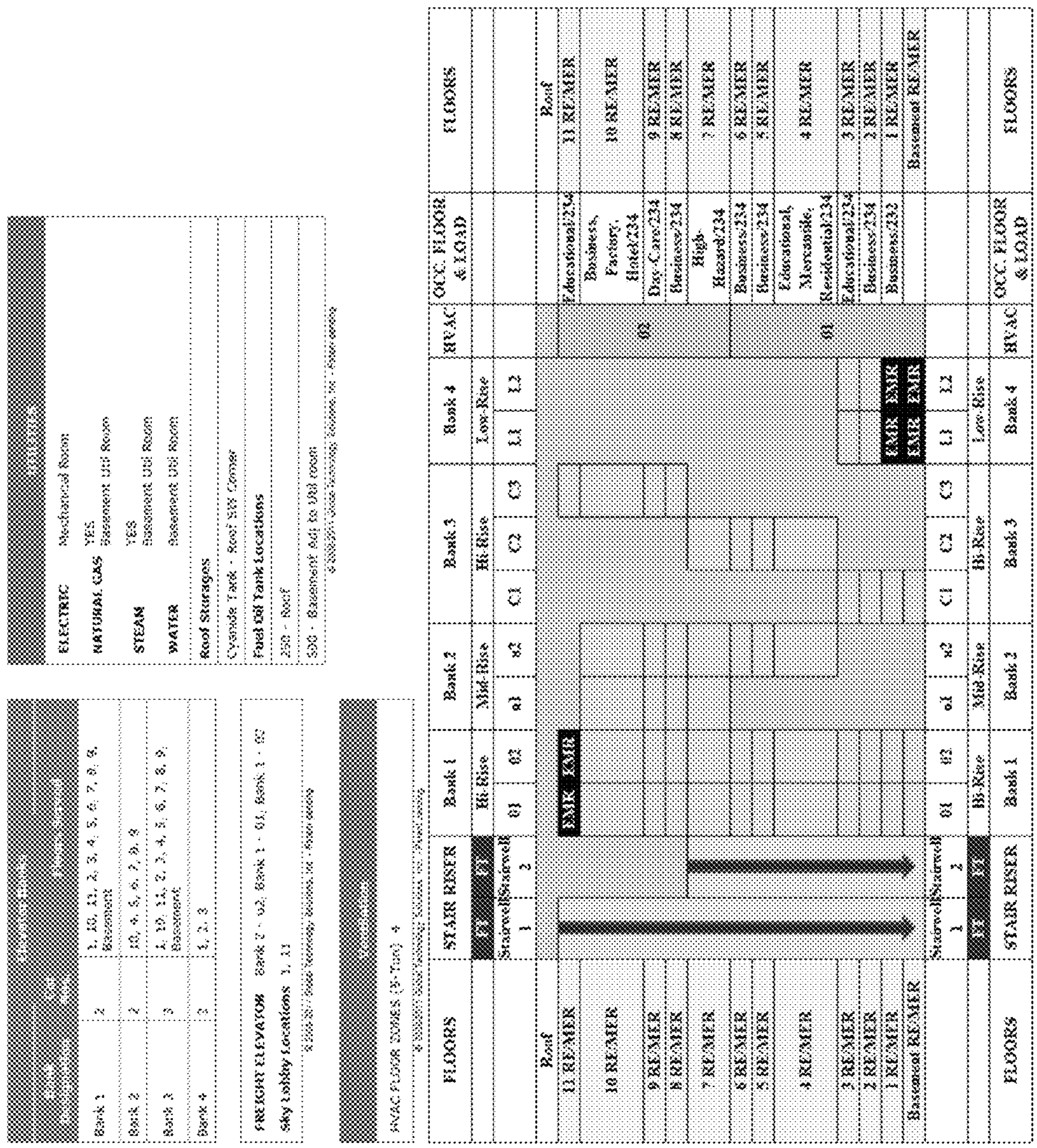
Figure 15-B

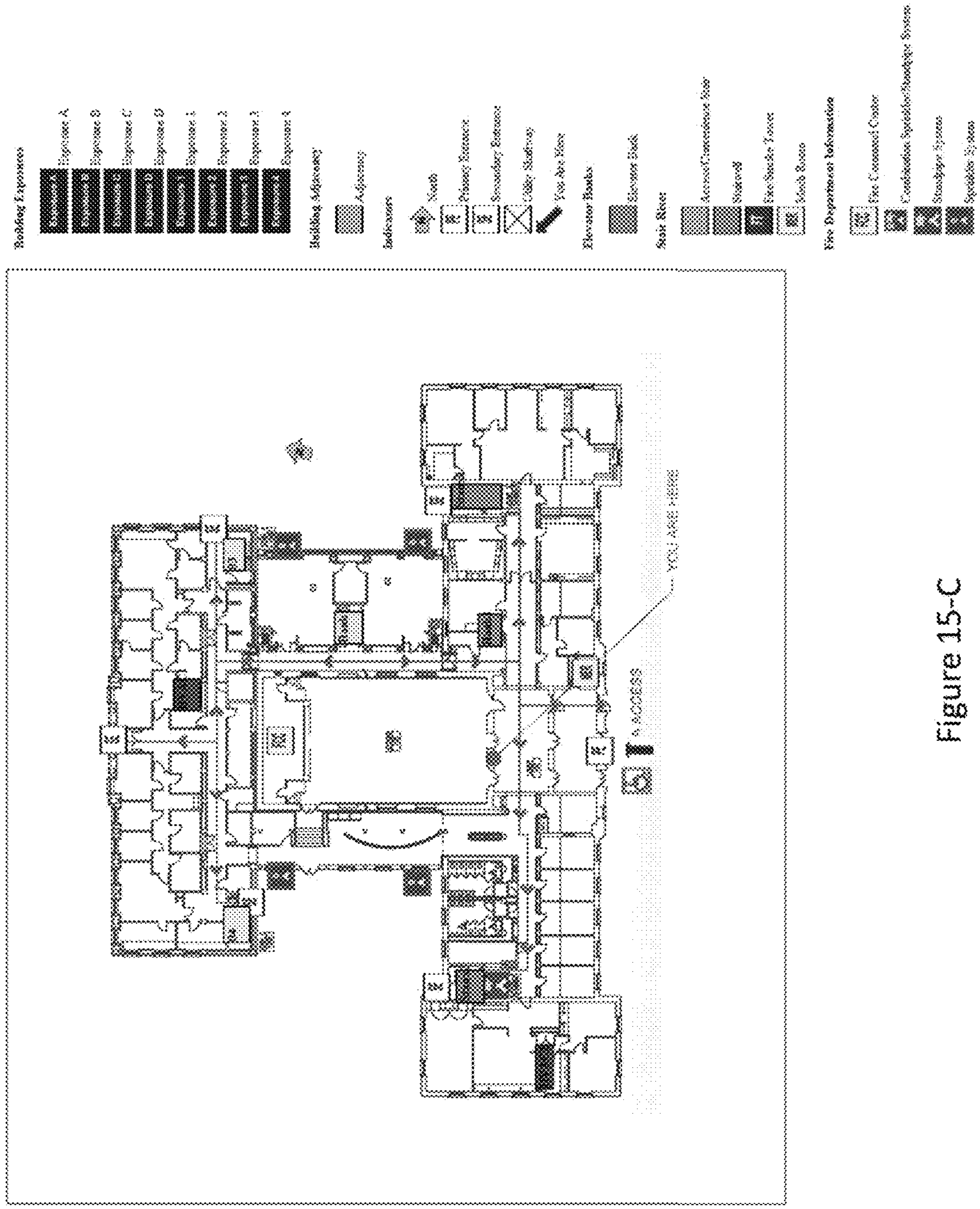
Figure 15-C

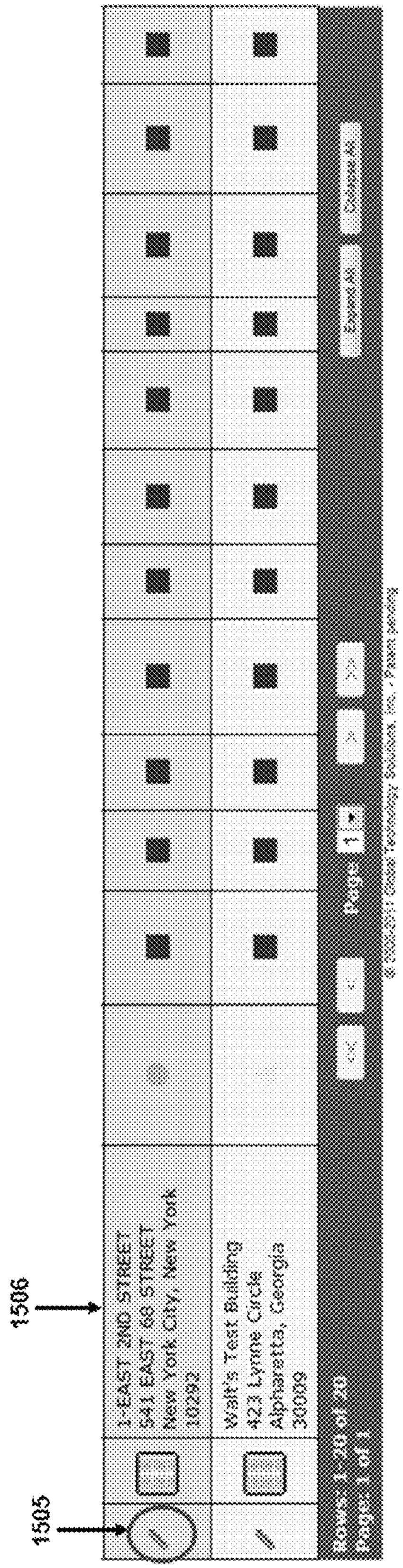
Figure 15-D

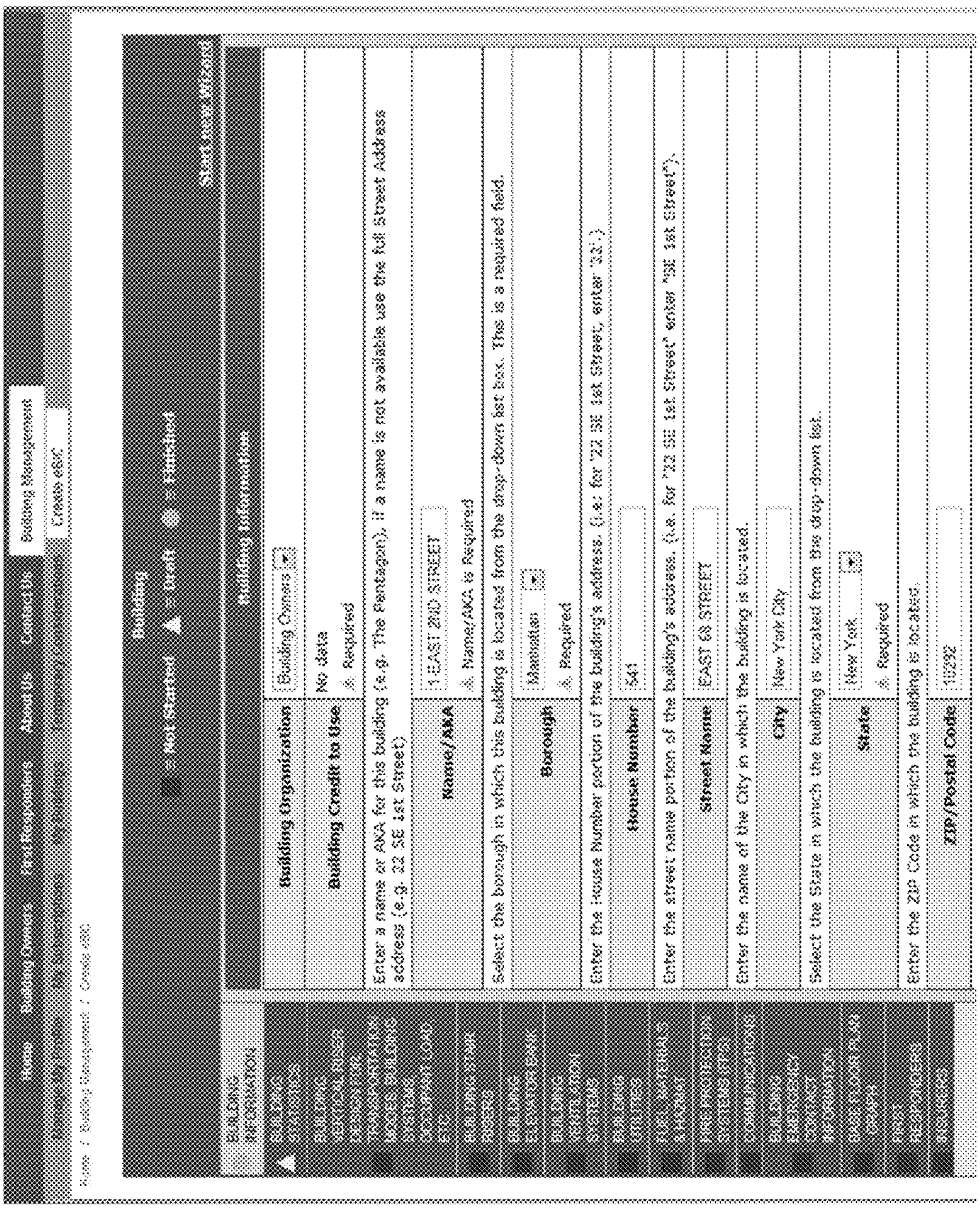
Figure 15 - E

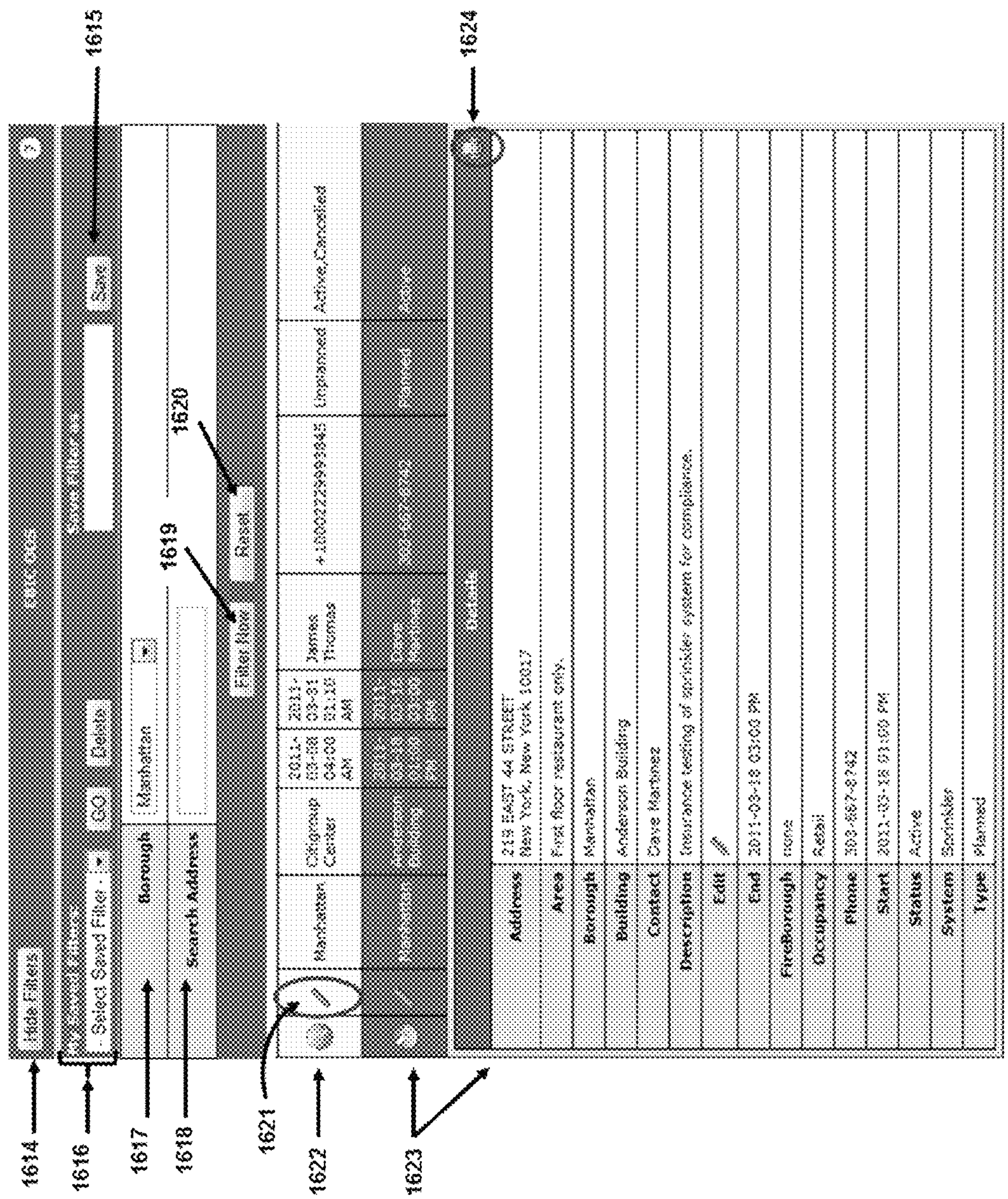
FIGURE 16 - A

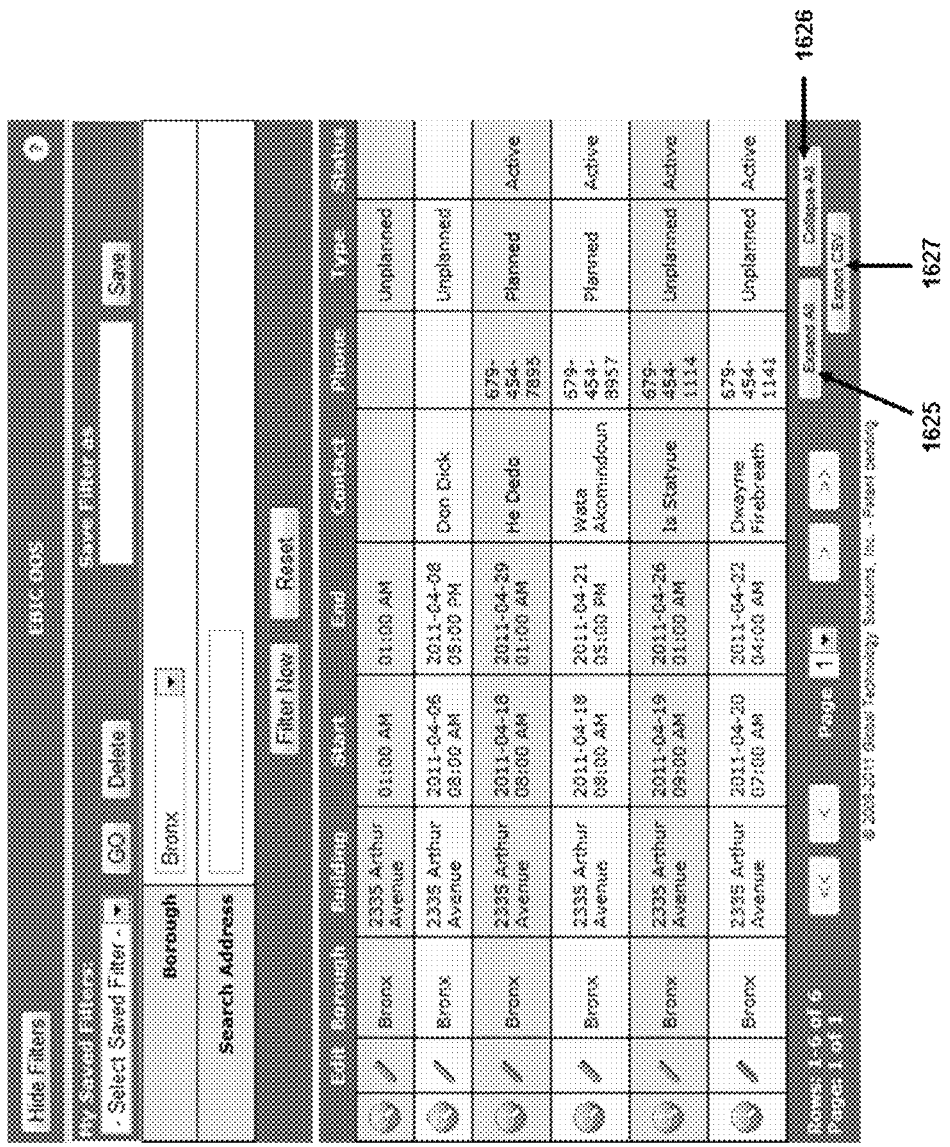
FIGURE 16 - B

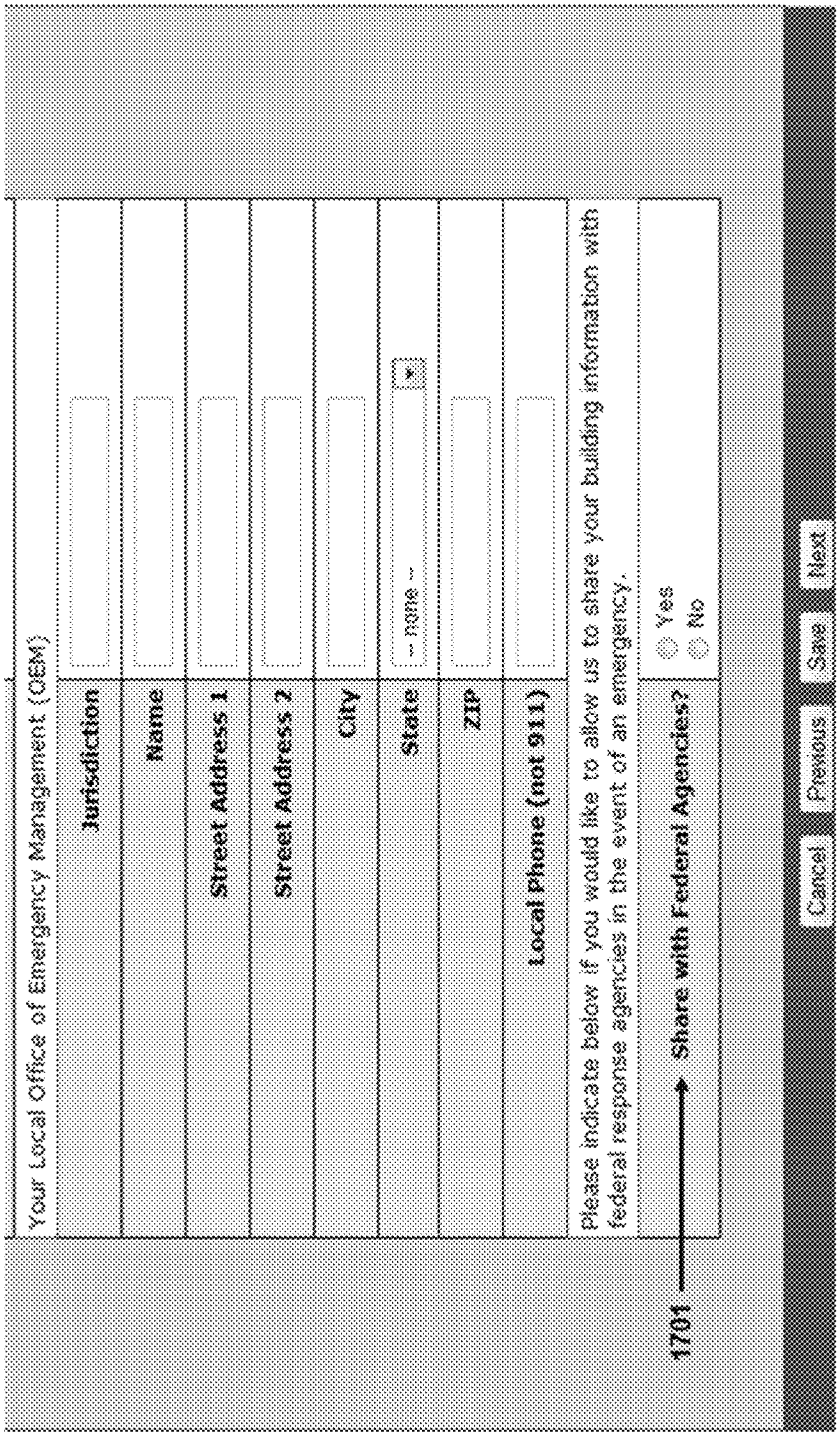
Figure 17 - A

1800

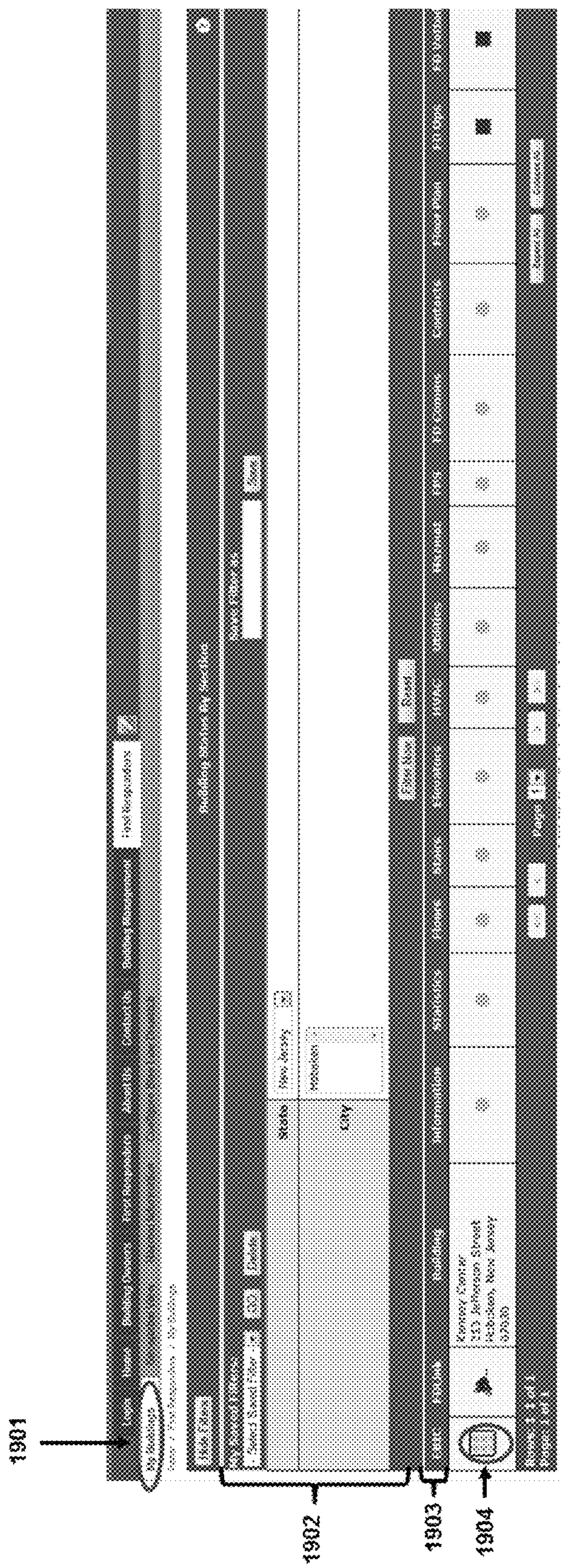
Figure 19 - A

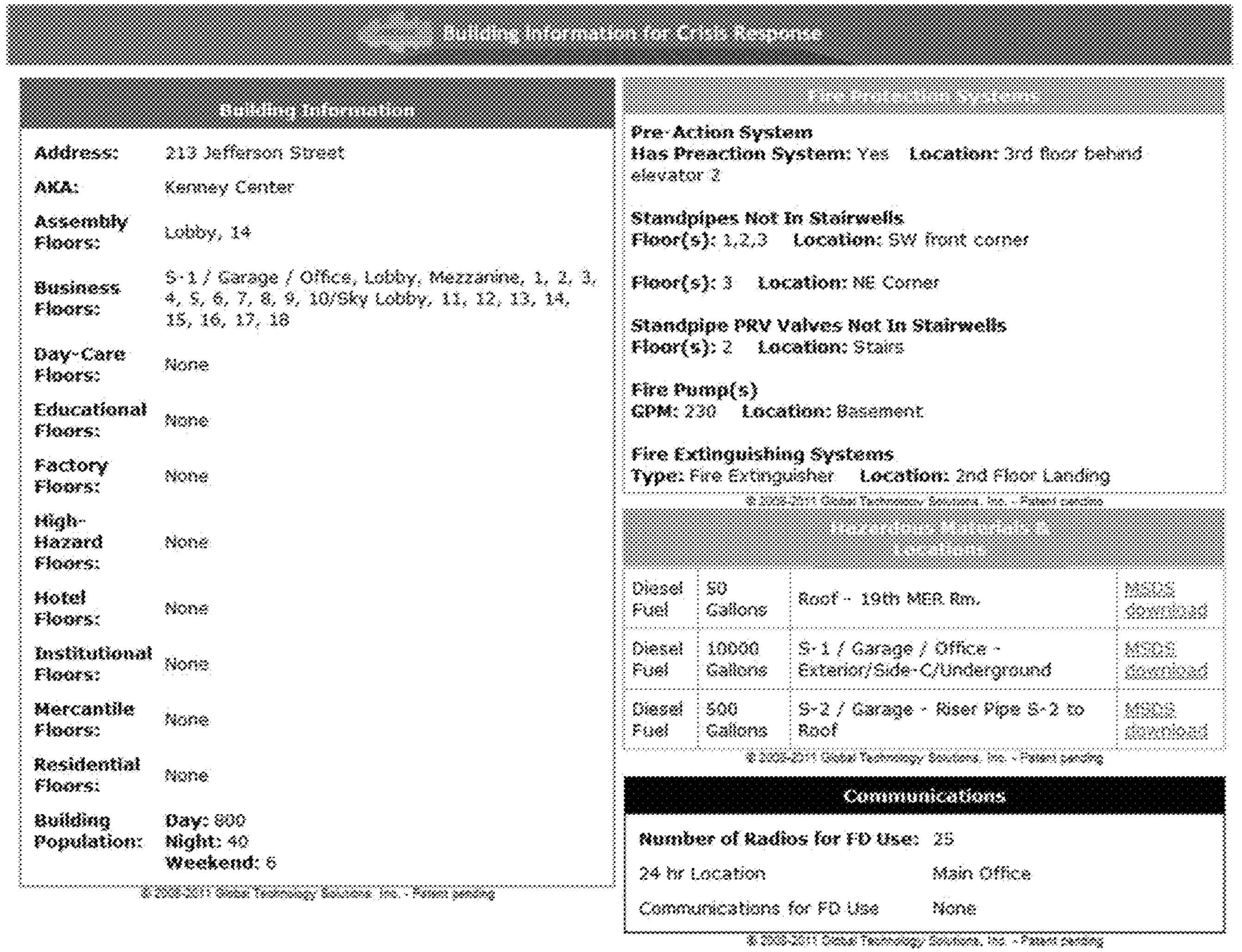
FIGURE 19 - B

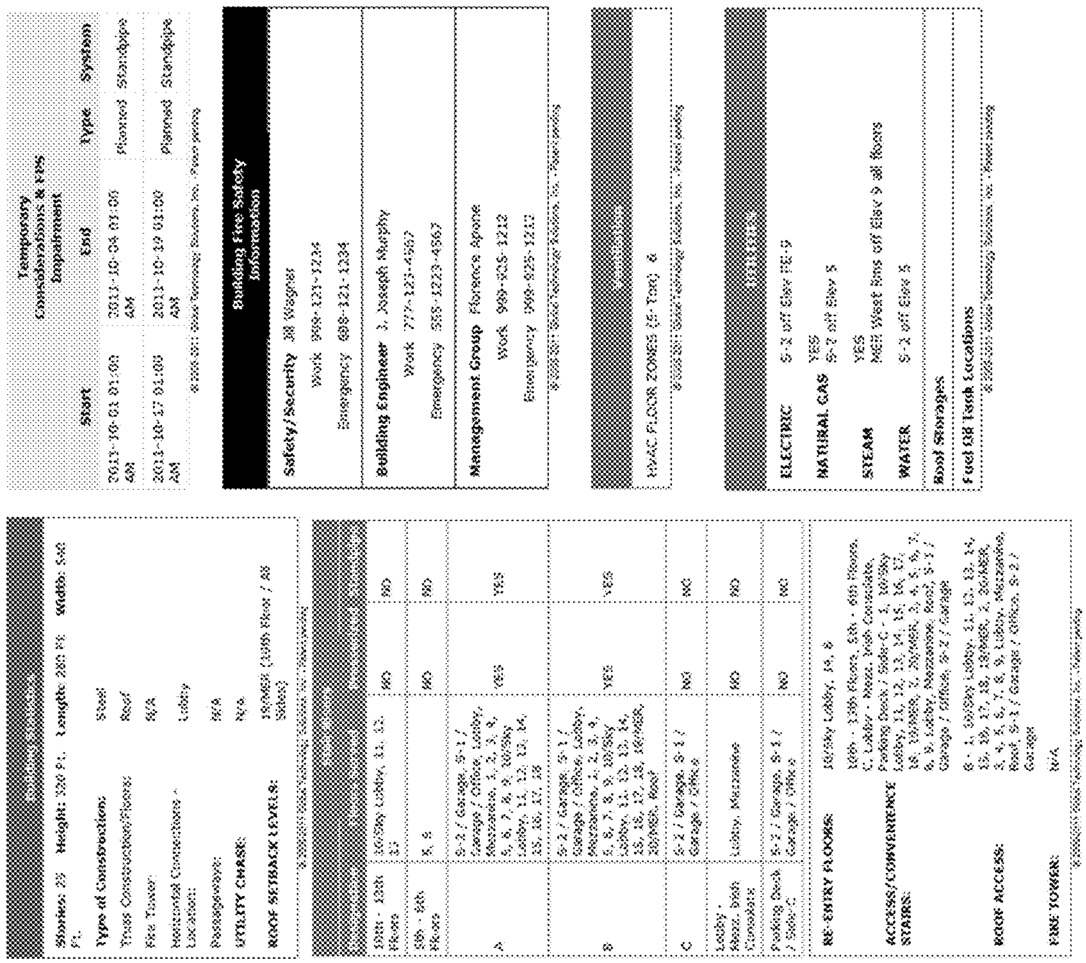
FIGURE 19 - C

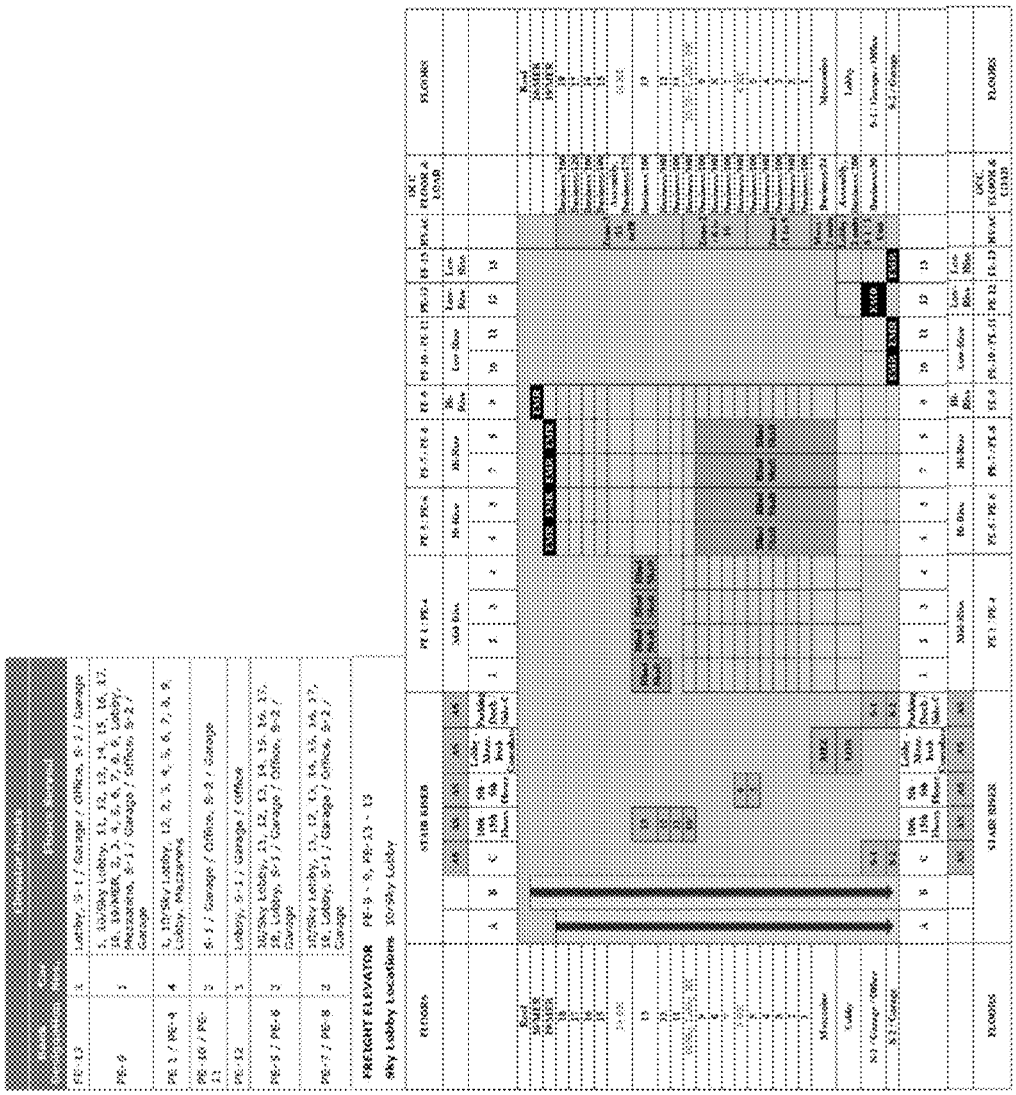
FIGURE 19 - D

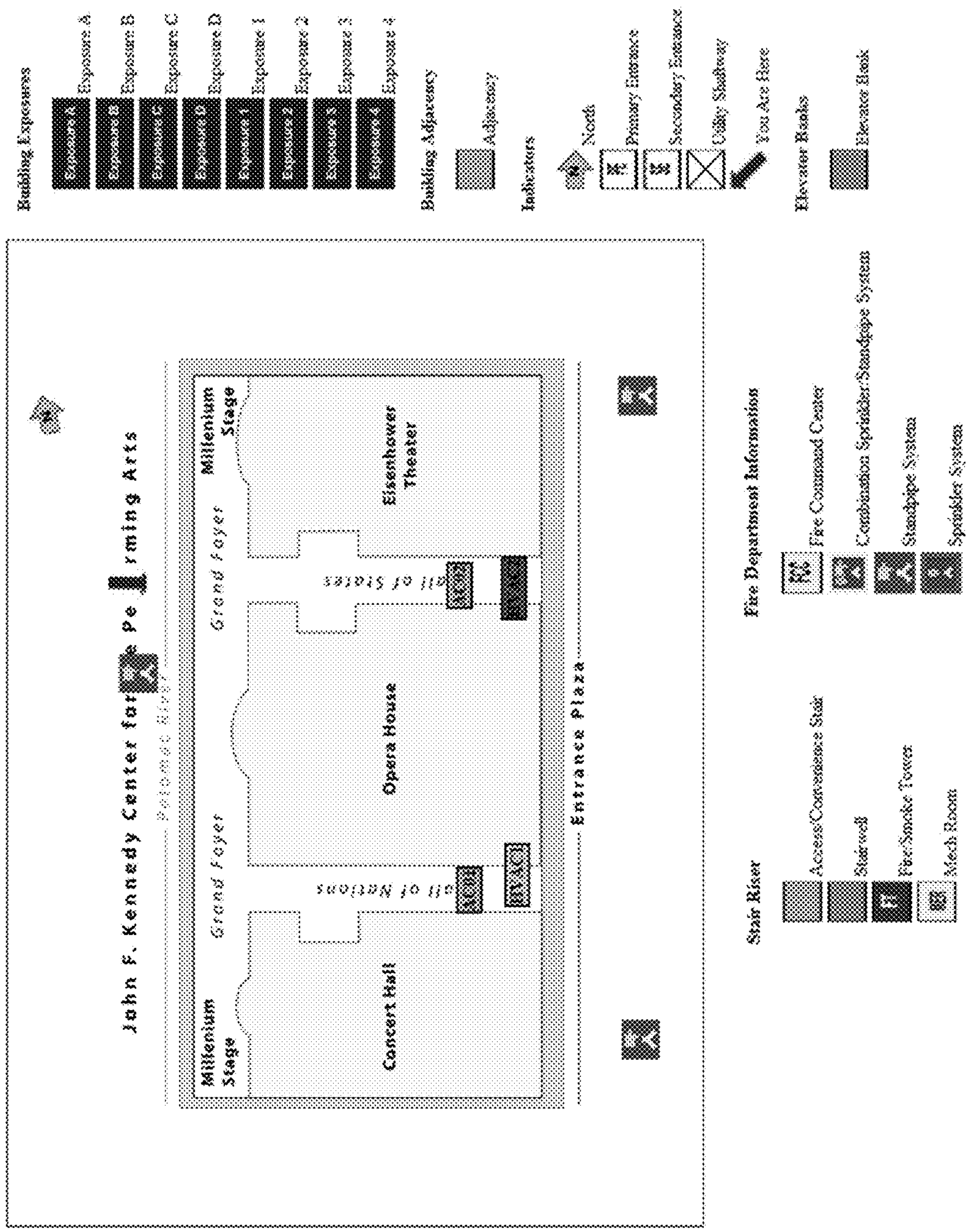
FIGURE 19 - E

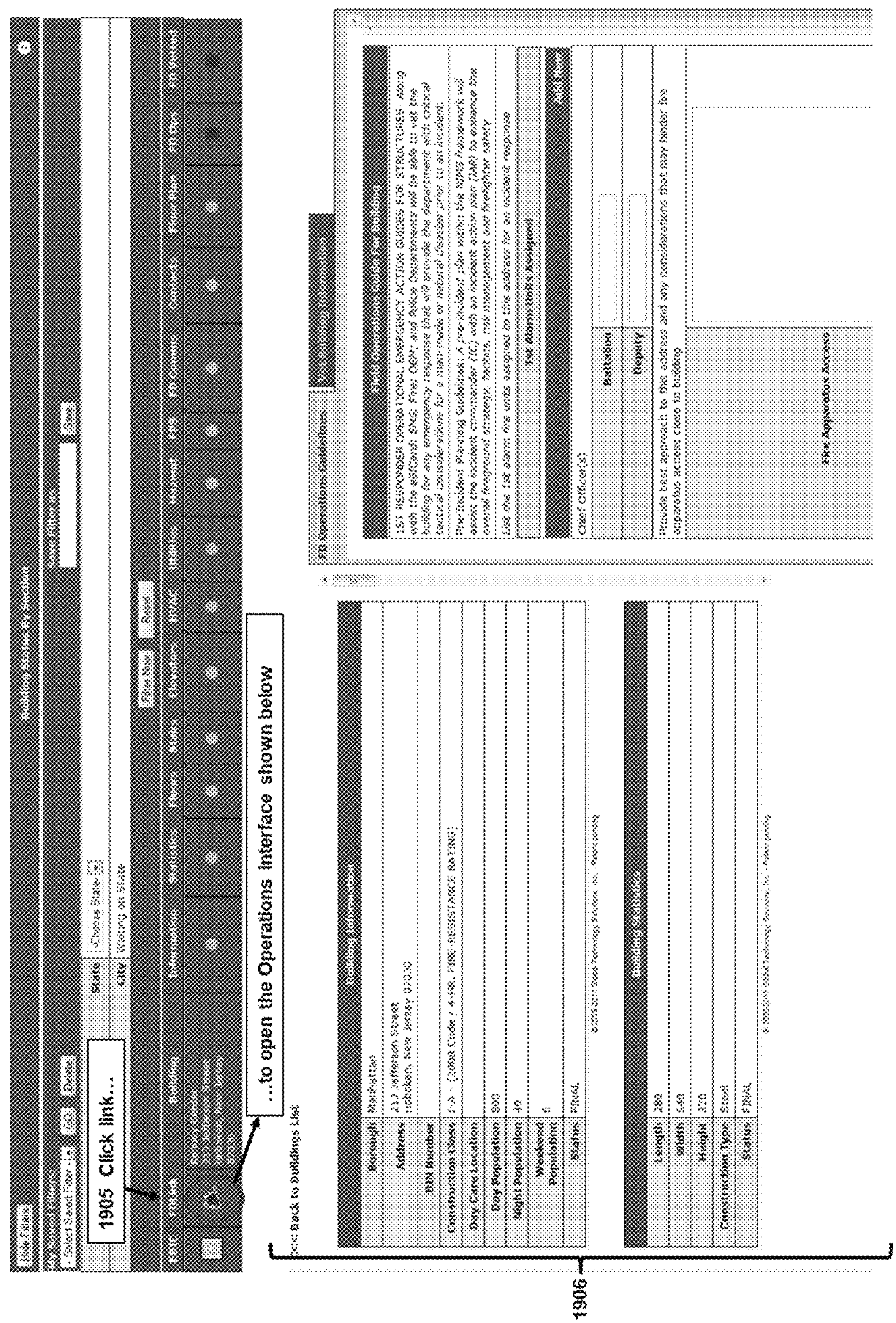
FIGURE 19 - F

| Building Floors Summary | | | | | | | | | |
|---|---|---|---|---|---|---|---|---|---|
| Floor | PWD | OCC | OCC Type | Sprinkler | Grade | HVAC PKGs | Horiz Conn | Setbacks | Truss Constr. |
| Roof | 0 | 0 | - | None | - | NO | - | - | YES |
| 20/MER | 0 | 0 | - | Full | Above Grade | NO | - | - | NO |
| 19/MER | 0 | 0 | - | Full | Above Grade | NO | - | 19th Floor / All Sides | NO |
| 18 | 1 | 100 | Business | Full | Above Grade | YES | - | - | NO |
| 17 | 0 | 120 | Business | Full | Above Grade | YES | - | 17th Floor / Side-D & Side-C | NO |
| 16 | 0 | 100 | Business | Full | Above Grade | YES | - | - | NO |
| 15 | 0 | 100 | Business | Full | Above Grade | YES | - | - | NO |
| 14 | 2 | 175 | Assembly Business | Full | Above Grade | YES | - | - | NO |
| 13 | 0 | 100 | Business | Full | Above Grade | YES | - | - | NO |
| 12 | 0 | 100 | Business | Full | Above Grade | YES | - | - | NO |
| 11 | 0 | 100 | Business | Full | Above Grade | YES | - | - | NO |
| 10/Sky Lobby | 0 | 100 | Business | Full | Above Grade | YES | - | - | NO |

FIGURE 19 - G

| Building Stairwells Summary | | | | | | | |
|---|---|---|---|---|---|---|---|
| Designator | Fire TWR | Pressurized | Roof Access | Floors Serviced | Re-Entry Floors | Floors With Standpipe | Isolation Valve Floors |
| 10th - 13th Floors | NO | NO | NO | S-2 / Garage, S-1 / Garage / Office, Lobby, Mezzanine, 1, 2, 3, 4, 5, 6, 7, 8, 9, 10/Sky Lobby, 11, 12, 13, 14, 15, 16, 17, 18, 19/MER, 20/MER, Roof | 6, 10/Sky Lobby, 14 | S-2 / Garage, S-1 / Garage / Office, Lobby, Mezzanine, 1, 2, 3, 4, 5, 6, 7, 8, 9, 10/Sky Lobby, 11, 12, 13, 14, 15, 16, 17, 18, 19/MER, 20/MER | S-2 / Garage |
| 5th - 6th Floors | NO | NO | NO | S-2 / Garage, S-1 / Garage / Office, Lobby, Mezzanine, 1, 2, 3, 4, 5, 6, 7, 8, 9, 10/Sky Lobby, 11, 12, 13, 14, 15, 16, 17, 18, 19/MER, 20/MER, Roof | 6, 10/Sky Lobby, 14 | S-2 / Garage, S-1 / Garage / Office, Lobby, Mezzanine, 1, 2, 3, 4, 5, 6, 7, 8, 9, 10/Sky Lobby, 11, 12, 13, 14, 15, 16, 17, 18, 19/MER, 20/MER | S-2 / Garage |
| A | NO | YES | NO | S-2 / Garage, S-1 / Garage / Office, Lobby, Mezzanine, 1, 2, 3, 4, 5, 6, 7, 8, 9, 10/Sky Lobby, 11, 12, 13, 14, 15, 16, 17, 18, 19/MER, 20/MER, Roof | 6, 10/Sky Lobby, 14 | S-2 / Garage, S-1 / Garage / Office, Lobby, Mezzanine, 1, 2, 3, 4, 5, 6, 7, 8, 9, 10/Sky Lobby, 11, 12, 13, 14, 15, 16, 17, 18, 19/MER, 20/MER | S-2 / Garage |
| B | NO | YES | YES | S-2 / Garage, S-1 / Garage / Office, Lobby, Mezzanine, 1, 2, 3, 4, 5, 6, 7, 8, 9, 10/Sky Lobby, 11, 12, 13, 14, 15, 16, 17, 18, 19/MER, 20/MER, Roof | 6, 10/Sky Lobby, 14 | S-2 / Garage, S-1 / Garage / Office, Lobby, Mezzanine, 1, 2, 3, 4, 5, 6, 7, 8, 9, 10/Sky Lobby, 11, 12, 13, 14, 15, 16, 17, 18, 19/MER, 20/MER | S-2 / Garage |
| C | NO | NO | NO | S-2 / Garage, S-1 / Garage / Office, Lobby, Mezzanine, 1, 2, 3, 4, 5, 6, 7, 8, 9, 10/Sky | 6, 10/Sky | S-2 / Garage, S-1 / Garage / Office, Lobby, Mezzanine, 1, 2, 3, 4, 5, | S-2 / |

FIGURE 19 - H

| Building Elevator Banks Summary | | | | | | | | |
|---|---|---|---|---|---|---|---|---|
| Bank | Type | Car | Freight | Floors Serviced | Blind Shaft Floors | Sky-Lobby Floors | Machine Room Floors | Pit-Room Floors |
| PE 1 / PE-4 | Mid-Rise | 1 | NO | Lobby, Mezzanine, 1, 2, 3, 4, 5, 6, 7, 8, 9, 10/Sky Lobby, 12 | 12, 13 | 10/Sky Lobby | 13 | S-1 / Garage / Office |
| PE 1 / PE-4 | Mid-Rise | 2 | NO | Lobby, Mezzanine, 1, 2, 3, 4, 5, 6, 7, 8, 9, 10/Sky Lobby | 13 | 10/Sky Lobby | 13 | S-1 / Garage / Office |
| PE 1 / PE-4 | Mid-Rise | 3 | NO | Lobby, Mezzanine, 1, 2, 3, 4, 5, 6, 7, 8, 9, 10/Sky Lobby | 13 | 10/Sky Lobby | 13 | S-1 / Garage / Office |
| PE 1 / PE-4 | Mid-Rise | 4 | NO | Lobby, Mezzanine, 1, 2, 3, 4, 5, 6, 7, 8, 9, 10/Sky Lobby | 13 | 10/Sky Lobby | 13 | S-1 / Garage / Office |
| PE-5 / PE-6 | Hi-Rise | 4 | NO | S-2 / Garage, S-1 / Garage / Office, Lobby, 10/Sky Lobby, 11, 12, 13, 14, 15, 16, 17, 18 | Mezzanine, 1, 2, 3, 4, 5, 6, 7, 8, 9 | 10/Sky Lobby | 19/MER | S-2 / Garage |
| PE-5 / PE-6 | Hi-Rise | 5 | NO | S-2 / Garage, S-1 / Garage / Office, Lobby, 10/Sky Lobby, 11, 12, 13, 14, 15, 16, 17, 18 | Mezzanine, 1, 2, 3, 4, 5, 6, 7, 8, 9 | 10/Sky Lobby | 19/MER | S-2 / Garage |
| PE-7 / PE-8 | Hi-Rise | 7 | NO | S-2 / Garage, S-1 / Garage / Office, Lobby, 10/Sky Lobby, 11, 12, 13, 14, 15, 16, 17, 18 | Mezzanine, 1, 2, 3, 4, 5, 6, 7, 8, 9 | - | 19/MER | S-2 / Garage |
| PE-7 | | | | | Mezzanine, | | | |

FIGURE 19 - I

Building Ventilation Summary

| Designator | Floors Serviced | Mechanical Room |
|---|---|---|
| Mezz / 2 units | S-1 / Garage / Office, Lobby, Mezzanine, 1, 2, 3, 4, 5, 6, 7, 8, 9, 10/Sky Lobby, 11, 12, 13, 14, 15, 16, 17, 18 | |
| Lobby / 2 units | S-1 / Garage / Office, Lobby, Mezzanine, 1, 2, 3, 4, 5, 6, 7, 8, 9, 10/Sky Lobby, 11, 12, 13, 14, 15, 16, 17, 18 | |
| S-1 / 1 Unit | S-1 / Garage / Office, Lobby, Mezzanine, 1, 2, 3, 4, 5, 6, 7, 8, 9, 10/Sky Lobby, 11, 12, 13, 14, 15, 16, 17, 18 | |
| Zone-1 /1 to 5 | S-1 / Garage / Office, Lobby, Mezzanine, 1, 2, 3, 4, 5, 6, 7, 8, 9, 10/Sky Lobby, 11, 12, 13, 14, 15, 16, 17, 18 | |
| Zone-2 / 6 to 10 | S-1 / Garage / Office, Lobby, Mezzanine, 1, 2, 3, 4, 5, 6, 7, 8, 9, 10/Sky Lobby, 11, 12, 13, 14, 15, 16, 17, 18 | |
| Zone-3 /11 to18 | S-1 / Garage / Office, Lobby, Mezzanine, 1, 2, 3, 4, 5, 6, 7, 8, 9, 10/Sky Lobby, 11, 12, 13, 14, 15, 16, 17, 18 | |

© 2008-2011 Global Technology Solutions, Inc. - Patent pending

Building Utilities

| | |
|---|---|
| Electrical Shutoff Location | S-2 off Elev FE-9 |
| Water Shutoff Location | S-2 off Elev S |
| NaturalGas | Yes |
| Natural Gas Shutoff Location | S-2 off Elev S |
| Steam Service | Yes |

FIGURE 19 - J

| | |
|---|---|
| Steam Service | Yes |
| Steam Shutoff Location | MER West Rms off Elev 9 all floors |

© 2008-2011 Global Technology Solutions, Inc. - Patent pending

Building Hazmat, Fuel, Storage Summary

| Item Name | Floor | Location | Qty Of Units | Unit Of Measure | State | Hazmat Info |
|---|---|---|---|---|---|---|
| Diesel Fuel | Roof | 19th MER Rm. | 50 | Gallons | Liquid | NOT HAZARDOUS |
| Diesel Fuel | S-1 / Garage / Office | Exterior/Side-C/Underground | 10000 | Gallons | Liquid | NOT HAZARDOUS |
| Diesel Fuel | S-2 / Garage | Riser Pipe S-2 to Roof | 500 | Gallons | Liquid | NOT HAZARDOUS |

© 2008-2011 Global Technology Solutions, Inc. - Patent pending

Fire Protection Systems Summary

Pre-Action System

| Has Preaction | Location |
|---|---|
| Yes | 3rd floor behind elevator 2 |

Standpipes Not In Stairwells

| Floor(s) | Location |
|---|---|
| 1,2,3 | SW front corner |

FIGURE 19 - K

| | |
|---|---|
| 3 | NE Corner |

Standpipe PRV Valves Not In Stairwells

| Floor(s) | Location |
|---|---|
| 2 | Stairs |

Fire Pump(s)

| GPM | Location |
|---|---|
| 230 | Basement |

Fire Extinguishing Systems

| Type | Location |
|---|---|
| Fire Extinguisher | 2nd Floor Landing |

© 2008-2011 Global Technology Solutions, Inc. - Patent pending

Building Communications

| | |
|---|---|
| Number of Radios | 25 |
| 24 Hour Locations | Main Office |
| Other Comms Available to FD | None |

© 2008-2011 Global Technology Solutions, Inc. - Patent pending

FIGURE 19 - L

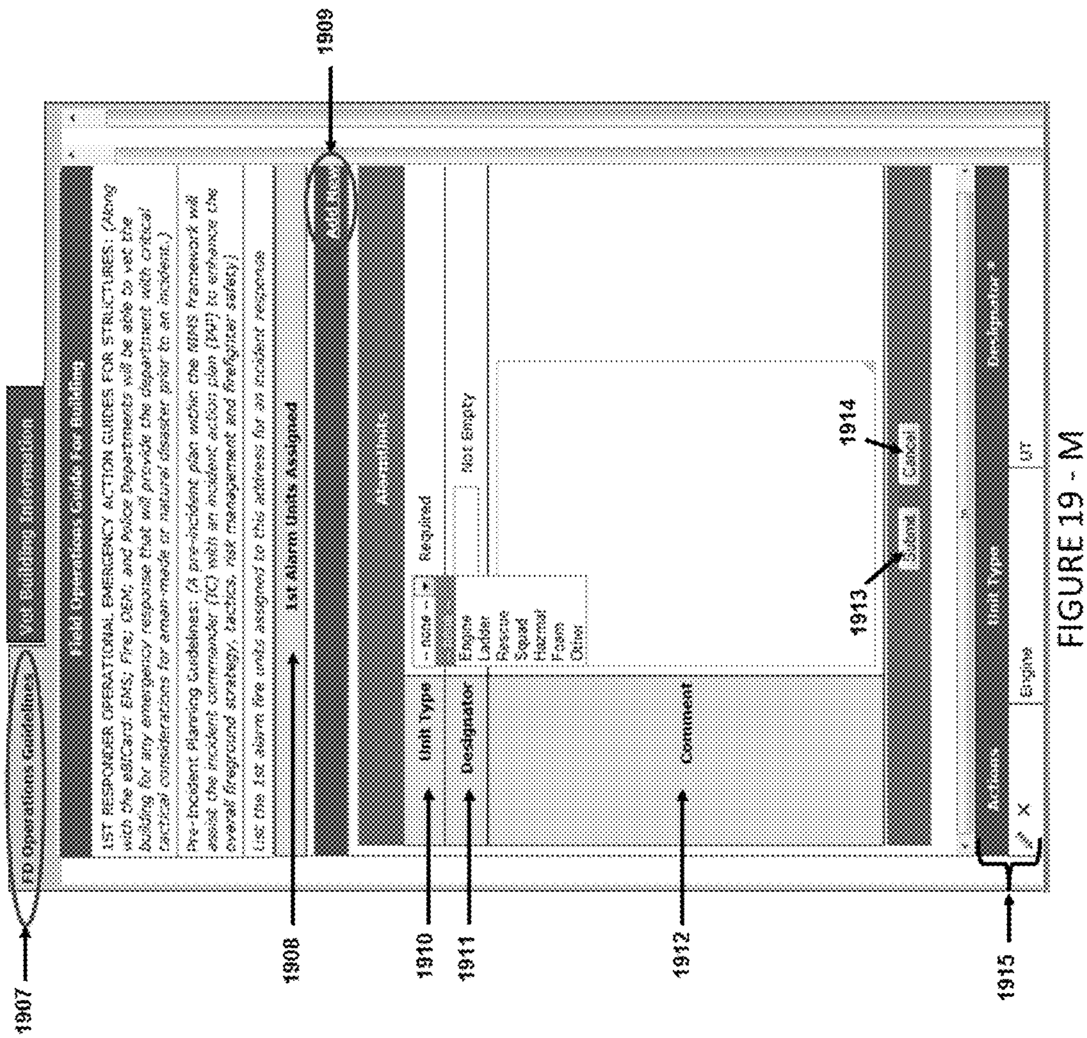
FIGURE 19 - M

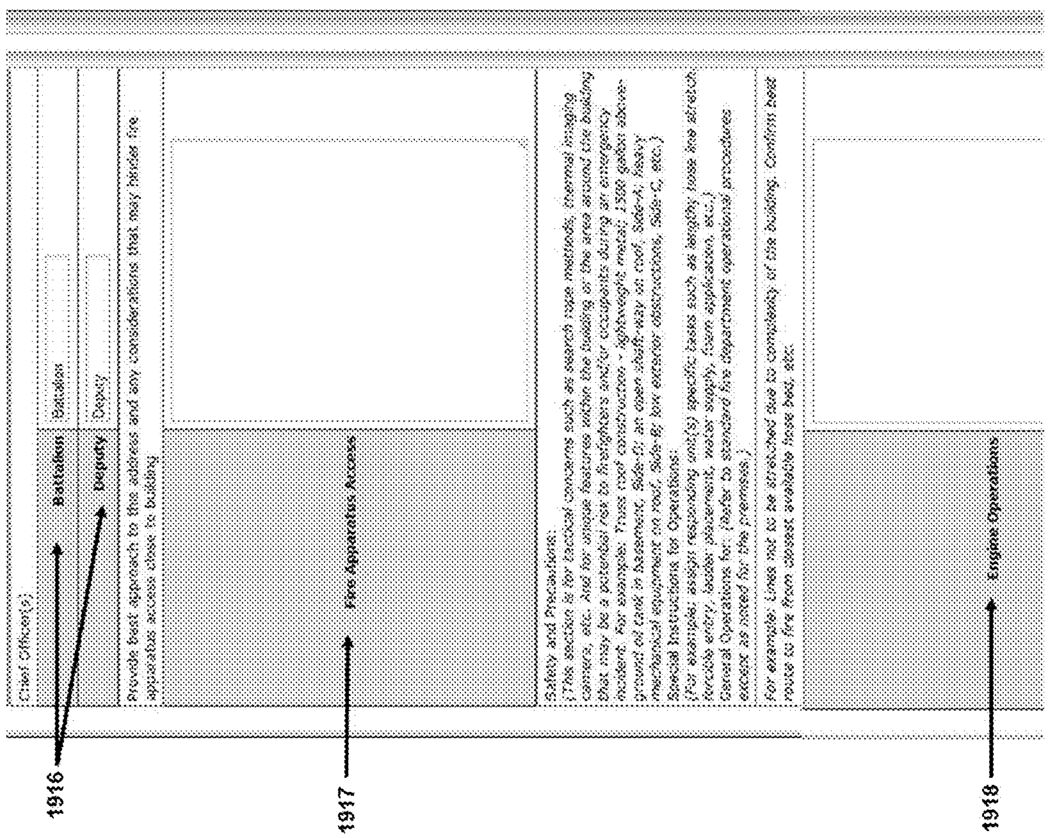
FIGURE 19 - N

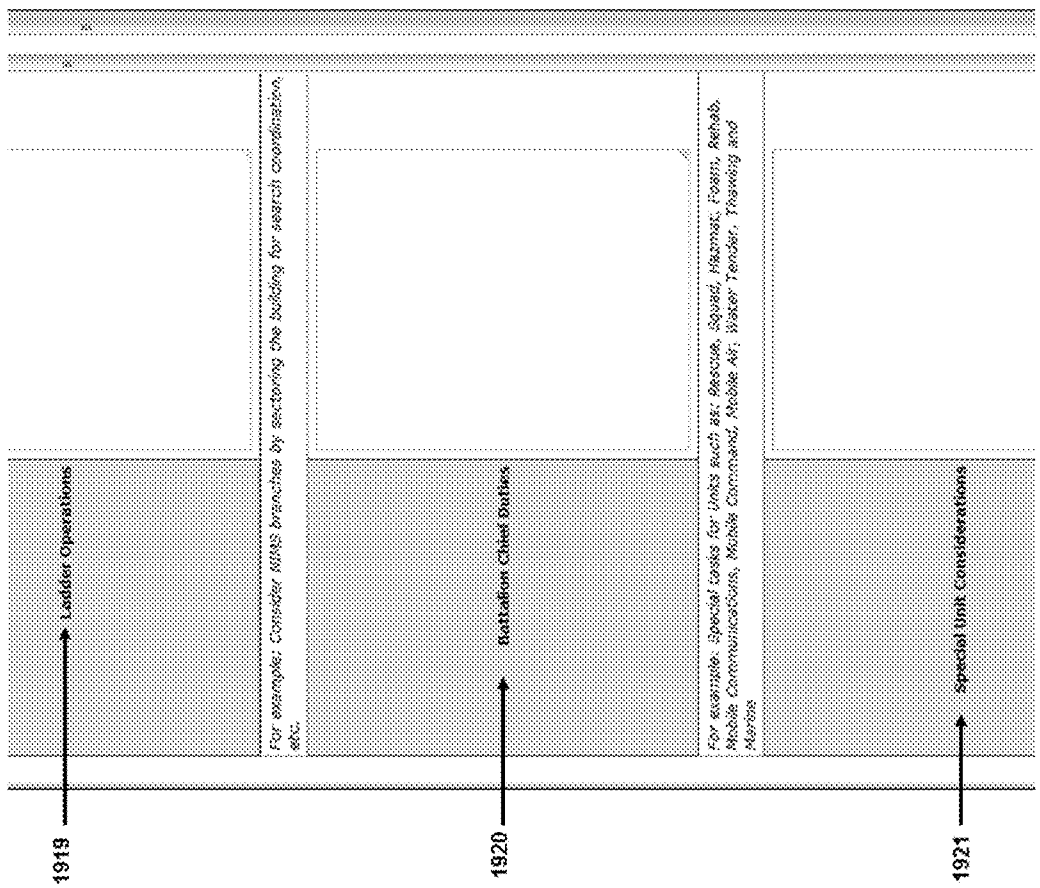
FIGURE 19 - O

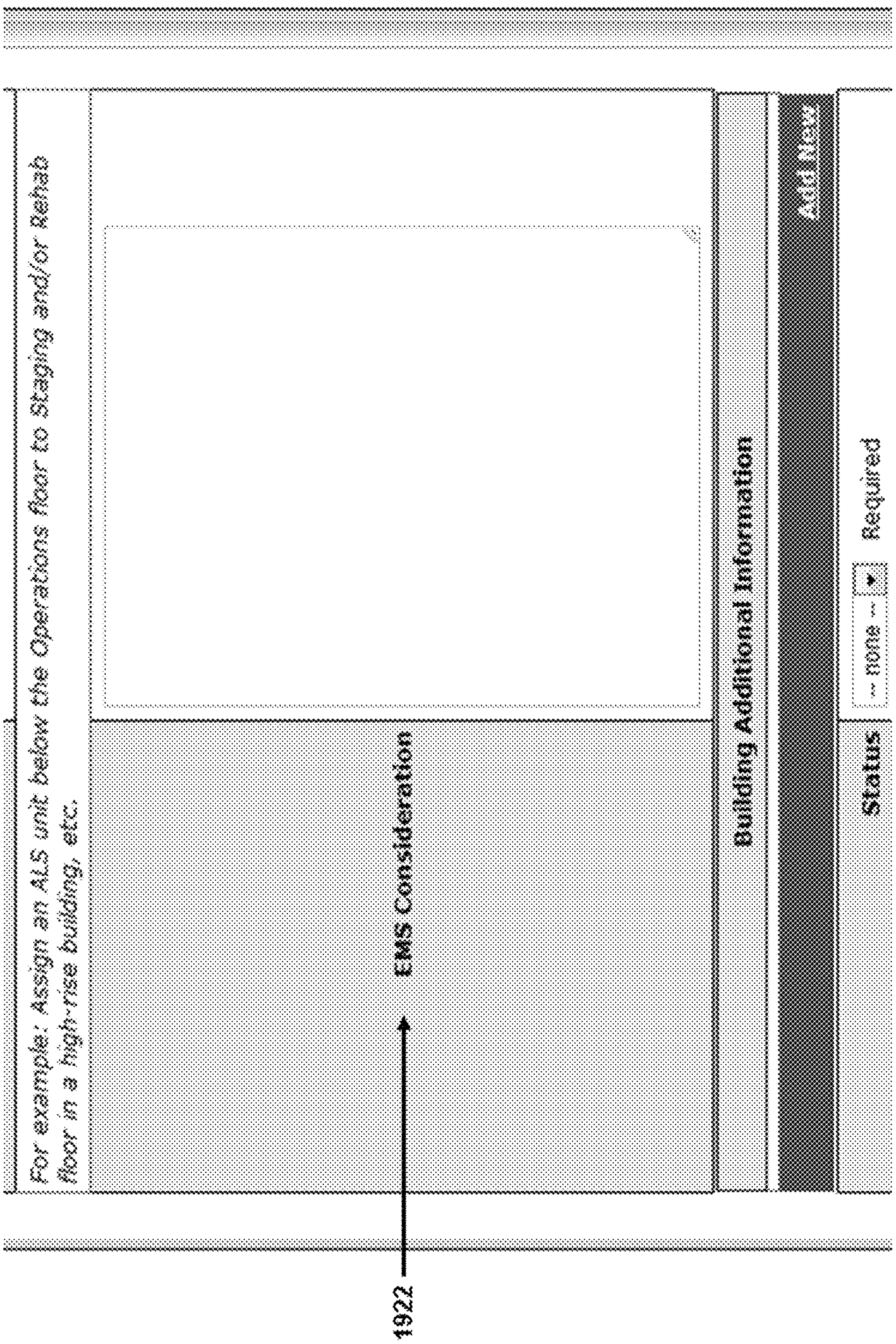
FIGURE 19 - P

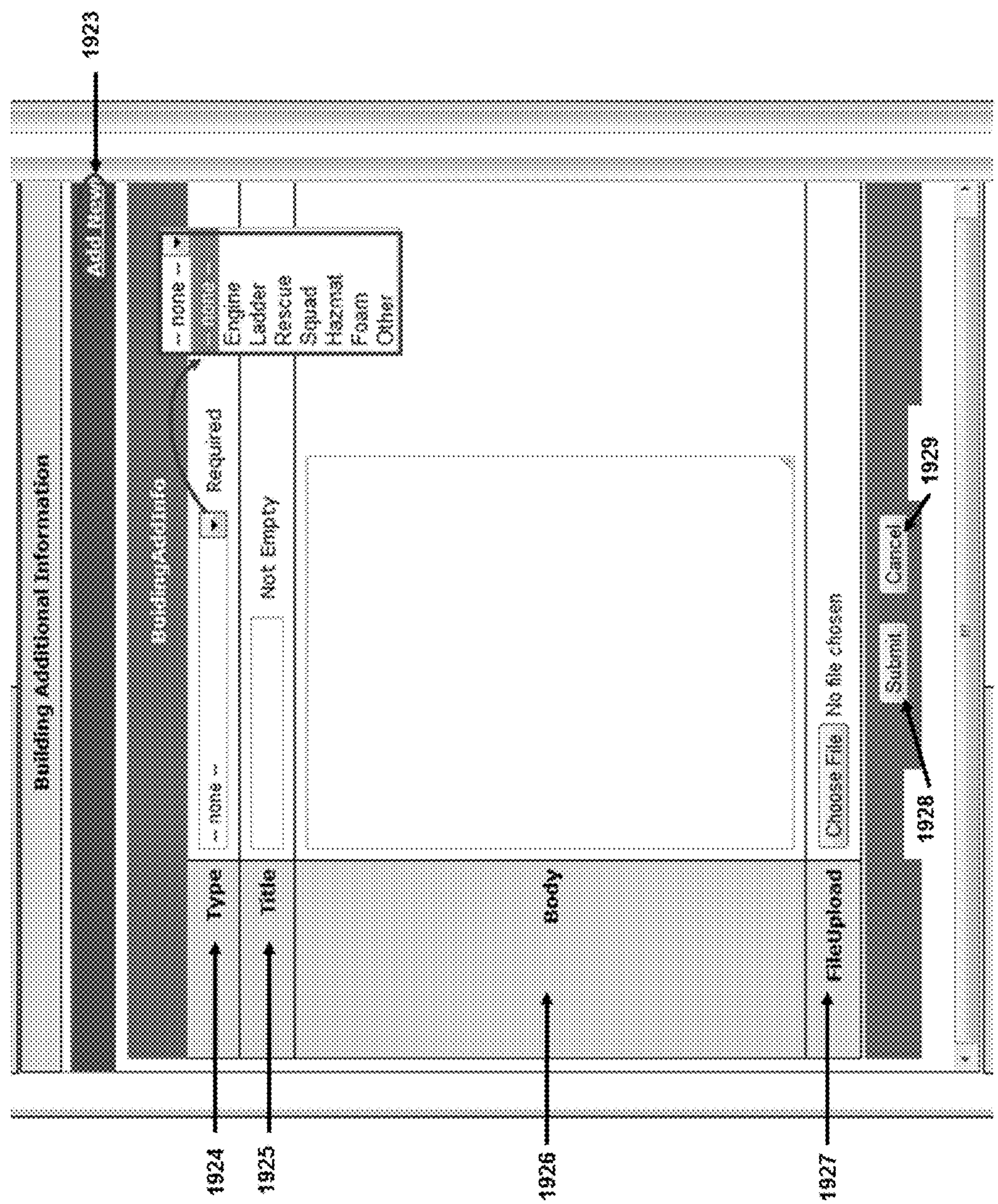
FIGURE 19 - Q

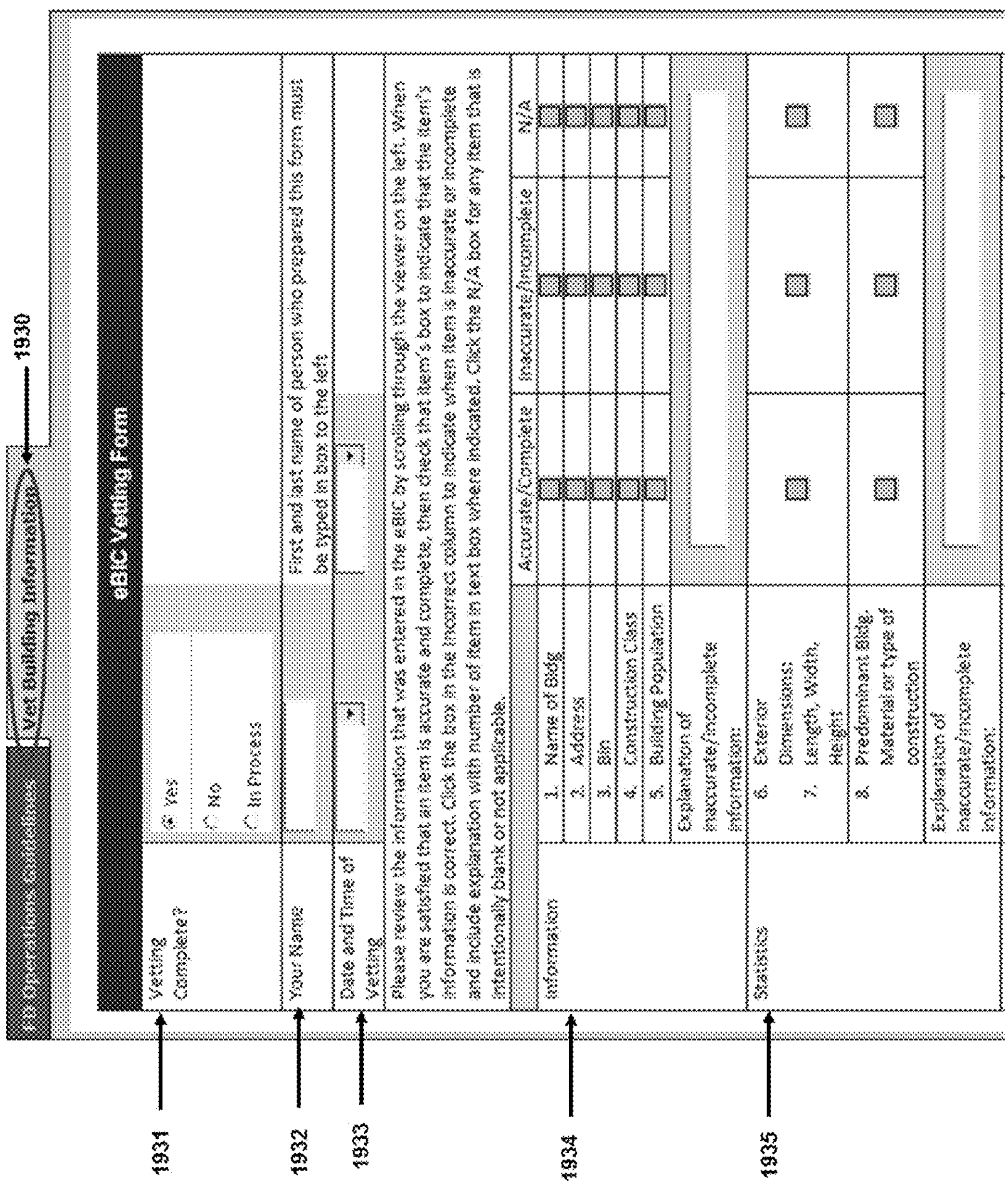
FIGURE 19 - R

1936 → Vertical Riser Design
1937 → Stairwell Info
1938 → Elevator Banks

| | | Accurate/Complete | Inaccurate/Incomplete | N/A |
|---|---|---|---|---|
| Vertical Riser Design | 9. Floor Names/Numbers | ☐ | ☐ | ☐ |
| | 10. PWD Count | ☐ | ☐ | ☐ |
| | 11. Occupancy Load | ☐ | ☐ | ☐ |
| | 12. HVAC Pkg Units | ☐ | ☐ | ☐ |
| | 13. Sprinkler Systems | ☐ | ☐ | ☐ |
| | 14. Occupancy Type | ☐ | ☐ | ☐ |
| | 15. Grade(s) | ☐ | ☐ | ☐ |
| | 16. Horizontal Connections | ☐ | ☐ | ☐ |
| | 17. Roof Setbacks | ☐ | ☐ | ☐ |
| | 18. Truss Construction | ☐ | ☐ | ☐ |
| | Explanation of inaccurate/incomplete information: | | | |
| Stairwell Info | 19. Designators | ☐ | ☐ | ☐ |
| | 20. Access Stairs | ☐ | ☐ | ☐ |
| | 21. Fire Tower | ☐ | ☐ | ☐ |
| | 22. Pressurized | ☐ | ☐ | ☐ |
| | 23. Roof Access | ☐ | ☐ | ☐ |
| | 24. Floors Serviced | ☐ | ☐ | ☐ |
| | 25. Re-Entry Floors | ☐ | ☐ | ☐ |
| | 26. Floors with STDP in stairwell | ☐ | ☐ | ☐ |
| | 27. Isolation Valve Floors | ☐ | ☐ | ☐ |
| | Explanation of inaccurate/incomplete information: | | | |
| Elevator Banks | 28. Designators | ☐ | ☐ | ☐ |
| | 29. Cars Quantity | ☐ | ☐ | ☐ |
| | 30. Bank Type | ☐ | ☐ | ☐ |
| | 31. Floors Serviced | ☐ | ☐ | ☐ |
| | 32. Blind Shaft Floors | ☐ | ☐ | ☐ |
| | 33. Sky Lobby Floors | ☐ | ☐ | ☐ |
| | 34. Machine Room Floors | ☐ | ☐ | ☐ |
| | 35. Pit Room Floors | ☐ | ☐ | ☐ |
| | 36. Freight Elevator(s) Info | ☐ | ☐ | ☐ |
| | Explanation of inaccurate/incomplete information: | | | |

FIGURE 19 - S

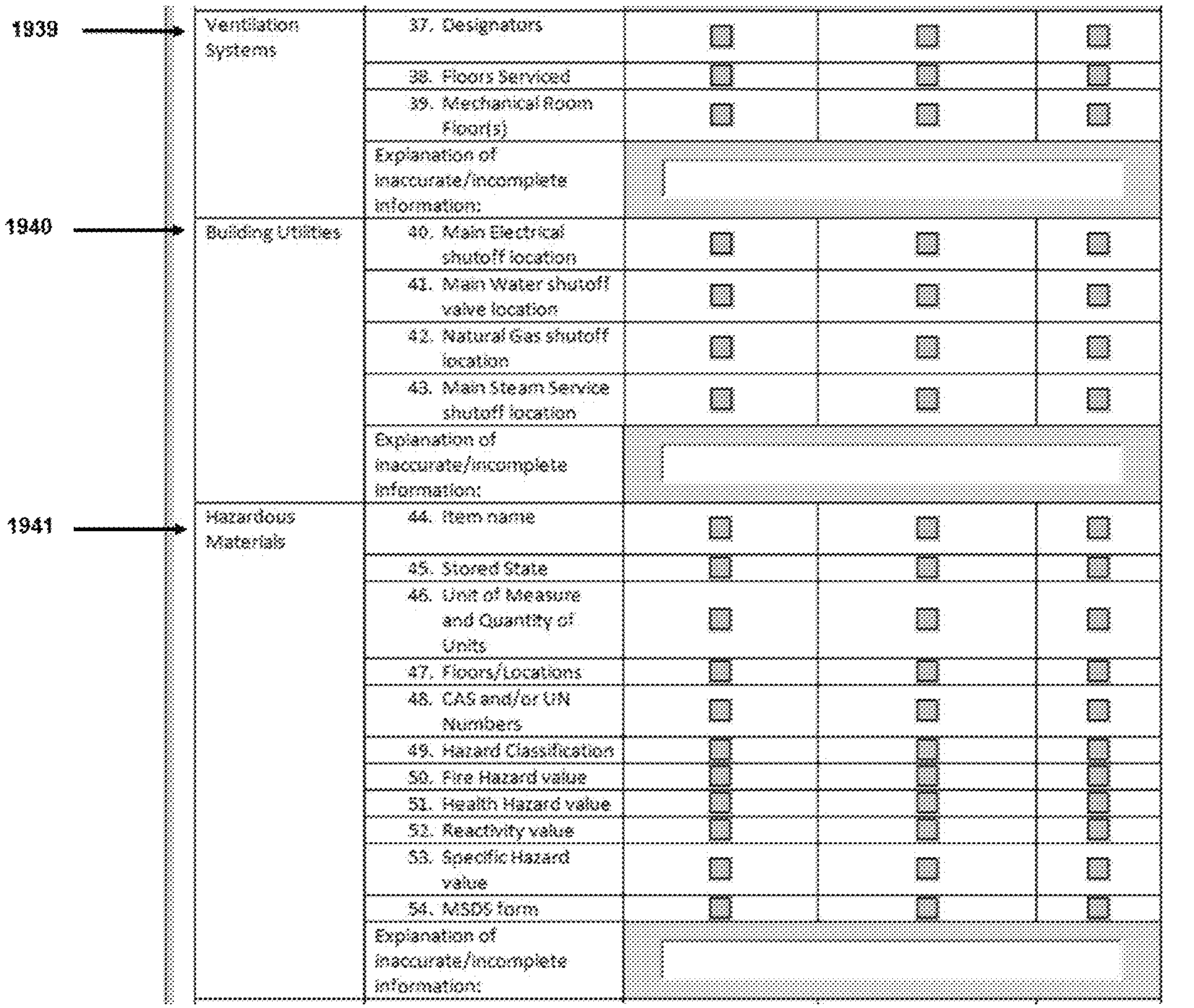
FIGURE 19 - T

| | | | | | |
|---|---|---|---|---|---|
| 1942 → | Fire Protection Systems (FPS) | 55. Locations/Floors of standpipes [STDP]not in stairwells | ☐ | ☐ | ☐ |
| | | 56. STDP isolation valve locations (not in stairwells) | ☐ | ☐ | ☐ |
| | | 57. PRV valve floor locations | ☐ | ☐ | ☐ |
| | | 58. Pre-Action System info | ☐ | ☐ | ☐ |
| | | 59. Fire Pump info | ☐ | ☐ | ☐ |
| | | 60. Fire Extinguishing System | ☐ | ☐ | ☐ |
| | | Explanation of inaccurate/incomplete information: | | | |
| 1943 → | Communications | 61. Number of radios for on-site First Responder use | ☐ | ☐ | ☐ |
| | | 62. 24-hour storage location of radios for emergency use | ☐ | ☐ | ☐ |
| | | 63. Any other communication tools available | ☐ | ☐ | ☐ |
| | | | Accurate/Complete | Inaccurate/Incomplete | N/A |
| 1944 → | Emergency Contacts | 64. Name | ☐ | ☐ | ☐ |
| | | 65. Position | ☐ | ☐ | ☐ |
| | | 66. Work phone number | ☐ | ☐ | ☐ |
| | | 67. Emergency phone number | ☐ | ☐ | ☐ |
| | | Explanation of inaccurate/incomplete information: | | | |

FIGURE 19 - U

| | | | | | |
|---|---|---|---|---|---|
| 1945 | Bldg. Base Floor Plan -- Graph | 68. Review uploaded floor plan and ensure markups are correct | ☐ | ☐ | ☐ |
| | | Explanation of inaccurate/incomplete information: | | | |
| 1946 | Temporary Considerations and Response Impairments | Construction Projects and/or Out of Service Systems: | | | |
| | | 69. Contact person | ☐ | ☐ | ☐ |
| | | 70. Affected System | ☐ | ☐ | ☐ |
| | | 71. Description of outage or hindrance | ☐ | ☐ | ☐ |
| | | 72. Area Affected | ☐ | ☐ | ☐ |
| | | 73. Start/End Date/Time of project and/or impairment | ☐ | ☐ | ☐ |
| | | 74. Primary Occupancy type of affected area | ☐ | ☐ | ☐ |
| | | 75. Status | ☐ | ☐ | ☐ |
| | | Explanation of inaccurate/incomplete information: | | | |

FIGURE 19 - V

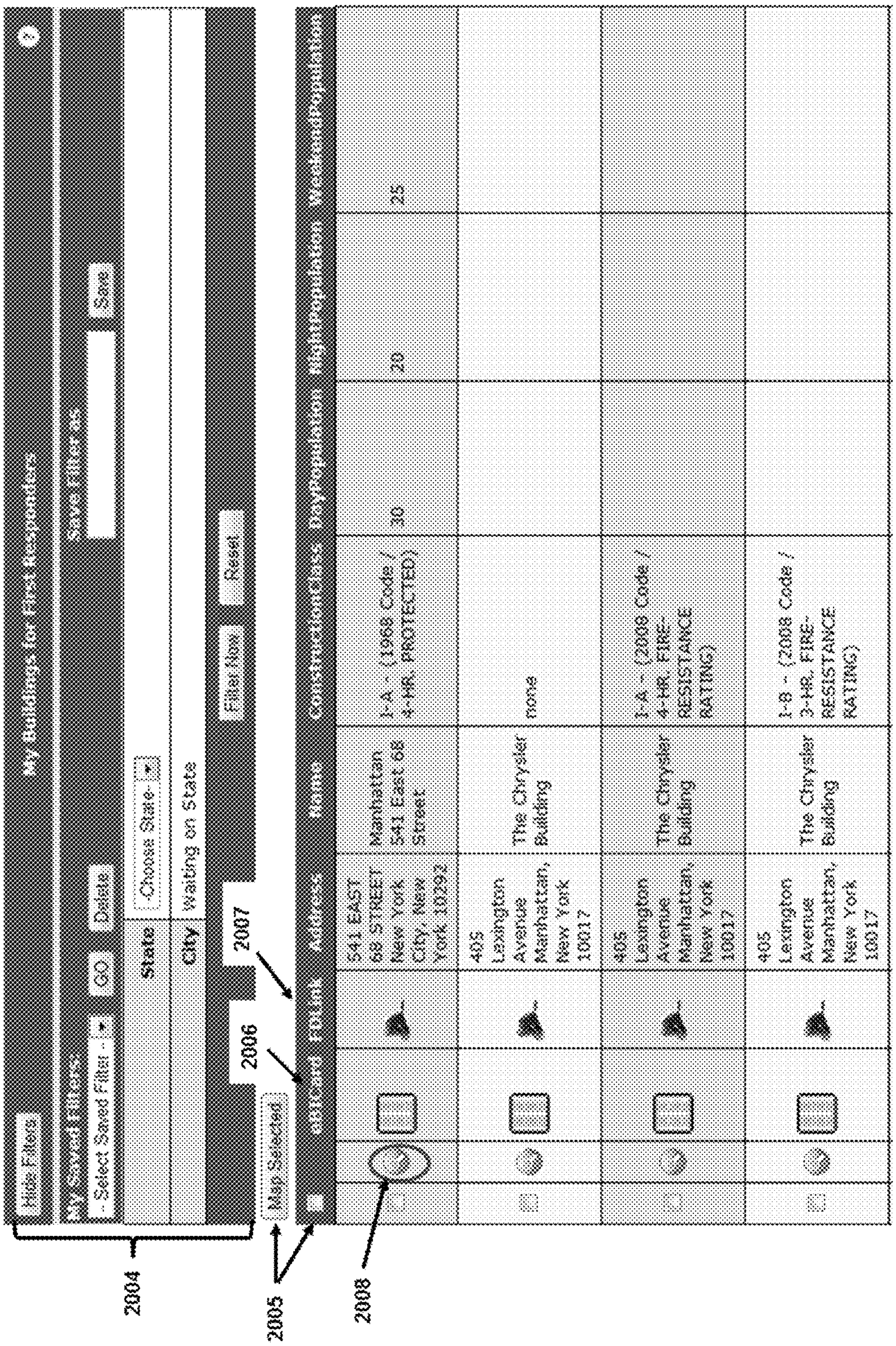
FIGURE 20 - A

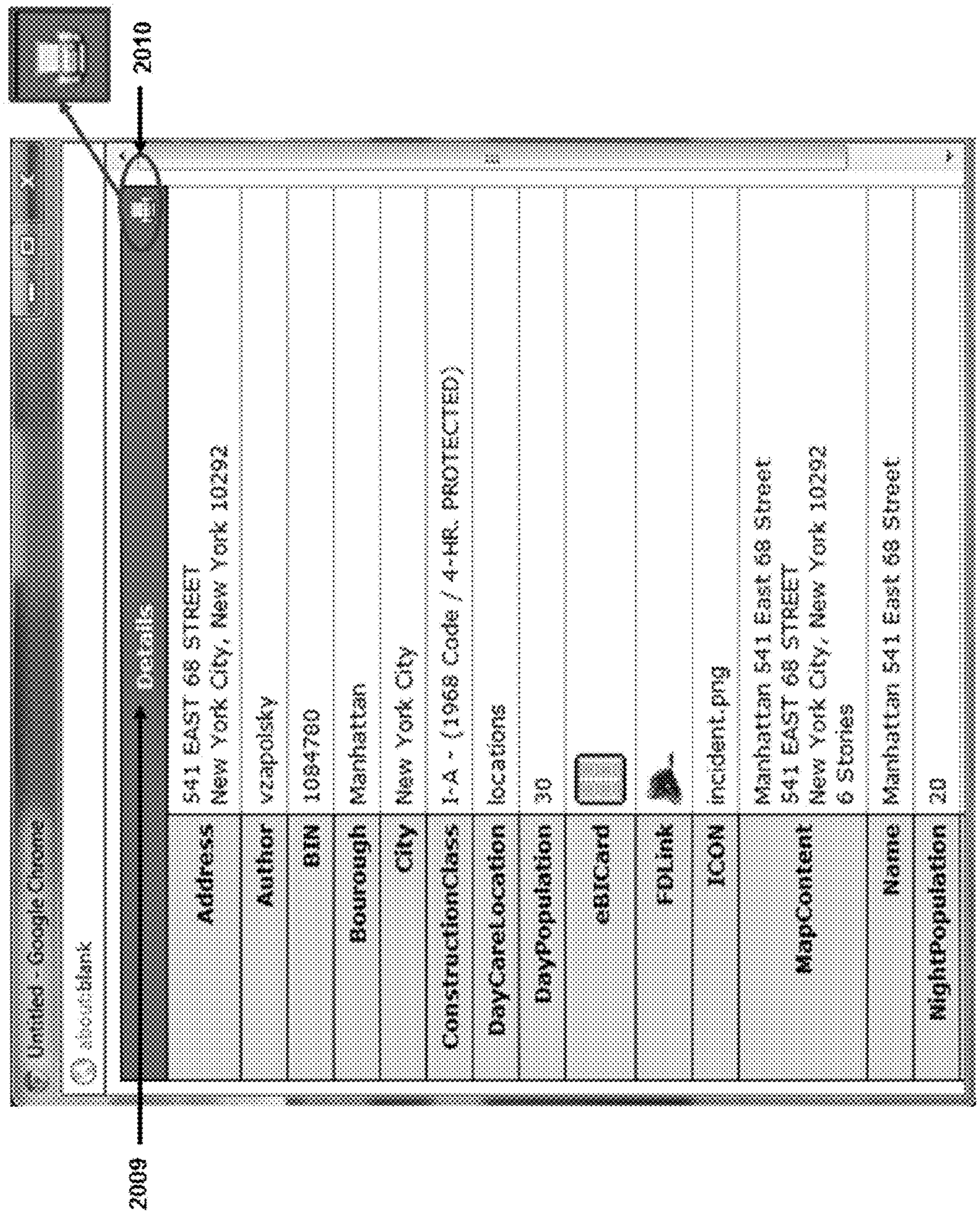
FIGURE 20 - B

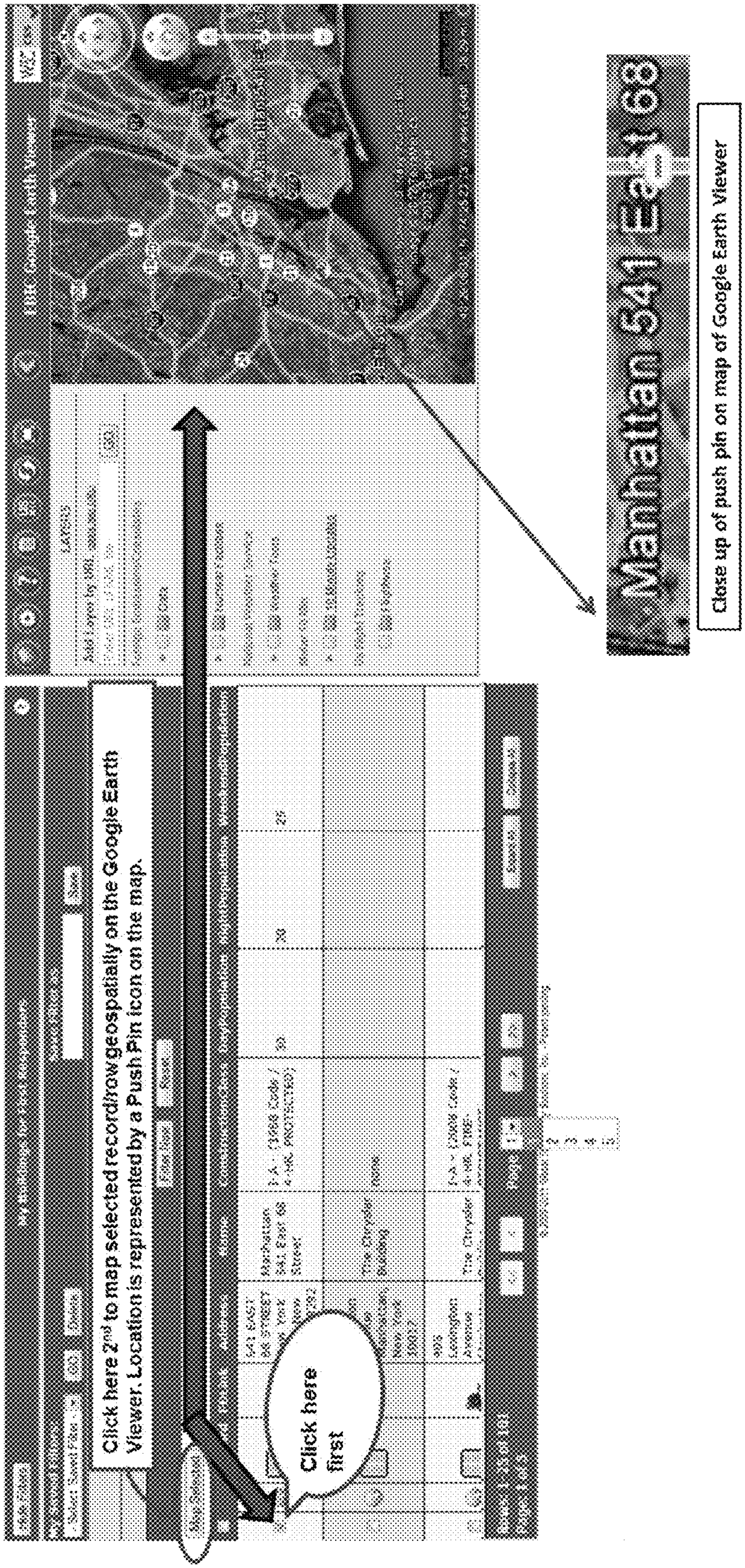
FIGURE 20 - C

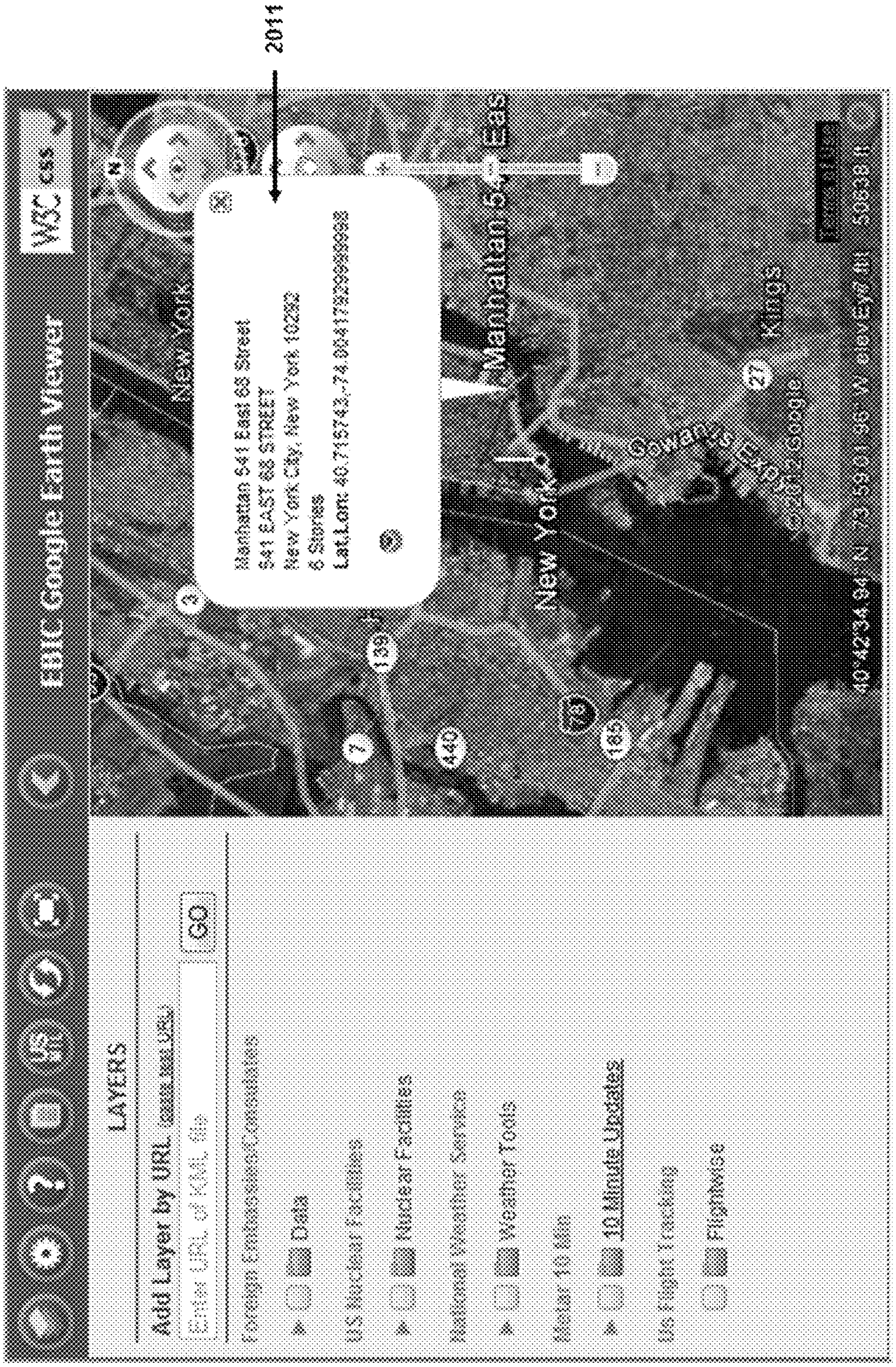
FIGURE 20 - D

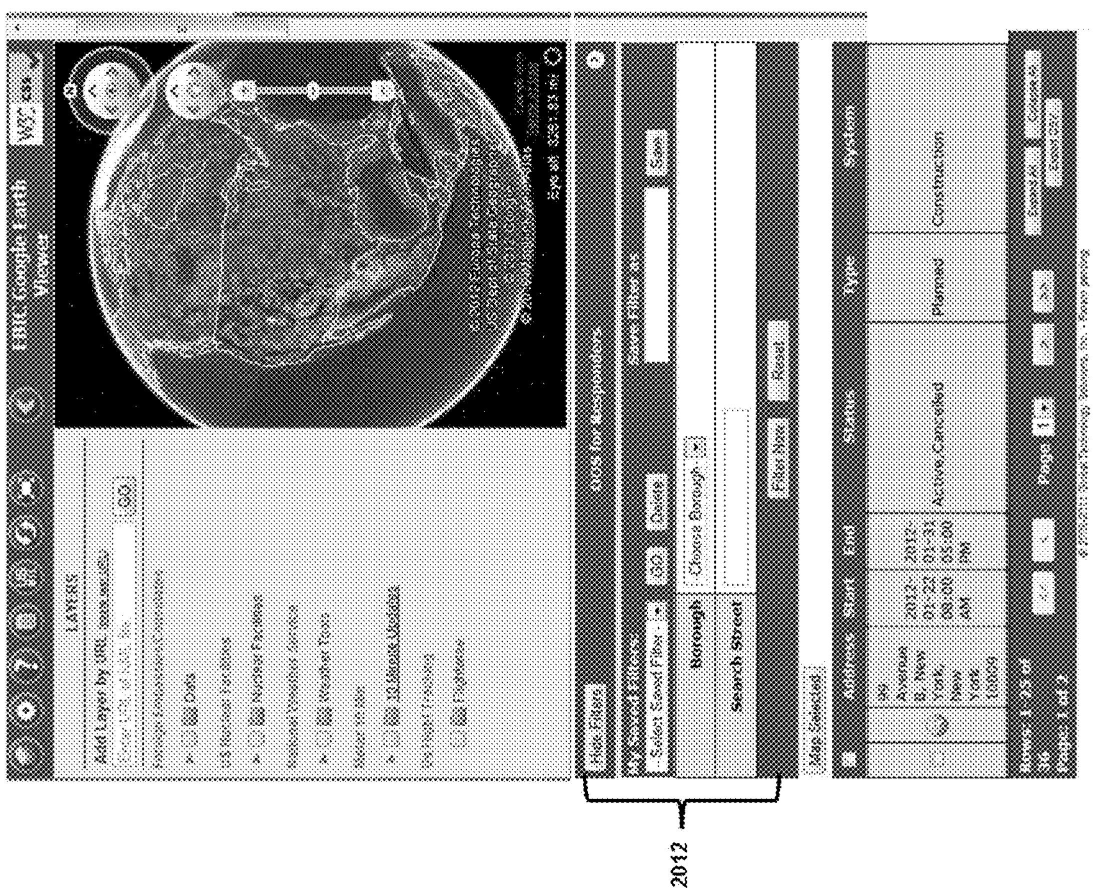
FIGURE 20 - E

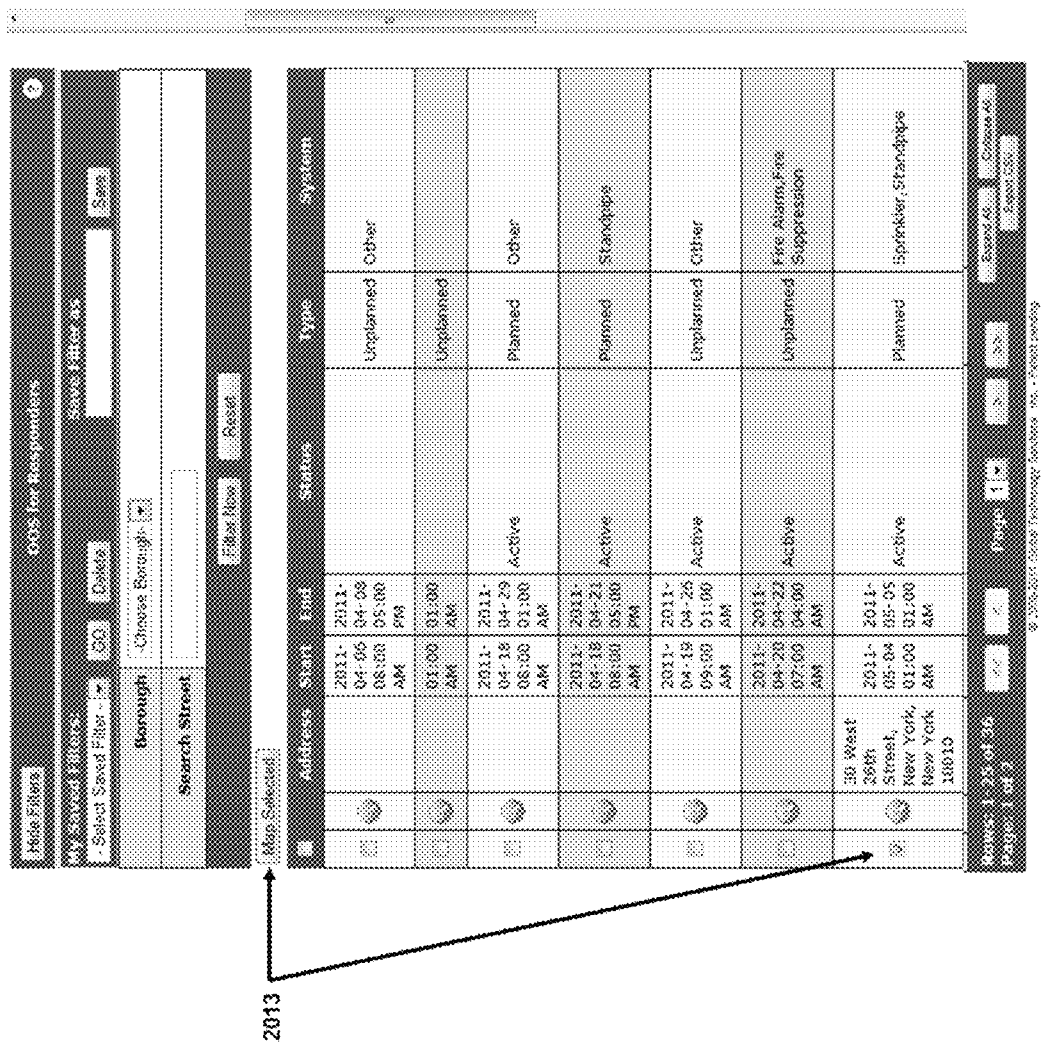
FIGURE 20 - F

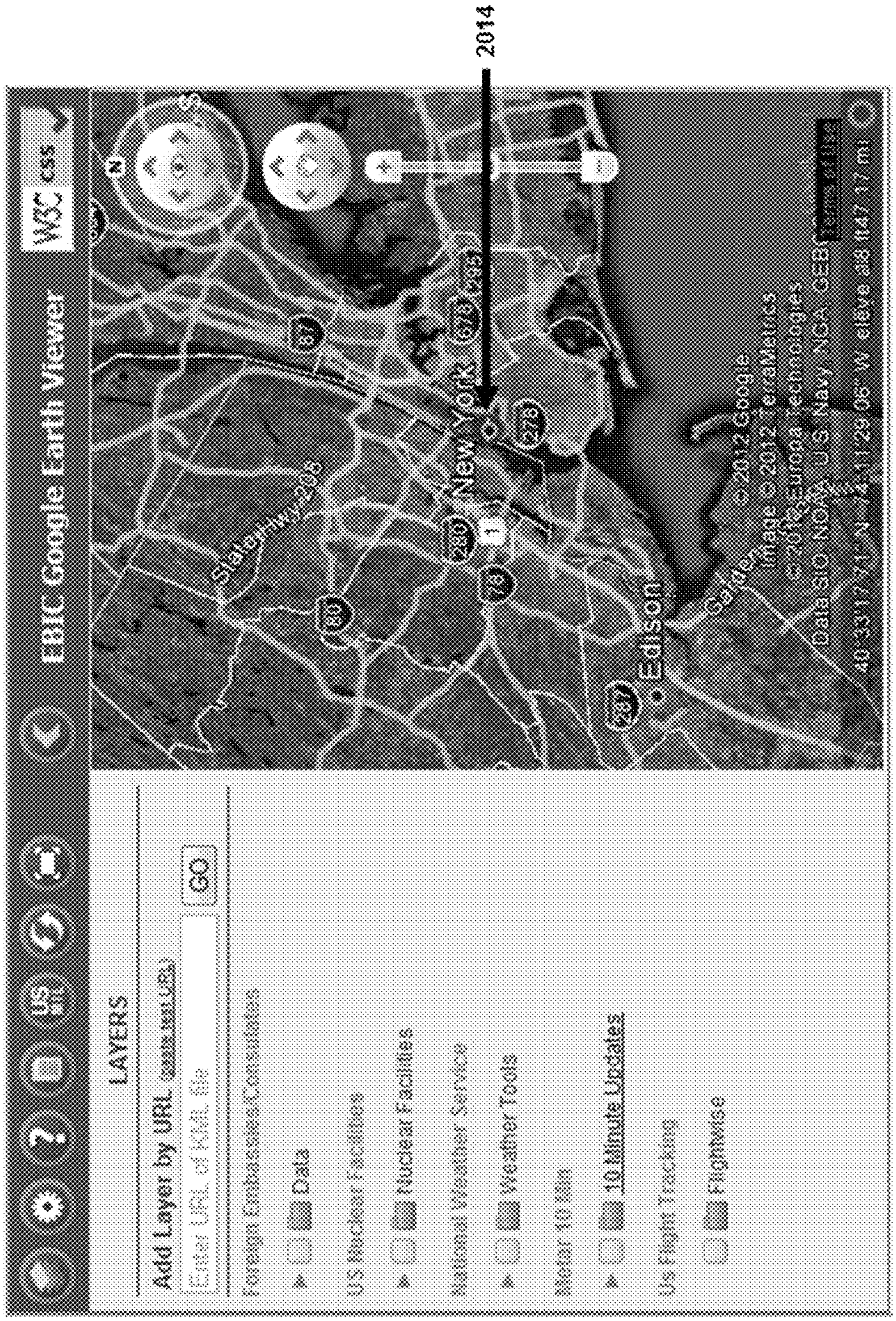
FIGURE 20 - G

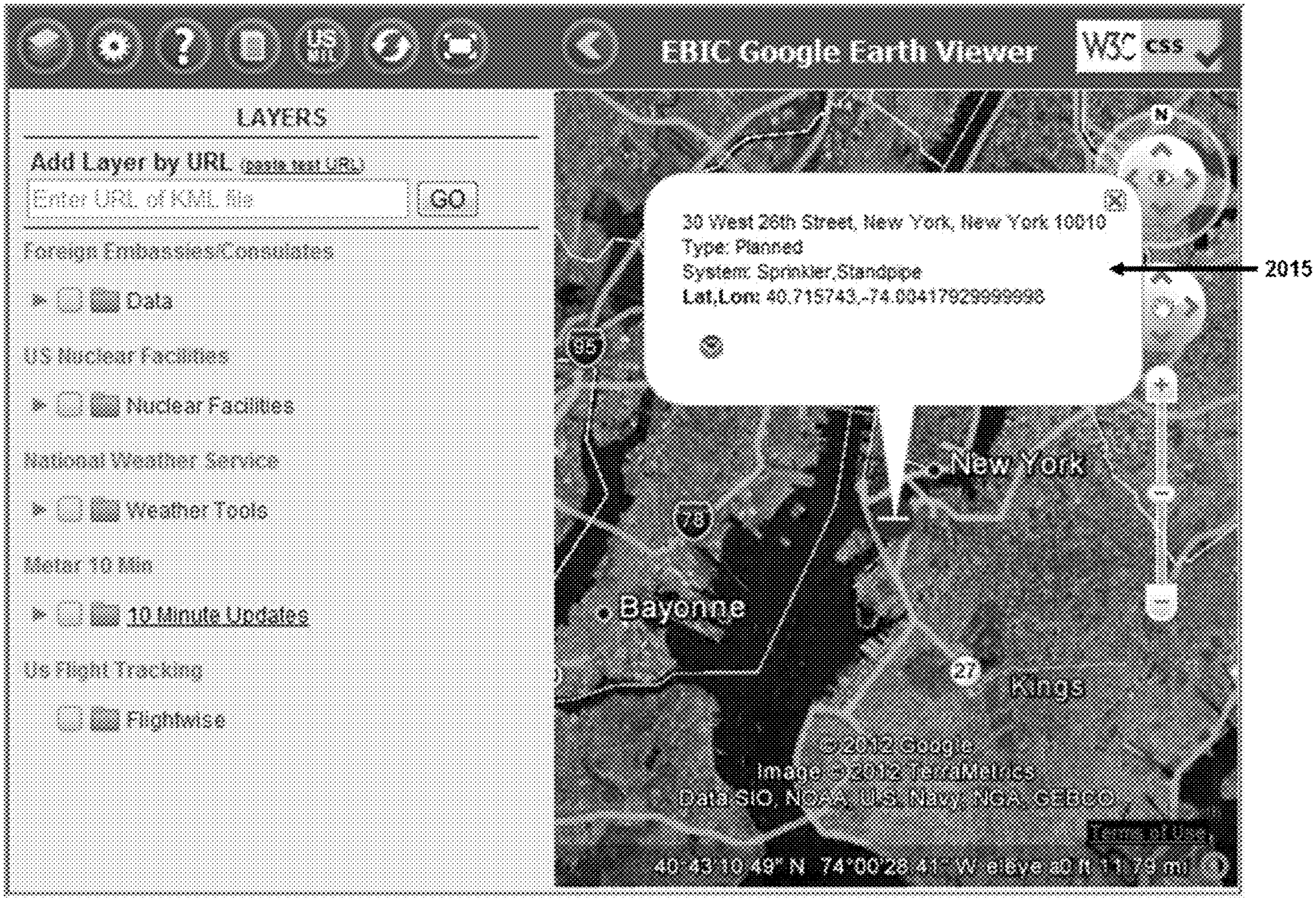
FIGURE 20 - H

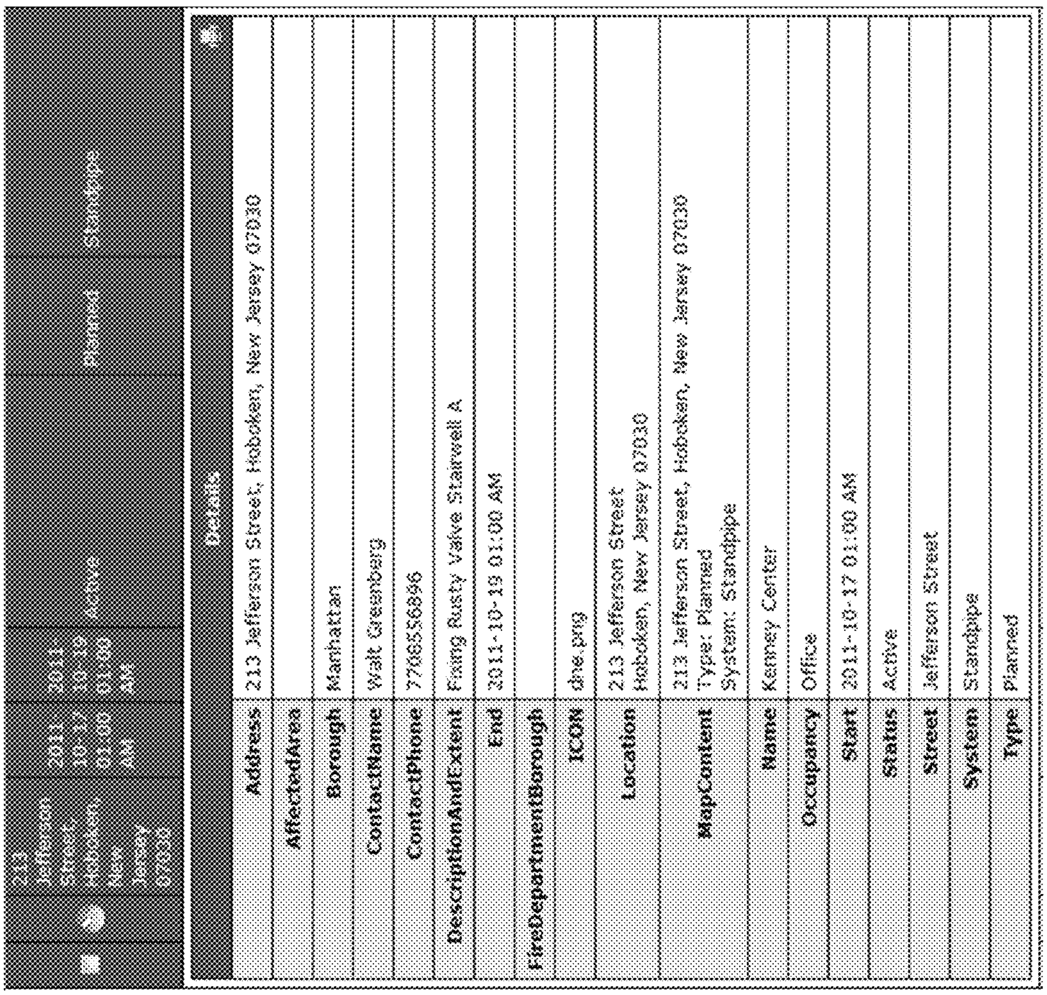
FIGURE 20 - I

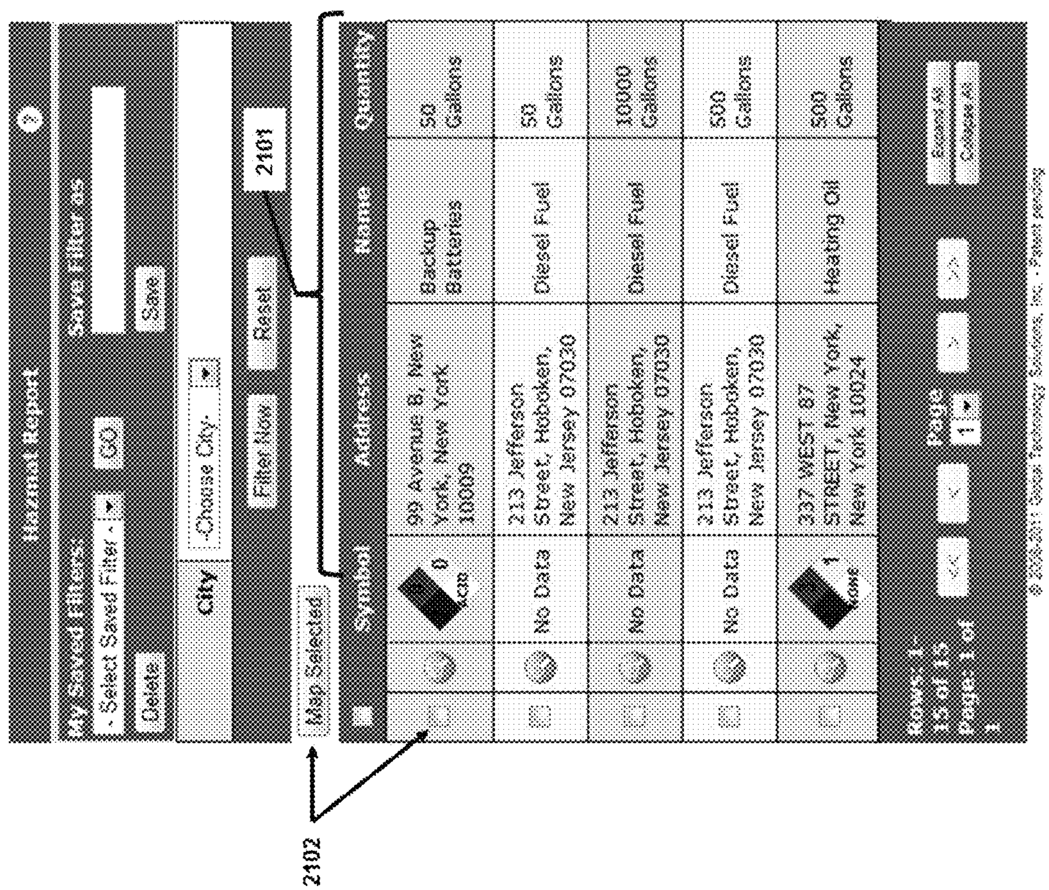
FIGURE 21 - A

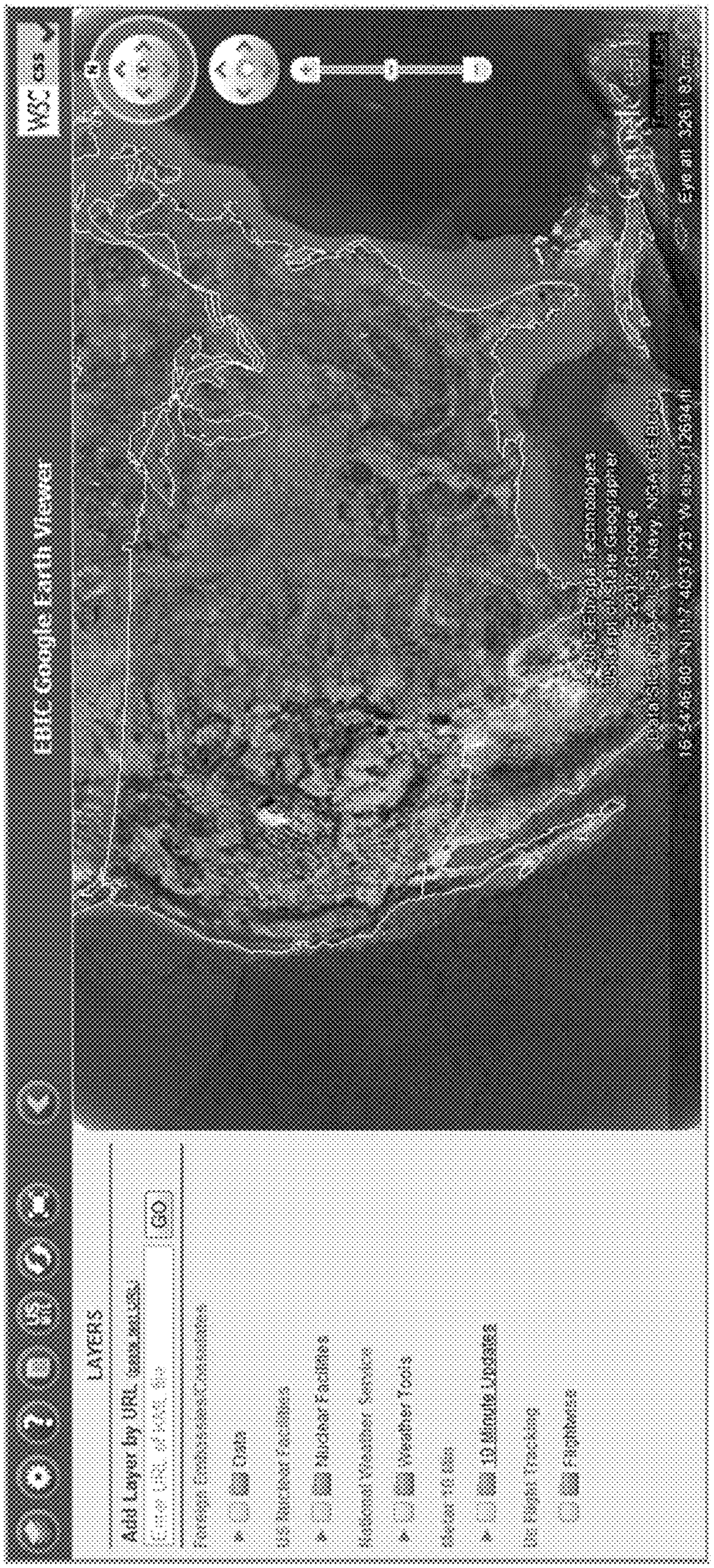
FIGURE 21 - B

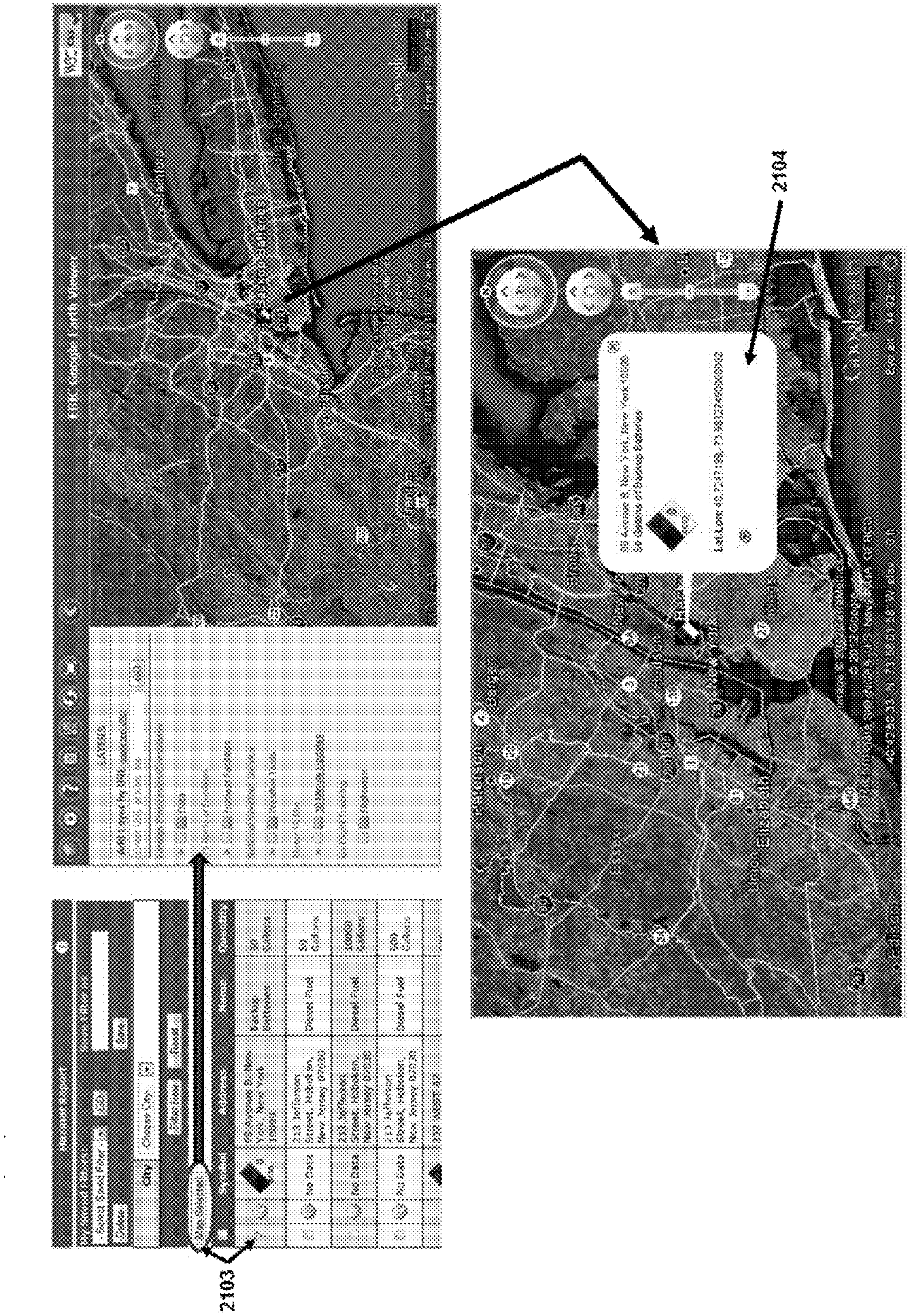
FIGURE 21 - C

| | | | |
|---|---|---|---|
| **Stairwell Info** | 19 | Designators | ❑ |
| | 20 | Access Stairs | ❑ |
| | 21 | Fire Tower | ❑ |
| | 22 | Pressurized | ❑ |
| | 23 | Roof Access | ❑ |
| | 24 | Floors Serviced | ❑ |
| | 25 | Re-Entry Floors | ❑ |
| | 26 | Floors with STDP in stairwell | ❑ |
| | 27 | Isolation Valve Floors | ❑ |
| **Elevator Banks** | 28 | Designators | ❑ |
| | 29 | Cars Quantity | ❑ |
| | 30 | Bank Type | ❑ |
| | 31 | Floors Serviced | ❑ |
| | 32 | Blind Shaft Floors | ❑ |
| | 33 | Sky Lobby Floors | ❑ |
| | 34 | Machine Room Floors | ❑ |
| | 35 | Pit Room Floors | ❑ |
| | 36 | Freight Elevator(s) info | ❑ |
| **Ventilation Systems** | 37 | Designators | ❑ |
| | 38 | Floors Serviced | ❑ |
| | 39 | Mechanical Room Floor(s) | ❑ |
| **Building Utilities** | 40 | Main Electrical shutoff location | ❑ |
| | 41 | Main Water shutoff valve location | ❑ |
| | 42 | Natural Gas shutoff location | ❑ |
| | 43 | Main Steam Service shutoff location | ❑ |

FIGURE 22 - A

| | | | |
|---|---|---|---|
| **Hazardous Materials** | 44 | Item name | ☐ |
| | 45 | Stored State | ☐ |
| | 46 | Unit of Measure and Quantity of Units | ☐ |
| | 47 | Floors/Locations | ☐ |
| | 48 | CAS and/or UN Numbers | ☐ |
| | 49 | Hazard Classification | ☐ |
| | 50 | Fire Hazard value | ☐ |
| | 51 | Health Hazard value | ☐ |
| | 52 | Reactivity value | ☐ |
| | 53 | Specific Hazard value | ☐ |
| | 54 | MSDS form | ☐ |
| **Fire Protection Systems (FPS)** | 55 | Locations/Floors of standpipes (STDP)not in stairwells | ☐ |
| | 56 | STDP isolation valve locations (not in stairwells) | ☐ |
| | 57 | PRV valve floor locations | ☐ |
| | 58 | Pre-Action System info | ☐ |
| | 59 | Fire Pump info | ☐ |
| | 60 | Fire Extinguishing System | ☐ |
| **Communications** | 61 | Number of radios for on-site First Responder use | ☐ |
| | 62 | 24-hour storage location of radios for emergency use | ☐ |
| | 63 | Any other communication tools available | ☐ |
| **Emergency Contacts** | 64 | Name | ☐ |
| | 65 | Position | ☐ |
| | 66 | Work phone number | ☐ |
| | 67 | Emergency phone number | ☐ |
| **Building Base Floor-Plan** | 68 | Floor-Plan | ☐ |
| **Temporary Considerations and Response Impairments** | 69 | Contact person | ☐ |
| | 70 | Affected System | ☐ |
| | 71 | Description of outage or hindrance | ☐ |
| | 72 | Area Affected | ☐ |
| | 73 | Start/End Date/Time of project and/or impairment | ☐ |
| | 74 | Primary Occupancy type of affected area | ☐ |
| | 75 | Status | ☐ |

FIGURE 22 - B

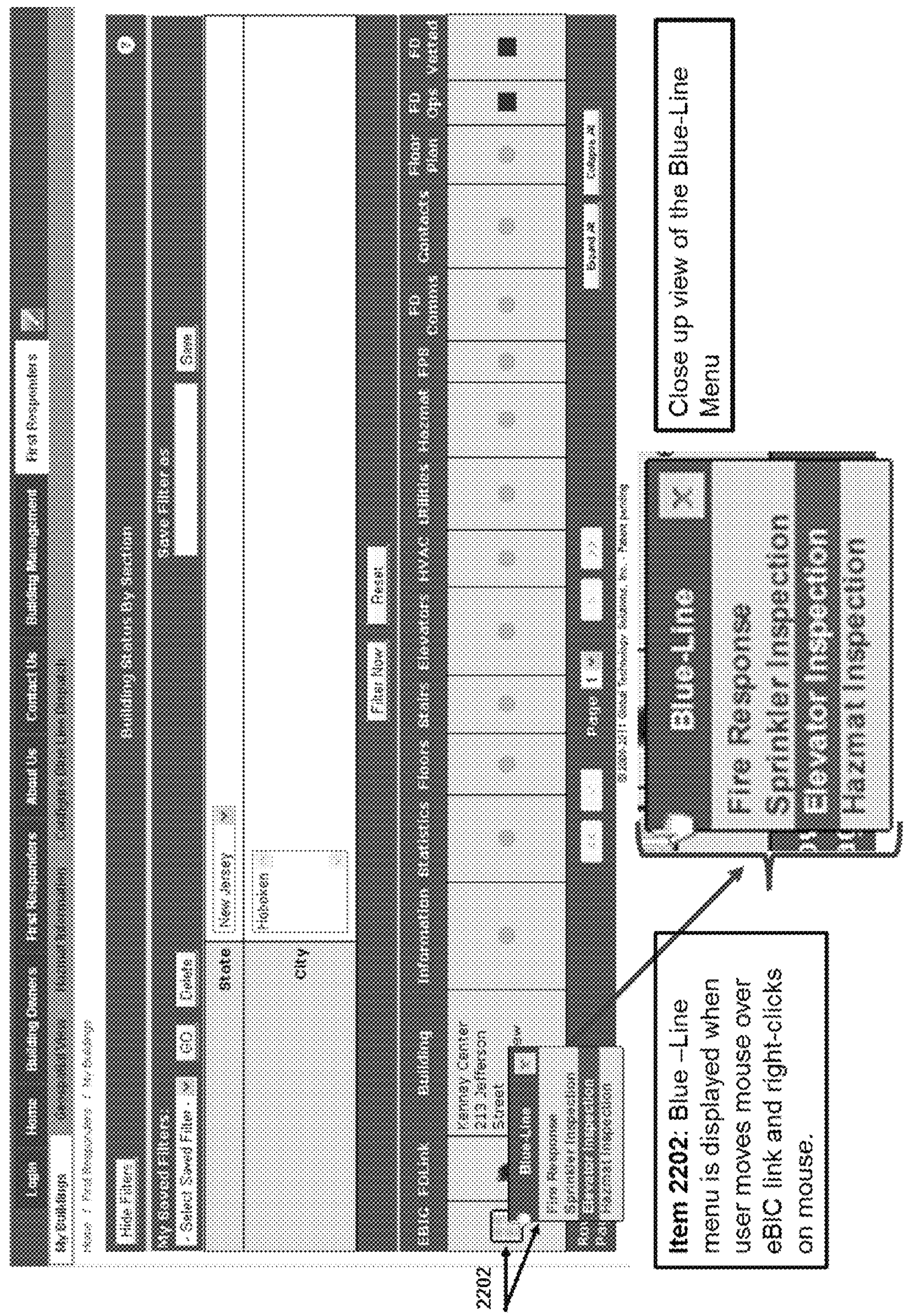
FIGURE 22 - C

ELECTRONIC BUILDING INFORMATION (EBIC) SYSTEM

REFERENCE TO RELATED APPLICATION

This application claims priority to U.S. Provisional Application Ser. No. 61/823,153 filed May 14, 2013, which is incorporated by reference.

TECHNICAL FIELD

The present invention is generally related to the field of habitable building management systems and, more particularly, to a computer based data and emergency management systems for habitable buildings, such as large office buildings.

BACKGROUND OF INVENTION

In the area of emergency response, many variables can contribute to a worse case result from response efforts that lack proper resources especially as emergencies relate to building information especially when disaster strikes large structures. A single online source for all relevant response related building information facilitates a proactive response to building related crisis when responders can access the building information they need in real time and have the option to print and carry relevant information to the site of emergency. Disconnect in communication between public agencies with regard to a building's comprehensive floor plan and all the key elements within a building's structure can be the difference between life and death for both first responders and victims in an emergency. Having accurate, complete building information that is accessible by the building management, public agencies, and first responders in an electronic environment is needed to help ensure more favorable results in a crisis response; and, building information is needed for ongoing thorough and methodical emergency preparedness. Also needed is the ability for all public agencies to create their own pre-incident plan within the National Response Framework that will assist the incident commander (IC) with an incident action plan (IAP) to enhance the overall ground strategy, tactics, risk management and first responder safety. A user-friendly online application is necessary to help manage the complex information networks, levels of command that make up communication in organizations, and information flow of building information in a logical manner for universal appeal. An online application should maximize the data entered by end user for utilization so that end user does not need to waste time re-entering the same information more than once but rather can instead invest time in maintaining the building information in application.

SUMMARY OF THE INVENTION

The electronic Building Information Card (eBIC) invention meets the needs described above and provides a systematic and comprehensive approach for building information maintenance to assist first responders and building owners in an emergency response. The eBIC solution is built to the essential elements for each building along with a cross vertical view of the building. This provides the first responder a quick size-up assessment, an easy to read graphic view format and further support emergency operations for each building. The systems provides data collection and organization of building data in an application that has the ability to aggregate specific information in a map viewer as well as present a user friendly interface of collected data for viewing, reporting, and collaboration purposes. From the building information collected by the application, the First Responder can create a Field Operations Guide, by utilizing the application interface, for Special Operations that are unique to the building.

The eBIC system also provides intelligence to the first responder command with an element of control to better implement and deploy resources more effectively with real time information. In the field of emergency preparedness one of the key components for any building owner after an urgent situation, is how quickly their organization can recover and resume normal functioning. The eBIC card provides temporary considerations, impairments and field operation guidelines to the first responder with concurrent information that enable both the first responder and building owner to rapidly mitigate an emergency incident.

The eBIC invention software tool set acquires, compiles, and displays all relevant building data in both a code approved printed card and a dynamic graphic vertical interface form for a unique real time essential tool that empowers first responders and building owners before, during and after an emergency situation. The eBIC tool interface is derived from a universal web browser based platform. The tool uniquely distributes the building information to all first responders at the same time and provides controls for selecting only relevant information with partitioned log-in protocols helping the command center to develop and implement an incident action plan for the situation. The eBIC tool is a software system that needs no setup, special training, hardware, or system engineer. The product is service-oriented software that is user-friendly from the start.

The eBIC system has a real-time temporary conditions section which is a unique feature. The Temporary Conditions feature provides a tracking form and reports for documenting and tracking Fire Protection System (FPS) out of service impairments and temporary building conditions which may impede response efforts. Other building information systems that do not have this feature run the risk of maintaining building information that is obsolete, incomplete; and, lack of this information creates unnecessary dangers to all involved in emergency response.

BRIEF DESCRIPTION OF THE DRAWINGS

The drawings show an illustrative embodiment of the EBIC system.

FIG. 1-A is a screenshot of the My Organizations page.

FIG. 1-B is a screenshot of the Manage My Organizations and Invitations interface.

FIG. 1-C is a screenshot of the right side of the "My Invitations" interface.

FIG. 1-D is a screenshot of the "My Profile" page.

FIG. 3-A shows a continuation of the "Building Information" form.

FIG. 3-B shows the "Building Information" form.

FIG. 3-C is a continuation of the same "Building Information" form.

FIG. 3-D is a screenshot showing a close up view of the dropdown menu.

FIG. 5-A is a screenshot of the continuation of the section Building Vertical Riser Design section.

FIG. 5-B is a screenshot of the continuation of the form for the section Building Vertical Riser Design section.

FIG. 6-A is a screenshot of the Stair Riser form.

FIG. 6-B is a screenshot of the Stair Riser Matrix

FIG. 6-C shows continuation of the Stair Riser matrix.

FIG. 6-D shows a further continuation of the Stair Riser matrix.

FIG. 7-A is a screenshot of the Elevator Banks form.

FIG. 7-B is a screenshot of the Elevator Bank Matrix.

FIG. 7-C shows the elevator matrix for an elevator bank.

FIG. 8-A is a screenshot of the form that opens when user clicks "Add HVAC Zone."

FIG. 8-B is a screenshot of the HVAC matrix which is a helpful tool.

FIG. 10-A is a screenshot of the data entry form, called Storage Subform, for this section.

FIG. 10-B shows a continuation of the data entry form for this section.

FIG. 11-A is a continuation of the screenshot of the Fire Protection Systems section.

FIG. 11-B is a screenshot of the first two forms within the Fire Extinguishing System section.

FIG. 11-C shows a continuation of the data entry forms within the Fire Extinguishing System section FIG. 11-D shows a continuation of the data entry forms within the Fire Extinguishing System section.

FIG. 13-A is a screenshot of the Building Emergency Contact Information form.

FIG. 14-A shows results after user has chosen a floor plan.

FIG. 14-B is a continued screenshot of the floor plan tool.

FIG. 15-A through FIG. 15-C are screenshots of the entire resulting eBIC for a building.

FIG. 15-D is a screenshot that of various parts of the My Buildings Status by Section table.

FIG. 15-E shows the wizard that is displayed in the My Buildings Status by Section table.

FIG. 16-A is a screenshot of the eBIC OOS viewer.

FIG. 16-B is a screenshot of a close up view of an Out-Of-Service Temporary Considerations viewer.

FIG. 17-A is a screenshot of the continuation of First Responders data entry form.

FIG. 19-A is a screenshot of the My Buildings page.

FIG. 19-B shows first part of eBICard for this example.

FIG. 19-C is a screenshot of the continuation of the eBICard for this example.

FIG. 19-D is a screenshot of the continuation of the eBICard for this example.

FIG. 19-E is a screenshot of the continuation of the eBICard for this example.

FIG. 19-F is a screenshot of the Operations interface.

FIG. 19-G is a close up of the first section of the comprehensive building information viewer.

FIG. 19-H is a continuation of the comprehensive building information viewer.

FIG. 19-H is a first continuation of the comprehensive building information viewer.

FIG. 19-I is a second continuation of the comprehensive building information viewer.

FIG. 19-J is a third continuation of the comprehensive building information viewer.

FIG. 19-K is a fourth continuation of the comprehensive building information viewer.

FIG. 19-L is a fifth continuation of the comprehensive building information viewer.

FIG. 19-M is a screenshot of the two forms part of the Operations split-screen interface.

FIG. 19-N is a screenshot of the Field Operations Guide For Building template.

FIG. 19-O is a screenshot of a first segment of the Field Operations Guide For Building form.

FIG. 19-P is a screenshot of a second segment of the Field Operations Guide For Building form.

FIG. 19-Q is a screenshot of a third segment of the Field Operations Guide For Building form.

FIG. 19-R is a screenshot of the Vet Building Information interface.

FIG. 19-S is a screenshot of a form used for vetting and quality assurance purposes.

FIG. 19-T is a first continuation of the form used for vetting and quality assurance purposes.

FIG. 19-U is a second continuation of the form used for vetting and quality assurance purposes FIG. 19-V is a third continuation of the form used for vetting and quality assurance purposes.

FIG. 20-A is a close up screenshot of the "My Buildings For First Responders" viewer.

FIG. 20-B is a screenshot of the resulting details in a pop-up window.

FIG. 20-C is a screenshot of an example mapping tool.

FIG. 20-D is a continuation of the example begun in FIG. 20-C.

FIG. 20-E is a close up screenshot of the right side of the Geospatial View page.

FIG. 20-F is a close up screenshot of the OOS For First Responders interface.

FIG. 20-G is a continuation of the example begun in FIG. 20-F.

FIG. 20-H is a further continuation of the example begun in FIG. 20-F.

FIG. 20-I is a screenshot of details view of a record from "OOS For First Responders" interface.

FIG. 21-A shows a close-up screenshot of the Hazmat Report interface.

FIG. 21-B is a close-up screenshot of the eBIC Google Earth Viewer.

FIG. 21-C is a screenshot of the Hazmat Report mapping tool.

FIG. 22-A is a screenshot of the continuation of the Blue-Line Dispatch form.

FIG. 22-B is a screenshot of the continuation of the Blue-Line Dispatch form.

FIG. 22-C is a screenshot of a Blue-Line options for any particular building of interest.

DETAILED DESCRIPTION OF THE EMBODIMENTS

Figure 1:
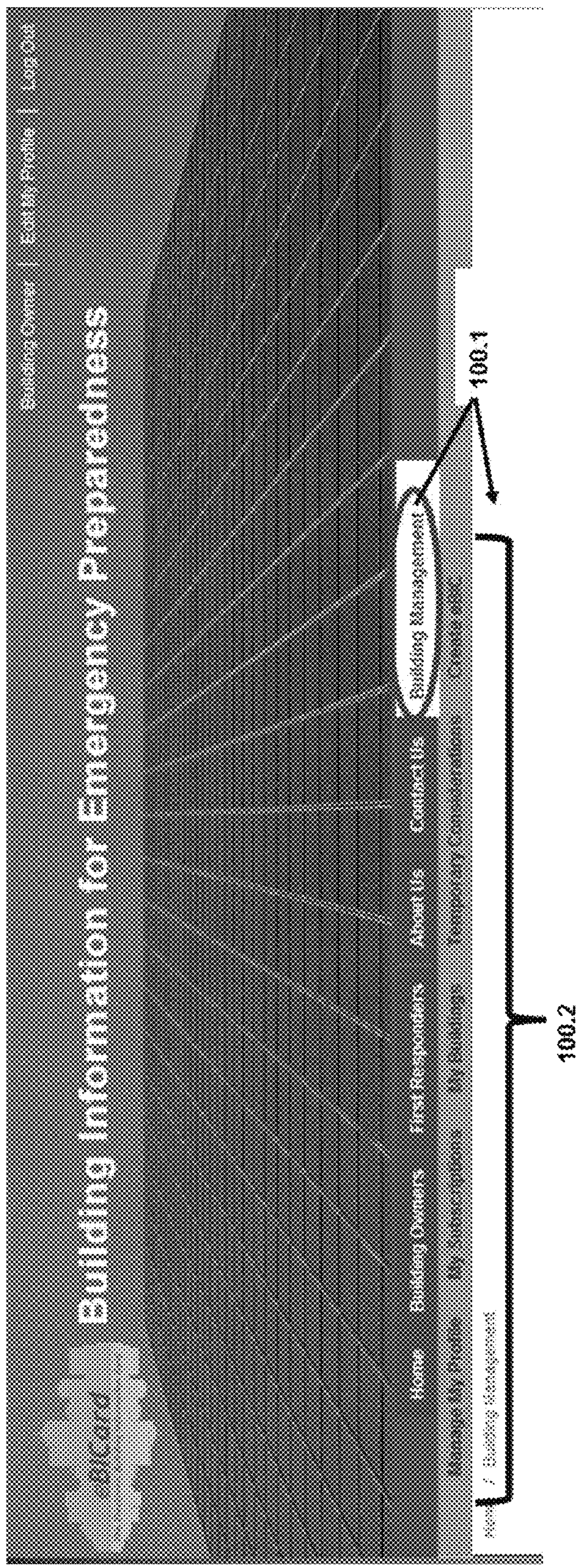
FIG. 1 is a screenshot of the Building Management page.

It is essential for building owners, communities, towns, and cities to have available software that can limit and may prevent the loss of life, limb, and property. The eBIC tool is intended to assist in creating safer cities and habitable buildings in our communities for all.

The eBIC system typically includes an application that runs on a client computer system and a server-based application accessed over a network, such as the Internet. The Blue-Line Dispatch report is a configurable User Interface (UI) like the Vetting QA Checklist feature. First Responder picks eBIC elements to include in report, then can select and launch report which shows only the selected/desired elements. The Google Maps and Earth user interface (UI) is a Filterable View of eBICs with the ability to plot geospatially and then see various details on a balloon and then open various information interfaces including the above mentioned blue-line reports. This feature is tied into NOAA by ZIP code for Atmospheric, wind, and other weather related information. A cross vertical view of the building displays vertical riser features for: Floor Identifications; Stairwells; Access/Convenience Stairs; Elevator Cars; Heating, Ventilation and Air-Conditioning (HVAC) Systems; Fire Protection Systems, Occupancy Load; People with Disability, etc.

The eBIC system also includes first responder vetting and quality assurance of the collected data. Following the entry of the building information, a quality assurance and vetting interface is provided wherein the responding agencies can review and document any data issues which are shared with the building owner in a split-screen interface with the comprehensive building information displayed on the left in a scrollable frame, and the quality assurance checklist template displayed on the right in a scrollable frame providing a very intuitive and easy-to-use interface for information vetting purposes.

First Responder Operations Guidelines provide an operational response planning tool is provided wherein the Responding Agencies can complete a plan in a split-screen interface with the comprehensive building information displayed on the left in a scrollable frame, and the response plan template displayed on the right in a scrollable frame providing a very intuitive and easy-to-use interface for pre-planning purposes. Revenue may be shared for each building that is vetted and for which an operational plan is created, and tracking form and reports for documenting and tracking out of service building systems and temporary building conditions which may result in impairments to response efforts.

A comprehensive hazardous materials (Hazmat) documentation and tracking interface is provided to capture detailed information regarding hazardous materials storage on the premises of the building or property. A hazmat report is provided with appropriate placards for quick reference and the ability to map aggregate hazardous materials information with type of material and quantity as well as current weather conditions for an emergency response. The system also includes an ability to identify and discover various building attributes and features across the entire dataset to respond to concerns regarding types of construction, period structure was erected, types of building systems, etc. The results may be represented in a report or geospatial interface. A mass notification and collaboration feature allows responders, planners, and other agencies to communicate, track and document real and potential issues relating to properties and structures within their jurisdiction.

The following describes user interaction with the eBIC software application). FIG. 1 is a screenshot of the Building Management page which contains five action subpages: 1) Manage My Profile, 2) My Subscriptions, 3) My Buildings, 4) Temporary Considerations, and 5) Create eBIC. As a general summary of the eBIC system, to create an electronic Building Information Card (eBIC), Building Owners must first register on website. Then, user must click on My Subscriptions tab to purchase a subscription for their building. One subscription enables user to not only create an eBIC for that building but also to utilize the eBIC application for editing & updating building information along with tools for reporting and mapping. Purchasing one subscription provides eBIC benefits for one building for as long as user continues to pay the monthly subscription charge. One subscription is equivalent to one building credit. After purchasing building credit the building owner can now click the Create eBIC tab which takes user to the eBIC Building Wizard where person can enter all the data for that building with this user-friendly interface. The eBIC application then automatically creates an eBICard for that building. Included in the wizard is a section in which the Building Owner can select the First Responders with whom to share building information which grants access to those local upon logging in such as for Fire Department, Police, Emergency Management or other. Building Owner may also opt to share information with federal agencies as well. To edit or update an existing eBIC for a building simply click on My Buildings which is also where user may click a link that launches the eBICard for any building of interest from this interface. Manage My Profile provides two sub pages where user can manage their organizations and invitations (see FIG. 1-A through 1-D) and manages their user information. To access the tracking form and reports interface for documenting and tracking out-of-service fire protection system (FPS) and temporary building conditions which present possible hindrances to a first responder and/or building management staff mitigation efforts, click the Temporary Considerations tab.

100.1. Building Management—Click here to go to the Building Management page which contains five action subpages: 1) Manage My Profile, 2) My Subscriptions, 3) My Buildings, 4) Temporary Considerations, and 5) Create eBIC.

100.2. Shows the five subpages of Building Management; 1) Manage My Profile, 2) My Subscriptions, 3) My Buildings, 4) Temporary Considerations, and 5) Create eBIC.

FIG. 1-A is a screenshot of the My Organizations page which is a sub page of the Manage My Profile page. On the My Organizations page you can select one of your organizations from a dropdown menu to see the other members of that organization displayed in the Organization Directory. You can also invite additional users to your account which means that those invited would be able to see all the buildings information in your organization. This also means that they may gain read/write privileges to your buildings according to your specification. Security measures are in place in the invitation process to help ensure that no one is able to gain access to your information other than the one you have intentionally invited. The process includes the "Invite", the "Invitation Response", and the "Confirm Invitation" segments and includes the "Cancel Invitation" segment just in case. Just because you have invited and accepted other members into your organization does NOT mean that you can now see their buildings information. If you want to see another's building information then that person must invite you.

100.3. Manage My Profile—Click here to go to the Manage My Profile page which contains two subpages; My Organizations and My Profile.

100.4. My Organizations—Click here to go to the My Organizations page.

100.5. Here, you can select one of your organizations from a dropdown menu to see the other members of that organization displayed in the Organization Directory.

100.6. The "My Invitations" feature is a split screen interface. The left side is a viewer of your invitations which may be filtered for viewing according to status. Also, the left side viewer contains an "Actions" column that is interactive with the right side interface for the purpose of confirming or cancelling invitations.

FIG. 1-B is a screenshot of the Manage My Organizations and Invitations interface.

101. Organization/Role—Select one of your organizations from the dropdown menu to see the other members of that organization displayed in the Organization Directory

102. Organization Directory—This table displays Organization Name, Account, Name of Member, Role(s), Phone, and Email of each member of selected organization.

103. Status—This scrollable filter option allows user to quickly see invitations according to their status. Status options include Accepted, Cancelled, Confirmed, Declined, or Open.

104. Filter Now—Click "Filter Now" button to run the filter parameters set in the filter options located just above it.

105. Reset—Clicking this button clears all entered values from filter controls and resets the data table to the default display.

106. "My Invitations"—Table viewer of your invitations that includes the following columns: Actions—User can click a green check-mark in this column to select an invitation to confirm and then click the "GO" button in the right "Confirm Invitation" section to confirm; or, user can click the red X to select an invitation to Cancel and then click the "GO" button in the right "Cancel Invitation" section to cancel. Direction—indicates whether invite is coming from you or going to someone else. From/To—shows the sender and recipient of invitation. Email—includes the email address. RoleName—displays the read/write privilege that you granted to the person you invited. Status—indicates if the invitation is Open, Confirmed, or Cancelled.

FIG. 1-C is a screenshot of the right side of the "My Invitations" interface. You can invite additional users to your account which means that those invited would be able to see all the buildings information in your organization. This also means that they may gain read/write privileges to your buildings according to your specification. Security measures are in place in the invitation process to help ensure that no one is able to gain access to your information other than the one you have intentionally invited. The process includes the "Invite", the "Invitation Response", and the "Confirm Invitation" segments and includes the "Cancel Invitation" segment just in case. Just because you have invited and accepted other members into your organization does NOT mean that you can now see their buildings information. If you want to see another's building information then that person must invite you.

107. Email—If you would like to share your information, enter the email address of the other person in this field and the other person receives an email asking them to register and accept your invitation.

108. Role—Select the role, or read/write privilege, you are granting to the person you are inviting from this dropdown menu. The choices included in this dropdown menu are; Admin, Editor, Viewer, or Redactor.

109. GO—Click this button after you have entered the email address and selected the role of the person you are inviting in order to enable the application to send the email or invitation.

110. Invitation Code—If you have received an invitation, you may enter the Invitation Code in this field to respond.

111. Response—Click the Decline or Accept radio button to indicate whether you accept or decline the invitation.

112. Submit—Click the Submit button in order to enable the application to send your response through email to the person who invited you.

113. Confirm Invitation/GO—Click the GO button after you have clicked the green check-mark in the "My Invitations" table on the left to select an invitation to confirm.

114. Cancel Invitation—Click the red X in the "My Invitations" table on the left to select an invitation to Cancel, then click GO button.

115. GO—Click this button after selecting invitation you want cancelled. See item 114.

FIG. 1-D is a screenshot of the "My Profile" page which contains a pre-filled form/table called "Update Profile" which includes user information that has been automatically pulled over from data entered on registration form and you can edit or update your user information in this form/table.

Figure 2:
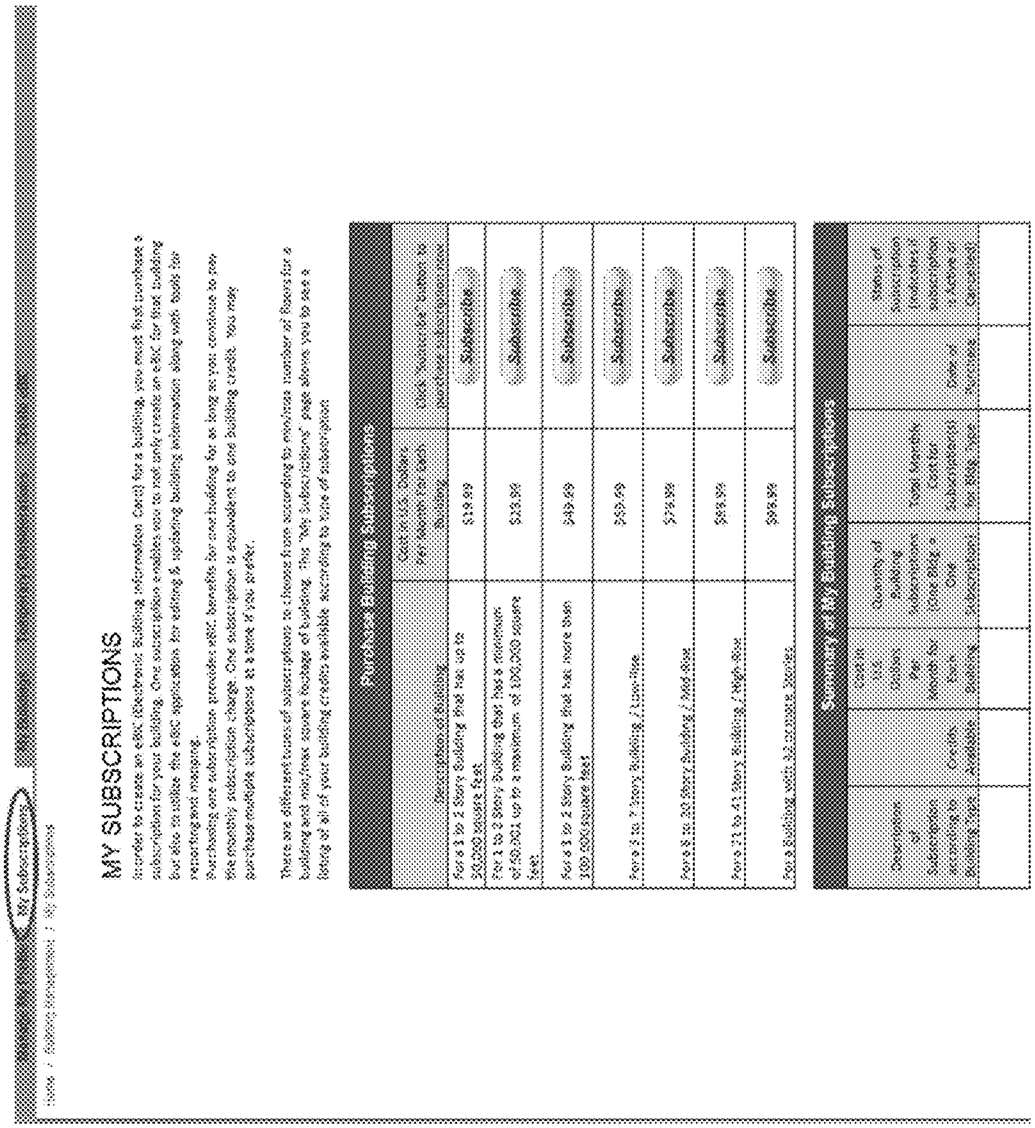
FIG. 2 is a screenshot of the My Subscriptions page.

FIG. 2 is a screenshot of the My Subscriptions page. In order to create an electronic Building Information Card (eBIC) for a building, you must first click on the "My Subscriptions" tab and purchase a subscription for your building by clicking "Subscribe" button in the "Purchase Building Subscriptions" table. One subscription enables you to not only create an eBIC for that building but also to utilize the eBIC application for editing & updating building information along with tools for reporting and mapping.

Purchasing one subscription provides eBIC benefits for one building for as long as you continue to pay the monthly subscription charge. One subscription is equivalent to one building credit. You may purchase multiple subscriptions at a time if you prefer.

There are different types of subscriptions to choose from according to min/max number of floors for a building and min/max square footage of building. The "My Subscriptions" page allows you to see a listing of all of your building credits available according to type of subscription in the table viewer called "Summary of My Building Subscriptions".

Figure 3:
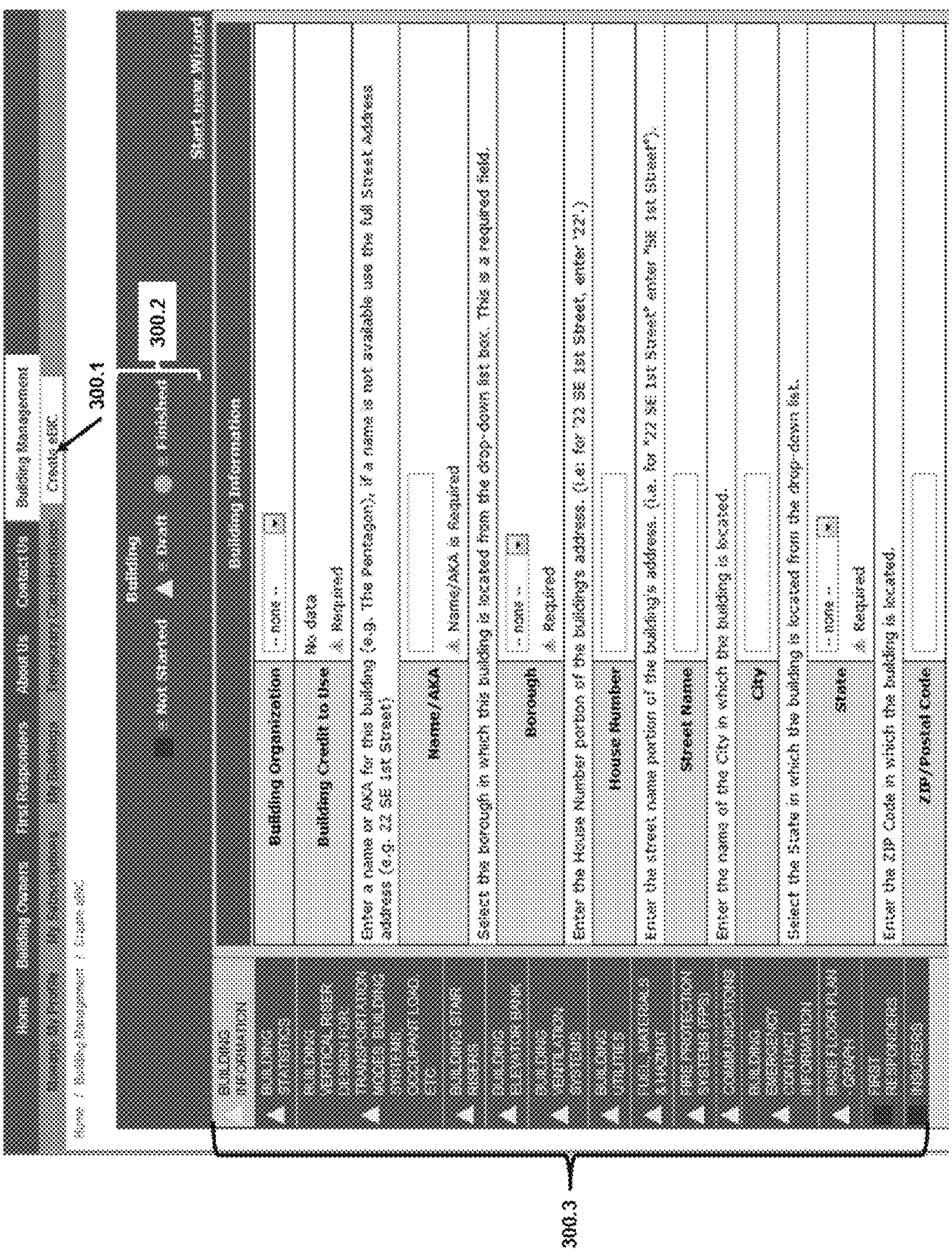
FIG. 3 is a screenshot of the beginning of the "Create eBIC" wizard.

FIG. 3 is a screenshot of the beginning of the "Create eBIC" wizard. The first form shown is "Building Information". The wizard is made up of fourteen sections that are located in the far left column. Each section contains forms for data entry. See FIG. 3 through FIG. 14-B for detailed information about the Sections and their forms that make up the eBIC wizard.

300.1 Create eBIC—This tab is clicked to create a new eBIC

300.2. Status icon legend

300.3 Form navigation tabs

FIG. 3-A shows a continuation of the "Building Information" form, which is the first section of the wizard.

300.4. Status—Set section status from dropdown menu to draft or final

FIG. 3 through FIG. 14-B includes screenshots of completed sections of a building named "Kenney Center" as an example to showcase the features of the eBIC wizard.

FIG. 3-B shows the "Building Information" form which captures the basic information about the building such as name of building, address, construction class and the number of building occupants (i.e., employees, residents, and visitors) in the building during a typical day, night and weekend.

300. Building Information—Click here to open the Building Information form.

301. Building Organization—Customer is required to select "Organization/Role" from this dropdown menu and then sees all available credits (tied to that organization) in the "Building Credits to Use" dropdown.

302. Building Credits to Use—Customer then selects the desired credit to use from this dropdown menu. The "Building Credits to Use" dropdown includes available credits with description of type of subscription linked, e.g. one credit=subscription (that must be paid monthly to maintain credit) for a building with a size range of 1-21 floors and 20K-500K square feet maximum.

303. Name/AKA—User enters name or AKA for the building when known.

304, 310 and 311 (see also FIG. 3-C, continuation of "Building Information" form). These segments for New York City are an example of how the eBIC system is completely customizable and can be fully integrated with third party systems including various government and private information systems to draw supplemental information into the application.

305. House Number—User enters number portion of the building's street address here.

306. Street Name—User enters Street name portion of building's address here.

307. City—User enters name of the city in which the building is located.

308. State—User selects the state in which the building is located from the dropdown list.

309. Zip/Postal Code—User enters the zip code in which the building is located.

310. In this customized segment, the user clicks link which opens a website in which user can get Department of Buildings (DOB)/Building Information Number (BIN) number for a specified NYC location. (See item 304).

FIG. 3-C is a continuation of the same form "Building Information" and includes items 311 through 316 which further captures the basic information about the building.

311. BIN—In this customized segment (see item 304), user enters the BIN number of specified location in this field. Additional instructions, definitions and guidance can be added to the forms as in this example in which information, specific to location, is provided to help user in selecting correct Construction Classification in the next segment of form (item 312).

312. Construction Class—Select construction classification from dropdown list (see FIG. 3-D, item 317 for dropdown detail)

313. Day Population—User enters the number of building occupants (i.e., employees, residents, and visitors) in the building during a typical day.

314. Night Population—User enters the number of building occupants (i.e., employees, residents, and visitors) in the building during a typical evening.

315. Weekend Population—User enters the number of building occupants (i.e., employees, residents, and visitors) in the building during a typical weekend.

316. Status—Set section status from dropdown menu to "Draft" or "Final"

FIG. 3-D is a screenshot showing a close up view of the dropdown menu or list for Construction Class from the Building Information section.

317. Close up view of the dropdown list for Construction Class from the Building Information section.

Figure 4:
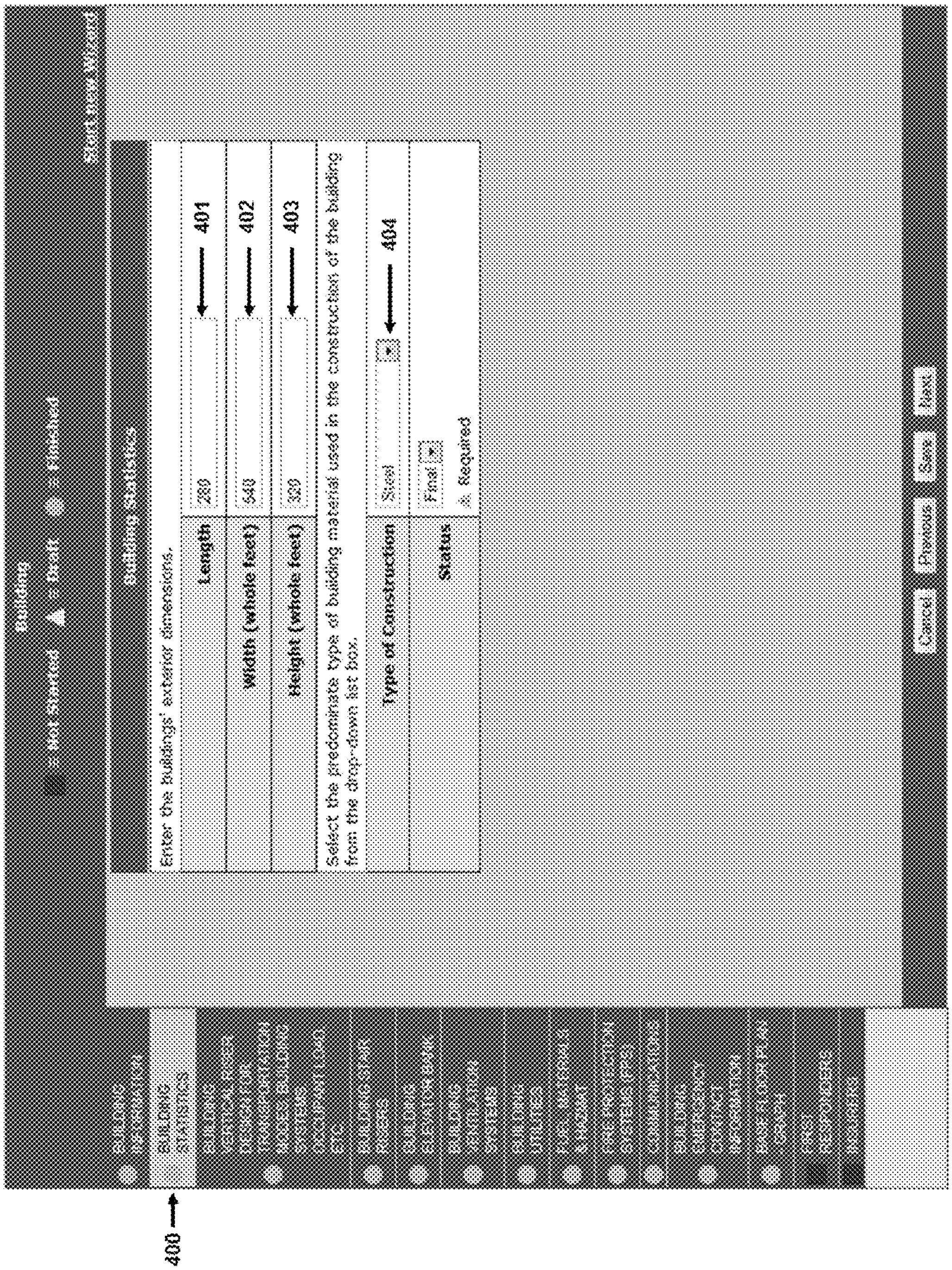
FIG. 4 is a screenshot of the Building Statistics section of the eBIC wizard.

FIG. 4 is a screenshot of the Building Statistics section of eBIC wizard which captures the buildings' exterior dimensions such as length, width and height.

400. Building Statistics—Click here to open the Building Statistics form.

401, 402, and 403. Enter the buildings' exterior dimensions including length, width, and height in these fields.

404. Type of Construction—Select predominate type of building material used in the construction of building from the dropdown list that includes a choice of either Concrete, Steel, or Concrete and Steel.

Figure 5:
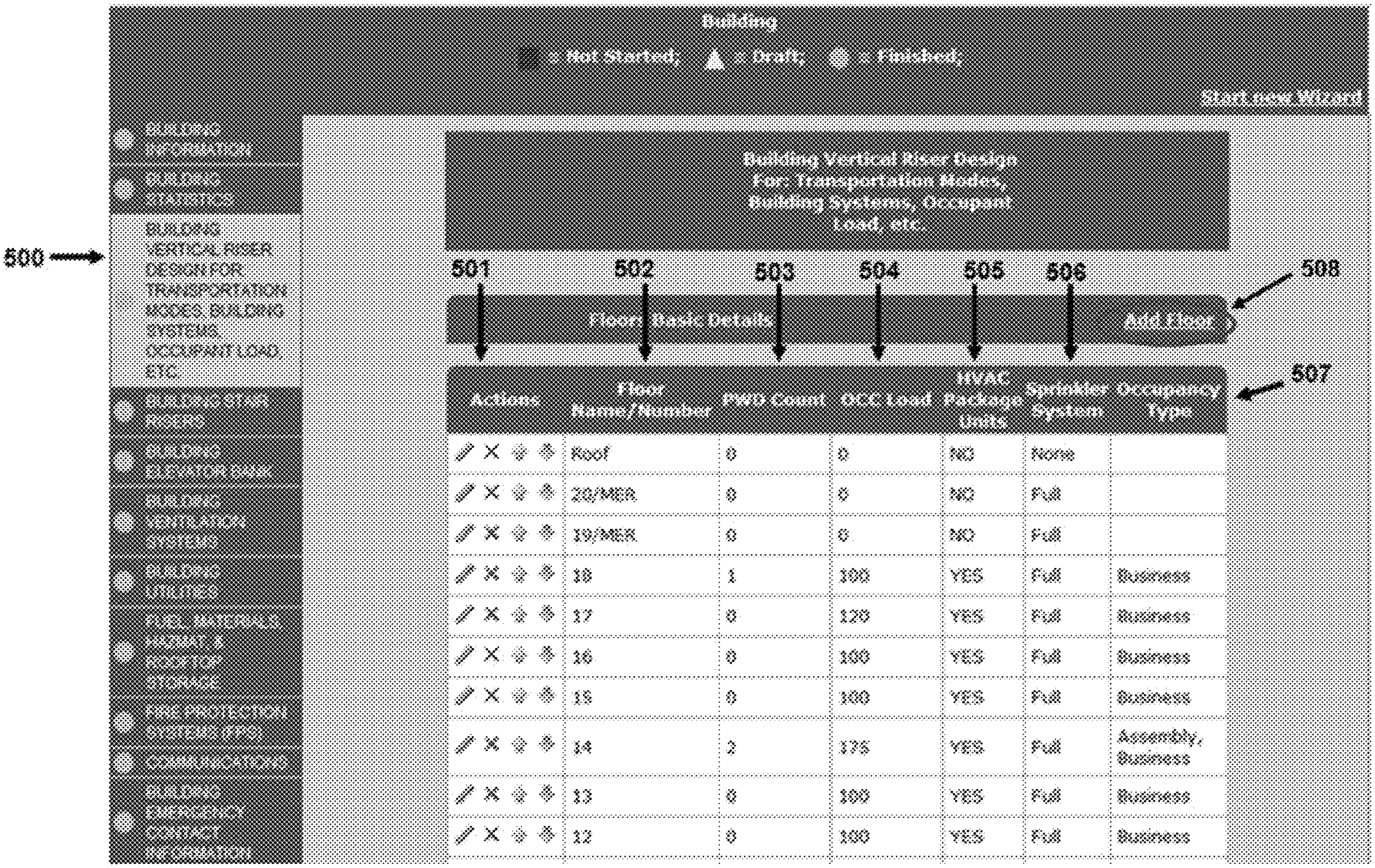
FIG. 5 is a screenshot of the Building Vertical Riser Design section of the eBIC wizard.

FIG. 5 is a screenshot of the Building Vertical Riser Design For Transportation Modes, Building Systems, Occupant Load, Etc. section of eBIC wizard. This section captures a floor's basic details such as floor name/number, count of people with disabilities typically on this floor, occupancy load, whether or not floor has HVAC package unit and sprinkler system, occupancy type, grades that apply to floor, and horizontal connections.

500. Building Vertical Riser Design For Transportation Modes, Building Systems, Occupant Load, Etc.—Click here to open this section.

501. Actions—This column contains four action buttons per row in which user can click to manipulate data in that row of the table. The pencil icon is the universal control to click when one desires to edit a record or row of information. The next button is the red X which is the universal symbol for delete and clicking this deletes that row of information in the table. The green up arrow and the yellow down arrow icons are clicked to move a row of information up or down so user can arrange the order of the records as desired in the (table) viewer.

502 through 507. Column headings of the Floors Basic Details table which illustrates how well the eBIC wizard takes the information that the user has entered into the form and then automatically displays that information in an easy to read table as shown here.

508. Add Floor—User clicks here to open up form for this section, called Building Vertical Riser Design For Transportation Modes, Building Systems, Occupant Load, Etc. For each floor in the building, user clicks "Add Floor" and fills in requested information. The next several sections of the wizard use this information.

FIG. 5-A is a screenshot of the continuation of the section Building Vertical Riser Design For Transportation Modes, Building Systems, Occupant Load, Etc. featuring the form in which user fills in requested information for each floor in the building.

FIG. 5-A shows the first part of form that is displayed upon clicking "Add Floor" and FIG. 5-B shows the continuation of this form. The form for this section captures a floor's basic details. See item 511 through 518 for details on the data collected by this form.

509. Clicking "Add Floor" opens form and adds another row to the table that is automatically filled in once user has completed the form.

510 through 517. This is a screenshot of the first part of the form for this section. Data collected includes the following:

510. Floor Name/Number—Enter the floor identification for each level of the building (e.g. Lobby, Mezzanine, etc., or Number (e.g., $3^{rd}$, $17^{th}$, B-1, etc.).

511. PWD Count—Enter the count of Persons with Disability [PWD] that are usually present on this floor.

512. OCC Load—Enter the Occupancy Load calculated for this floor.

513. HVAC Packages Units—Click in checkbox if this floor has one or more HVAC Package Units.

514. Sprinkler System—Indicate whether or not this floor has a fire sprinkler system installed; and, if so, select whether floor has a full or partial sprinkler system.

515. Occupancy Type—Select all occupancy types that apply to this floor. Choices include: None, Assembly, Business, Day-Care, Educational, Factory, High-Hazard, Hotel, Institutional, Mercantile, and Residential.

516. Grade—Select Grade(s) that apply to this floor. Choices include: Above Grade, At Grade or Street Level, and Below Grade.

517. Horizontal Connections—Indicate whether the building has any horizontal connections to an adjacent building. Choices include: Sky-Bridge, Passageway, Utility Chase, and Other.

FIG. 5-B is a screenshot of the continuation of the form for the section Building Vertical Riser Design For Transportation Modes, Building Systems, Occupant Load, Etc.

518. Roof Setbacks—Indicate building side for any roof setbacks on this floor. User is instructed to list the setback locations as to floor level and exposure side of the building. A set back is an "area formed when the floor area of the building is reduced thus requiring the exterior wall of a building to be recessed." E.g. Roof Setbacks: 2nd Floor/Side-A, 5th Floor/Side-C.

519. Truss Construction—Click checkbox to indicate that Truss Construction was used on indicated floor.

520 through 521. Save button saves information entered. Cancel button cancels information entered, closes form, and returns user to summary view table of Floors Basic Details while keeping user in same section of Building Vertical Riser Design.

Figure 6:
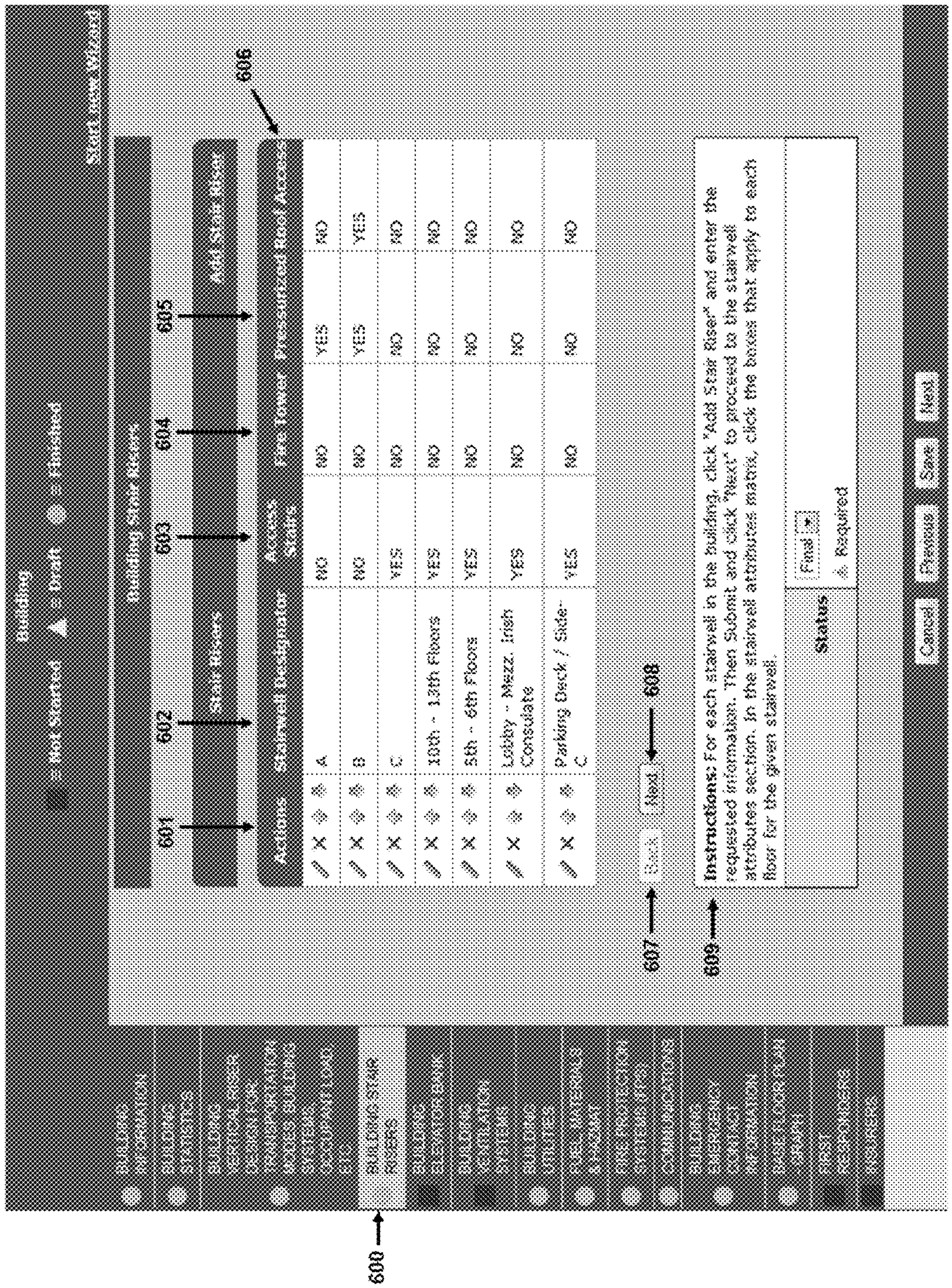
FIG. 6 is a screenshot of the Building Stair Risers section.

FIG. 6 is a screenshot of the Building Stair Risers section. This section captures and organizes stair riser information. A great feature in this section is the Stair Riser Matrix where the user can easily indicate applicable attributes, if any, to each floor for the given stair riser by simply clicking corresponding box or boxes in matrix. (To deselect a box, user clicks in box again).

600. Building Stair Risers—Click here to open this section called Building Stair Risers.

601. Controls for editing, deleting, and reordering stairwell information

602 through 606. Summary view of Building stairwell information

603. Access Stairs—Refers to stairways (usually privately used) between two or more floors outside the building core and user indicates whether or not the stair riser is an Access type or not in the form.

607 through 608. Clicking Next allows user to proceed to the stairwell attributes matrix (shown in screenshot examples in FIG. 6-B through FIG. 6-D) and clicking Back button allows user to go back to previous screen within the Building Stair Risers section. (See also items 610-625).

609. This area offers instructions to the user on how to utilize this section. For each stairwell in the building, the user is to click "Add Stair Riser" (item 610 in FIG. 6-A) and enter the requested information. After saving, user clicks "Next" to proceed to the stairwell attributes matrix. In this matrix, user can click the boxes that apply to each floor for the given stairwell.

FIG. 6-A is a screenshot of the Stair Riser form that appears after user clicks "Add Stair Riser".

610. Add Stair Riser—Click here to open the Building Stair Risers form.

611. Stairwell Designator—Enter the designator (number, letter, etc.) for this stair riser.

612. Access Stairs—Check this box if this is an Access/Convenience Stairway. (Access/Convenience stairway is a limited floor level stairway that is located between two or more common floors utilized by a single tenant and distinct from the main stairwell.)

613. Fire Tower—Check if this stair riser is a fire tower which means that access off each floor is through outside balcony or fire-resistant vestibule that is open to street or yard.

614. Pressurized—Check if this stair riser is pressurized

615. Roof Access—Check if this stair riser provides roof access

616-617. Click Save to save entries to this form or Cancel to close form without saving and return to summary view of Stair Riser information FIG. 6-B is a screenshot of the Stair Riser Matrix. For every Stairwell Designator entered in the Stair Riser form, a corresponding grid appears here. The boxes in the grid of matrix are all grey until user clicks in the boxes which turns them green to show attribute(s) selected for each floor/location. To deselect, that is change green box to grey, just click on box again.

618. This is the Stairwell Designator that had been entered by user as the letter "A" in the Stair Riser form (see FIG. 6-A, item 611); and, the eBIC application automatically pulls that information into the matrix as a column header to distinguish this stairwell information.

619. Floors Serviced—Column of matrix grid that refers to whether or not stairs can be accessed (through a door) from floor indicated.

620. Re-Entry—Column of matrix grid that refers to whether the floor can be accessed from the stairwell. Door from stairwell to floor is not locked.

621. Standpipe [STDP]—Column of matrix grid that refers to whether or not a stairwell standpipe is accessible on indicated floor.

622. STDP Isolation Valve—Column of matrix grid that refers to whether or not an isolation valve is present on the standpipe on indicated floor.

623. Shows the grid of matrix. The rows of matrix are derived from where user entered Floor Names or Floor Numbers in the form from the Building Vertical Riser Design section. Columns of matrix grid are stairwell attributes that may apply. For example, floors 6, 10/Sky Lobby, and 14 can be accessed from the stairwell; therefore, user has clicked boxes for those floors in the Re-Entry column.

FIG. 6-C shows continuation of stairwell matrix according to how many floors were entered into the Building Vertical Riser Design. Also, another example of how stairwell matrix column headers were derived from Stairwell Designator field from Stair Riser form.

FIG. 6-D is a screenshot of the last stairwell grid in this matrix for this example. This is the "Parking Deck/Side-C" (item 624) segment of stairwell. The floors serviced, as shown by green boxes, include S-2/Garage and S-1/Garage/Office.

624. Parking Deck/Side C—Another example of a column header in matrix that distinguishes this stairwell information grid.

625 and 626. Next and Back buttons appear at bottom of matrix within the Building Stair Risers section. These buttons navigate user between summary table view of stair riser data/form and the stair riser matrix.

Figure 7:
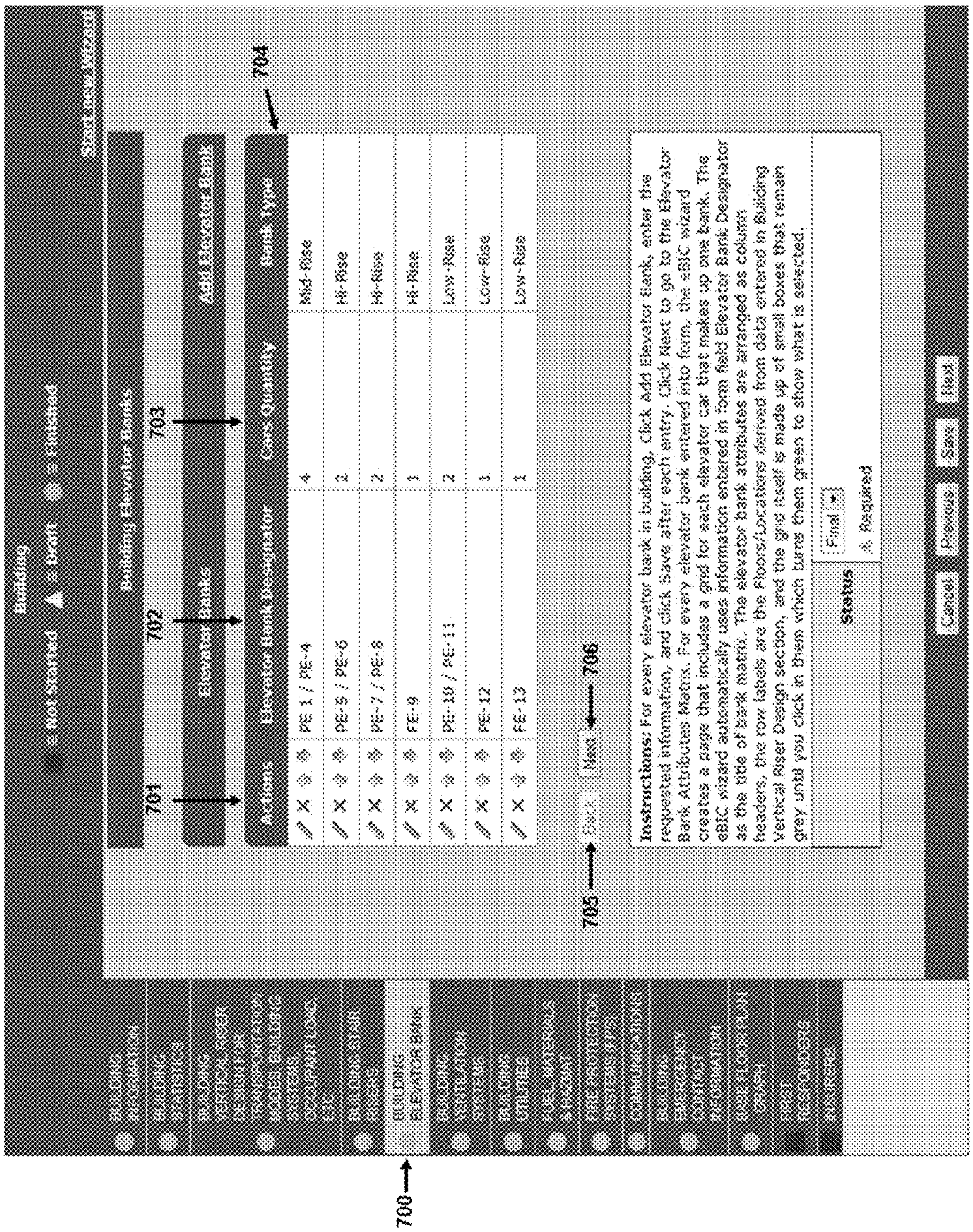
FIG. 7 is a screenshot of the Building Elevator Banks section and summary view.

FIG. 7 is a screenshot of the Building Elevator Banks section and summary view of elevator banks information. This section captures and organizes building elevator banks information such as elevator bank name, number of cars in bank, and bank type. Within this section is an elevator banks matrix which is a helpful tool for the user to define location specific elevator attributes for all banks entered by simply clicking in a grid.

700. Building Elevator Bank: Click here to open the section called Building Elevator Bank.

701. Controls for editing, deleting, and reordering elevator bank information.

702 through 704. Summary view of building elevator bank information.

705. Clicking Next allows user to proceed to the Elevator Banks attributes Matrix (shown in screenshot examples in FIG. 7-B through FIG. 7-C).

706. Clicking Back button allows user to go back to previous screen within the Building Elevator Bank section.

FIG. 7-A is a screenshot of the Elevator Banks form. This form appears when user clicks on "Add Elevator Bank" (item 707).

707. Add Elevator Bank—Click here to open up form to add elevator bank information for this building.

708. Elevator Designator—Enter the elevator bank name or designator here.

709. Cars Quantity—Enter the number of cars in this elevator bank.

710. Bank Type—Select the bank type from the dropdown menu which includes choices of Hi-Rise, Mid-Rise, or Low-Rise.

711. Click Save button to save entries made into the form

712. This Cancel button allows user to cancel entries or cancel changes made in form while remaining in the Building Elevator Banks section.

FIG. 7-B is a screenshot of the Elevator Bank Matrix. For every elevator bank entered into form, the eBIC wizard creates a page that includes a grid for each elevator car that makes up one bank. In FIG. 7-A, the first row is an elevator bank that is made up of four cars; therefore, in FIG. 7-B there are 4 grids for that bank on the first page of matrix.

FIG. 7-C shows the elevator matrix for the FE-9 elevator bank. The eBIC wizard automatically uses information entered in form field "Elevator Bank Designator" as the title of this bank matrix. As shown, this bank is made up of one elevator car. Checkbox next to Freight is selected which means this is a Freight Car (as indicated in item 720). This screenshot highlights the elevator bank attributes that are arranged as column headers, the row labels which are the Floors/Locations derived from data entered in Building Vertical Riser Design section, and the grid itself that is made up of small boxes that remain grey until user clicks in them which turns them green to show what is selected.

713. Floors Serviced—Column of matrix grid that refers to whether or not elevator is accessible from floor indicated.

714. Blind Shaft—Column of matrix grid that indicates the floors that do not have hoistway doors that would allow an occupant in elevator to disembark onto that floor level. A blind elevator shaft means that there are a number of specific floors that are "blind", that is, no hoistway doors on any of those specific floors.

715. Sky-Lobby—Column of matrix grid that describes a floor level where the lowest terminal of an elevator or bank is located above the street level. A sky lobby is an intermediate floor is where people can change from an express elevator that only stops at the sky lobby to a local elevator which stops at every floor within a segment of the building.

716. Elevator Machine Room [EMR]—Column of matrix grid that shows whether or not floor indicated includes a machine room for the elevator. The machine room contains all the controls for the elevator (such as elevator motors). The machine room is where one can check to see if elevator is operational.

717. Pit Room—Column of matrix grid that shows whether or not floor has a pit room. A pit room is the empty space at the bottom of elevator shaft that elevator does not go into and elevator stops above the "pit".

718. This shows the grid of matrix which provides interface for user to define location specific elevator attributes for all banks entered. In this example, this matrix refers to elevator bank PE-9 which contains one car (therefore one grid is displayed).

719. Car Name—Enter the car name, number, or other designator for this car here.

720. Freight—Check this box if this is a Freight car

721. This Back button (at bottom of each matrix page) takes user to each previous elevator bank matrix until user reaches the summary view of Elevator Banks, keeping user within Building Elevator Banks section.

722. The Next button (at bottom of each elevator matrix page) takes user to each subsequent elevator bank matrix page until user reaches the end of all elevator bank grids, keeping user within Building Elevator Banks section.

Figure 8:
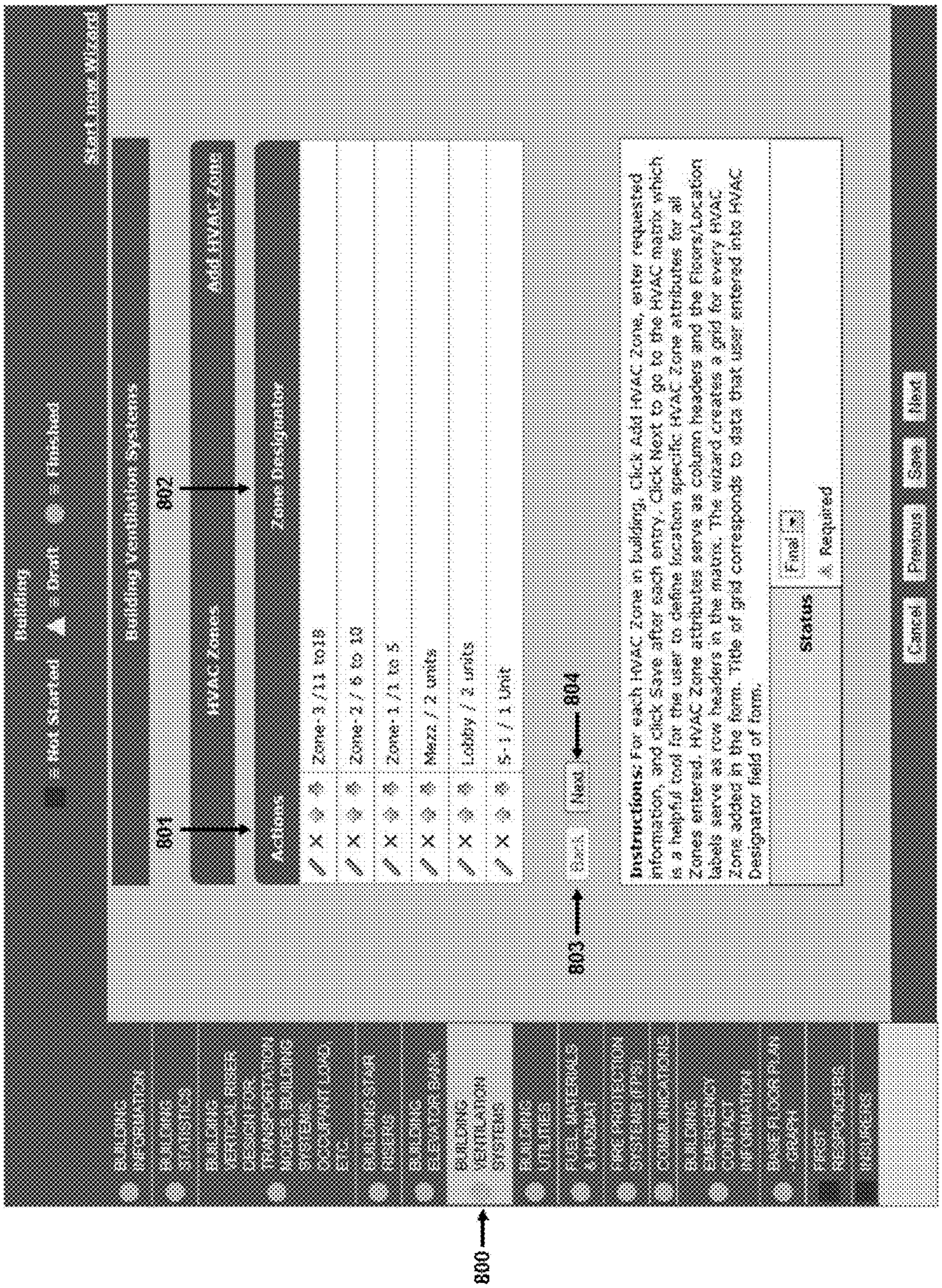
FIG. 8 is a screenshot of the Building Ventilation Systems section and summary view.

FIG. 8 is a screenshot of the Building Ventilation Systems section and summary view of Heating Ventilation and Air Conditioning (HVAC) Zone information. This section captures HVAC Zone information such as HVAC Zone Designator and Floor/Location of HVAC Zone. Within this section is an HVAC Zone matrix which is a helpful tool for the user to define location specific HVAC Zone attributes for all HVACs entered by simply clicking in a grid.

800. Building Ventilation Systems—Click here to open Building Ventilation Systems section.

801. Actions—Controls for editing, deleting, and reordering HVAC Zone information 802. Summary view of Building Ventilation System information 803. Back—This Back button takes user from the HVAC matrix and returns user to this summary view page of Building Ventilation Systems.

804. Next—User clicks Next to proceed to the HVAC matrix. The HVAC matrix is a helpful tool for the user to define location specific HVAC Zone attributes for all Zones entered.

FIG. 8-A is a screenshot of the form that opens when user clicks "Add HVAC Zone".

805. Add HVAC Zone—This is where user clicks to open the form to enter HVAC Zone information.

806. HVAC Designator—Enter the name of the HVAC Zone here followed by Floors/Location that the Zone covers 807. Click Save to save entries or changes in data entry form and remain in Building Ventilation Systems section.

808. Click Cancel to cancel entries or cancel changes in data entry form while remaining in Building Ventilation Systems section.

FIG. 8-B is a screenshot of the HVAC matrix which is a helpful tool for the user to define location specific HVAC Zone attributes for all Zones entered. FIG. 8-B shows the HVAC Zone attributes available which serve as column headers and the Floors/Location labels which serve as row headers.

809. Title of grid corresponds to data that user entered into HVAC Designator field of form. The wizard creates a grid for every HVAC Zone added in the form.

810. Floors Serviced—Column of matrix grid that refers to the floors/locations that are provided with air/ventilation service from HVAC Zone indicated.

811. Mechanical Equipment Room [MER]—Column of matrix grid that indicates the Floor(s)/Location of Mechanical Room(s). A mechanical room typically houses equipment such as air handlers, boilers, chillers, control panels and associated electrical equipment which allows a person to manage and control the ventilation system from a central location. Knowing the location of the mechanical room is vital in an emergency. An example might be in the event of a fire, the HVAC might need to be shut down to help prevent the spread of a fire in the building.

812. This is the grid segment of matrix where user clicks in any of the grey boxes to select attributes and Floors/Location specific to HVAC Zone indicated. A selected box turns green and the user can deselect that box by clicking on it again, which returns box to grey color.

813. Clicking this Back button allows users to return to summary table view page or to a previous matrix page while remaining in Building Ventilation Systems section.

814. Clicking this Next button allows users to proceed to matrix from the summary table view and/or proceed to any subsequent matrix pages while remaining in Ventilation Systems section.

Figure 9:
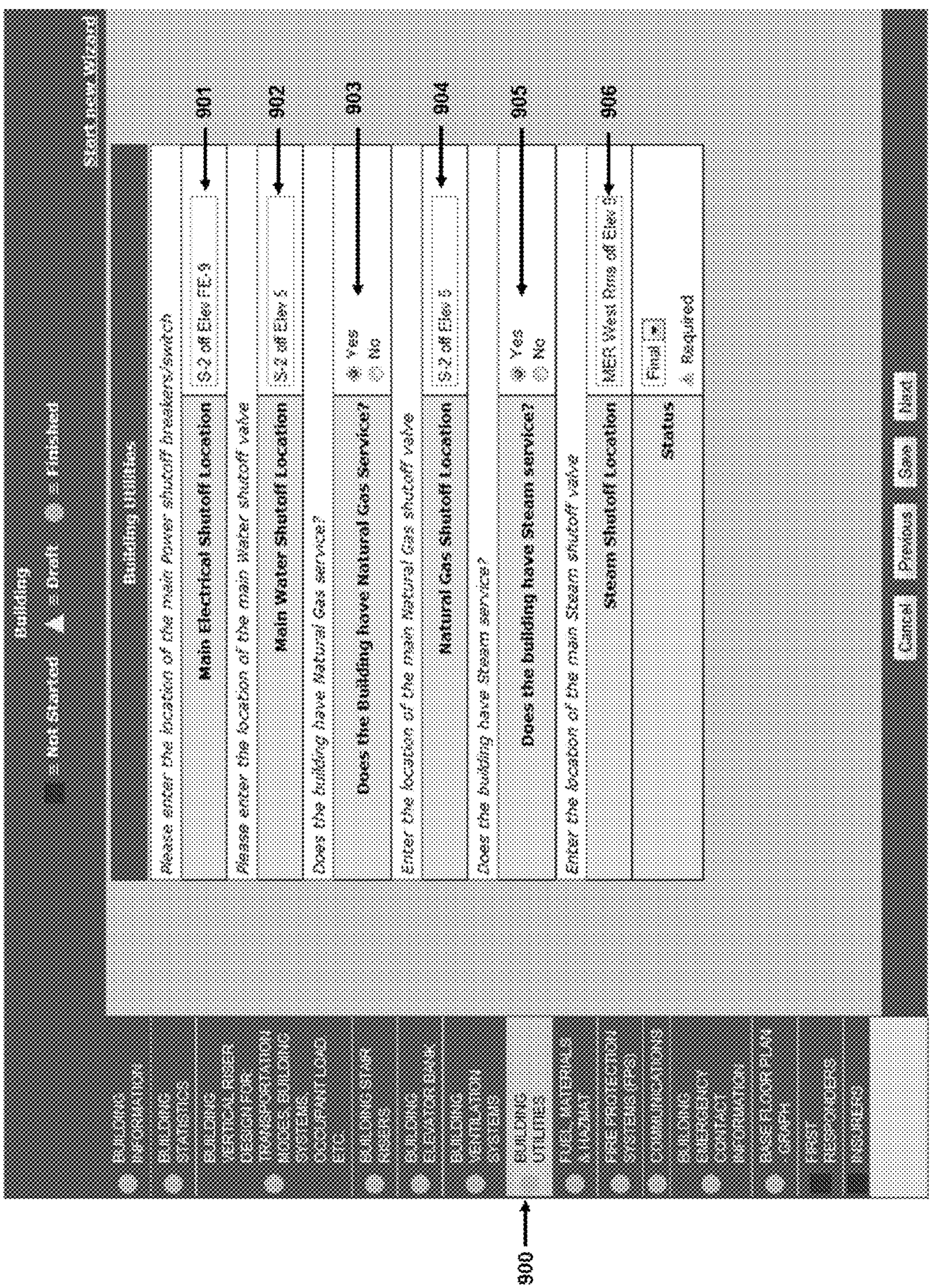
FIG. 9 is a screenshot of the Building Utilities section.

FIG. 9 is a screenshot of the Building Utilities section which captures information such as electrical shutoff location, water shutoff location, whether or not building has natural gas service, natural gas shutoff location, whether or not building has steam service, and steam service shutoff location.

900. Building Utilities—Click here to open the Building Utilities section and data entry form.

901. Main Electrical Shutoff Location—User enters the location of the main Power shutoff breakers/switch in this field of data entry form.

902. Main Water Shutoff Location—User enters the location of the main water shutoff valve here.

903. Does the Building Have Natural Gas Service?—User answers the question by clicking either the Yes or the No radio button.

904. Main Natural Gas Shutoff Location—User enters the location of the main Natural Gas shutoff valve here.

905. Does the building have Steam Service?—User answers the question by clicking either the Yes or the No radio button.

906. Main Steam Shutoff Location—User enters the location of the main steam shutoff valve here.

Figure 10:
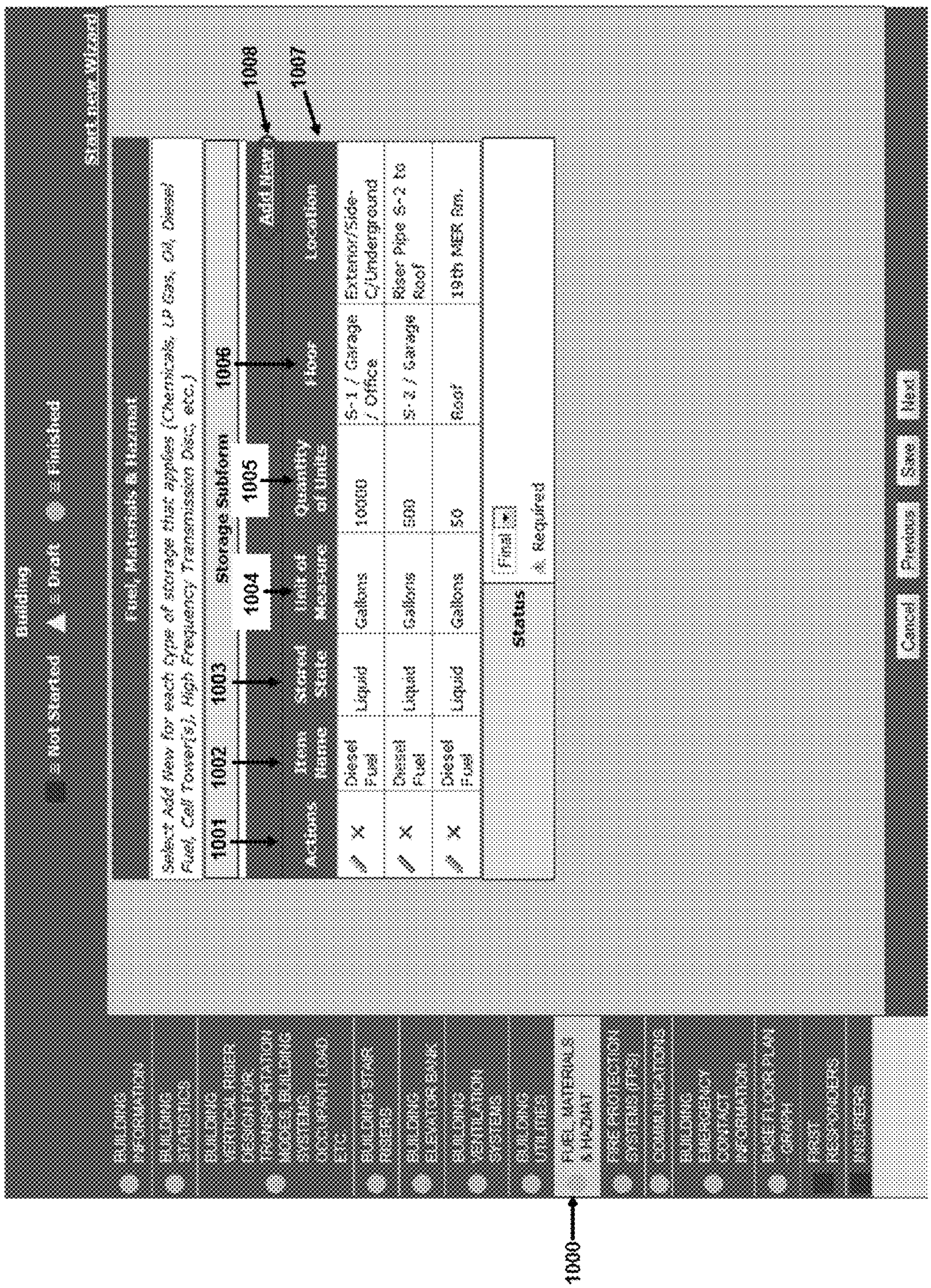
FIG. 10 is a screenshot of the Fuel, Materials, & Hazmat storage section.

FIG. 10 is a screenshot of the Fuel, Materials, & Hazmat storage section. This section captures detailed information regarding hazardous materials storage on the premises of the building or property. The data entry form also includes a segment in which the user can upload the corresponding MSDS file. A material safety data sheet (MSDS) is a form with data regarding the properties of a particular substance.

Figure 21:
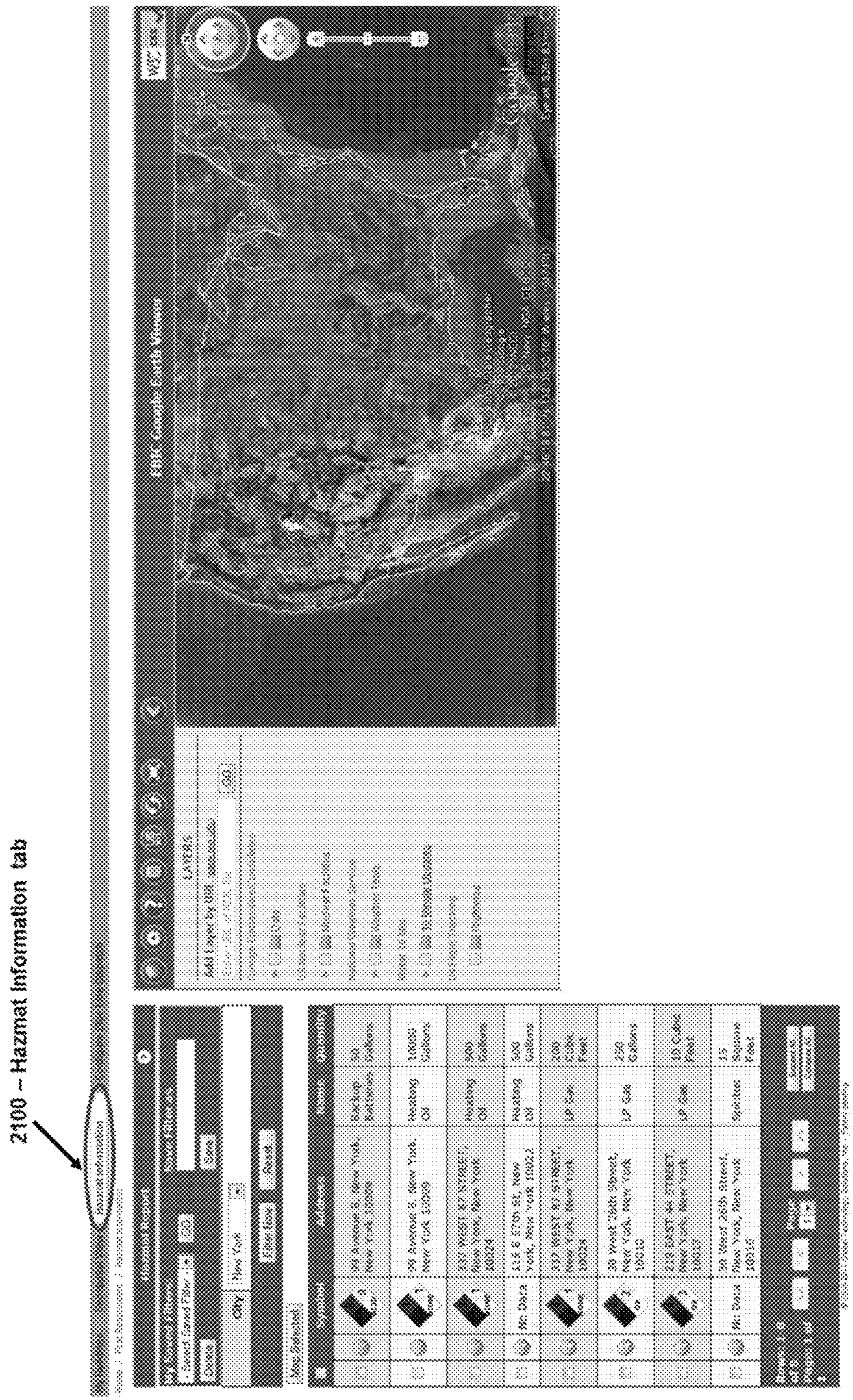
FIG. 21 is a screenshot of the Hazmat Information page.

The eBIC application uses information collected here to create hazmat reports with appropriate placards for quick reference and provides First Responders with the ability to map aggregate hazardous materials information with type of material and quantity (see FIG. 21 through FIG. 21-C, items 2100 through 2104 for how this information is used by First Responders in the Hazmat Report interface). When user has selected Hazard Classification, the eBIC application automatically requires the user to rank the degree for each type of hazard from each of the following four fields: Fire Hazard, Health Hazard, Reactivity, and Specific Hazard. Where applicable, the eBIC application, in accordance to the National Fire Protection Association (NFPA) labeling system, creates a diamond shape symbol made up of four colors to represent four different hazards. The ranking numbers in each diamond range from 0 (minimal hazard) to 4 (severe hazard). Special symbols and letters are found in the white section of the diamond such as "OX" for "oxidizer" or "W̶" for "Use no water". The resulting diamond symbol, when applicable, is displayed in the eBICard and in the Hazmat Reporting section for First Responders (see FIG. 21 through FIG. 21-C, items 2100 through 2104).

1000. Fuel, Materials, & Hazmat—Click here to open the Fuel, Materials, & Hazmat storage section of wizard.

1001. Actions—Controls for editing and deleting information regarding storage of fuel, materials, and hazardous materials.

1002 through 1007. Summary table view of storage information regarding type and location of item stored.

1008. Add New—Click here to open data entry form and add information for each type of storage that applies.

FIG. 10-A is a screenshot of the data entry form, called Storage Subform, for this section.

1009. Item Name—Type the name of the item being stored here.

1010. Stored State—Select the stored state of the material from the dropdown menu. The dropdown menu includes the following choices: none, Solid, Liquid, Liquid Gas Under Pressure, Gas, or Not Applicable.

1011. Unit of Measure—Select unit of measure for stored item by clicking on radio button. Choices include: Gallons, Pounds, Cubic Feet, Square Feet, or Pieces/Units.

1012. Quantity of Units—Enter the quantity of units being stored by typing the number into this field.

1013. Floor—Select the floor where the items are stored from the dropdown menu.

1014. Location—Enter the location where the items are stored by typing it into this field.

1015. CAS Number—Enter the CAS Number for this substance if applicable by typing it into this field.

1016. Hazard Classification—Select hazard classification from the dropdown menu. The dropdown menu includes the following: none; Class 1—Explosives; Class 2—Compressed Gasses; Class 3—Flammable Liquids; Class 4—Flammable Solids; Class 5—Oxidizers; Class 6—Poisons; Class 7—Radioactives; Class 8—Corrosives; Class 9—Miscellaneous; or None of the above.

1017. UN Number—Enter 4 digit UN or NA number if applicable by typing it into the form field.

1018. Fire Hazard—Select a value for fire hazard from the dropdown menu. The choices from the dropdown menu include the following: none; 4—Below 73 Degrees F; 3—Below 100 Degrees F; 2—Below 200 Degrees F; 1—Above 200 Degrees F; or 0—Will Not Burn.

FIG. 10-B shows a continuation of the data entry form for this section.

1019. Health Hazard—Select a value from the dropdown menu for health hazard. The dropdown menu includes the following choices: None; 4—Deadly; 3—Extremely Hazardous; 2—Hazardous; 1—Slightly Hazardous; or 0—Normal Material

1020. Reactivity—Select a value for reactivity from the dropdown menu. The dropdown menu includes the following choices: None; 4—May Detonate; 3—Shock and Heat May Detonate; 2—Violent Chemical Change; 1—Unstable if Heated; or 0—Stable.

1021. Specific Hazard—Select a value for specific hazard from the dropdown menu. The dropdown menu includes the following choices: Oxidizer, Simple Asphyxiants, Acid, Alkali, Corrosive, Use No Water, Radiation Hazard, or None.

1022. MSDS—If the item has an MSDS form associated with it then the user can upload it here by clicking on "Choose File" button. A material safety data sheet (MSDS) is a form with data regarding the properties of a particular substance

1023. Submit—Click here to submit information entered and remain in Fuel, Materials, & Hazmat storage section.

1024. Cancel—Click Cancel button to cancel entries or cancel changes in data entry form while remaining in Fuel, Materials, & Hazmat storage section.

Figure 11:
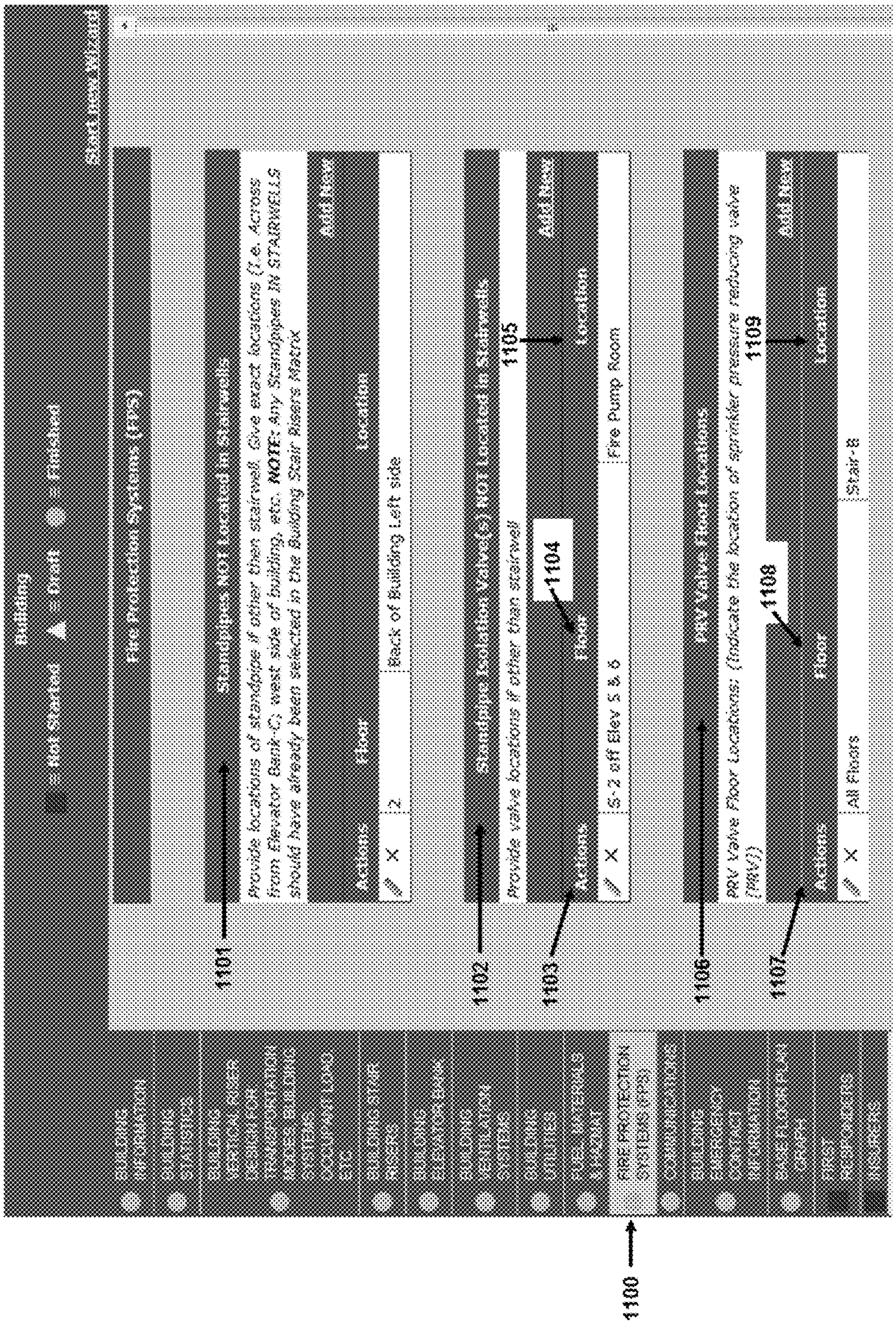
FIG. 11 is a screenshot of the Fire Protection Systems section.

FIG. 11 is a screenshot of the Fire Protection Systems section. This section collects data regarding standpipes & standpipe isolation valves NOT located in stairwells; PRV valve locations; whether or not pre-action system is in place; fire pump locations; and fire extinguishing system locations.

1100. Fire Protection Systems (FPS)—Click here to open the Fire Protection Systems section.

1101. This segment captures the location(s) of standpipes or standpipe connections NOT located in the stairwells. The summary view is displayed here when data has been entered for this segment and includes an action column, floor column, and location.

1102. This segment captures the locations of standpipe isolation valves NOT located in stairwells.

1103. Actions—Controls for editing and deleting location information of standpipe isolation valve(s) NOT located in stairwells.

1104 through 1105. Summary table view of the location(s) of standpipe isolation valve(s) NOT located in stairwells. (e.g. Remote hose connection in corridor 150 feet off Stair-B).

1106. This segment captures the location(s) of sprinkler pressure reducing valve(s) [PRV].

1107 through 1109. Summary table view of the location(s) of the sprinkler pressure reducing valve(s) (PRV).

FIG. 11-A is a continuation of the screenshot of the Fire Protection Systems section.

1110. This segment indicates whether or not a pre-action system is in place in the building.

1111. User clicks either the Yes or the No radio button to answer the question "Pre-Action System in Place?" A pre-action system is normally closed and operated by a separate fire detection system. Activation of a fire detector will open the pre-action valve, allowing water to enter the system piping.

1112. This segment captures the location(s) of any fire pumps that are on the premises along with the GPM (Gallons Per Minute) information. When information is entered into the data entry form for this segment, this is where the summary table view would be displayed and would include the Action column, Location column, and GPM column information. (There is no data in this segment for this example; therefore, there is no summary table displayed).

1113. This segment captures information about the building's fire extinguishing systems such as the type and location.

1114. Actions—Controls for editing and deleting fire extinguishing system information.

1115 through 1116. Summary view table of fire extinguishing system information.

FIG. 11-B is a screenshot of the first two forms within the Fire Extinguishing System section.

1117. Add New—Click here to open the data entry form for the segment Standpipes (STDP) NOT Located in Stairwells in order to provide standpipe locations if other than stairwell.

1118. Floor—Type the floor, where STDP (NOT in stairwells) is located, into this field.

1119. Location—Type the exact location in this field. (e.g., remote hose connection in corridor 150 feet off Stair-B). NOTE: Any standpipes IN STAIRWELLS should have already been selected in the Building Stair Risers Matrix.

1120. Submit—Click here to submit information entered and remain in Fire Extinguishing section.

1121. Cancel—Click here to cancel information entered while remaining in the Fire Extinguishing section.

1122. Add New—Click here to open data entry form for the segment STDP Isolation Valve(s) NOT Located in Stairwells in order to provide valve locations if other than stairwell.

1123. Floor—Type the floor in which STDP isolation valve (NOT in stairwell) is located into this field.

1124. Location—Type the exact location of STDP isolation valve (NOT in stairwell) into this field.

1125. Submit—Click here to submit information entered and remain in Fire Extinguishing section.

1126. Cancel—Click here to cancel information entered while remaining in the Fire Extinguishing section FIG. 11-C shows a continuation of the data entry forms within the Fire Extinguishing System section.

1127. Add New—Click here to open data entry form for the segment Pressure Reducing Valves (PRV) Valve Floor Locations in which user indicates the location(s) of sprinkler (SPKR) PRV valves.

1128. Floor—Type the floor (in which SPKR/PRV valve is located) into this field.

1129. Location—Type the exact location of SPKR/PRV valve into this field.

1130. Submit—Click here to submit information entered and remain in Fire Extinguishing section.

1131. Cancel—Click here to cancel information entered while remaining in the Fire Extinguishing section

1132. Pre-Action System in Place?—Click either the YES or NO radio button to indicate whether a pre-action system is present in the building. A pre-action system is normally closed and operated by a separate fire detection system. Activation of a fire detector will open the pre-action valve, allowing water to enter the system piping.

1133. Location of Pre-Action System—Type the exact location of pre-action system into this field.

1134. Add New—Click here to open the data entry form for the segment Fire Pump Location in order to enter the locations of any fire pumps on the premises.

1135. Location—Enter location of fire pump into this field of the form.

1136. GPM—Enter the GPM (gallons per minute) into this field. GPM reflects the measurement of the flow rate.

1137. Submit—Click here to submit information entered and remain in Fire Extinguishing section.

1138. Cancel—Click here to cancel information entered while remaining in the Fire Extinguishing section FIG. 11-D shows a continuation of the data entry forms within the Fire Extinguishing System section.

1139. Add New—Click here to open the data entry form for the segment Fire Extinguishing Systems in order to provide the type and location of the fire suppression system.

1140. Location—Enter exact location of fire extinguishing system into this field, e.g., 1$^{st}$ Floor Restaurant, or 12$^{th}$ Floor Computer Room.

1141. Type—Select the type of fire extinguishing system from this dropdown menu. Choose one from the following choices: Carbon Dioxide, Clean Agent, Dry Chemical, Foam, Foam Water Sprinkler, Halogenated Agent, Halon, Water Mist, Water Spray, or Wet Chemical.

1142. Submit—Click here to submit information entered and remain in Fire Extinguishing section.

1143. Cancel—Click here to cancel information entered while remaining in the Fire Extinguishing section

1144. Actions—Controls for editing or deleting fire extinguishing system information.

1145 through 1146. Summary table view of fire extinguishing system information including location and type.

Figure 12:
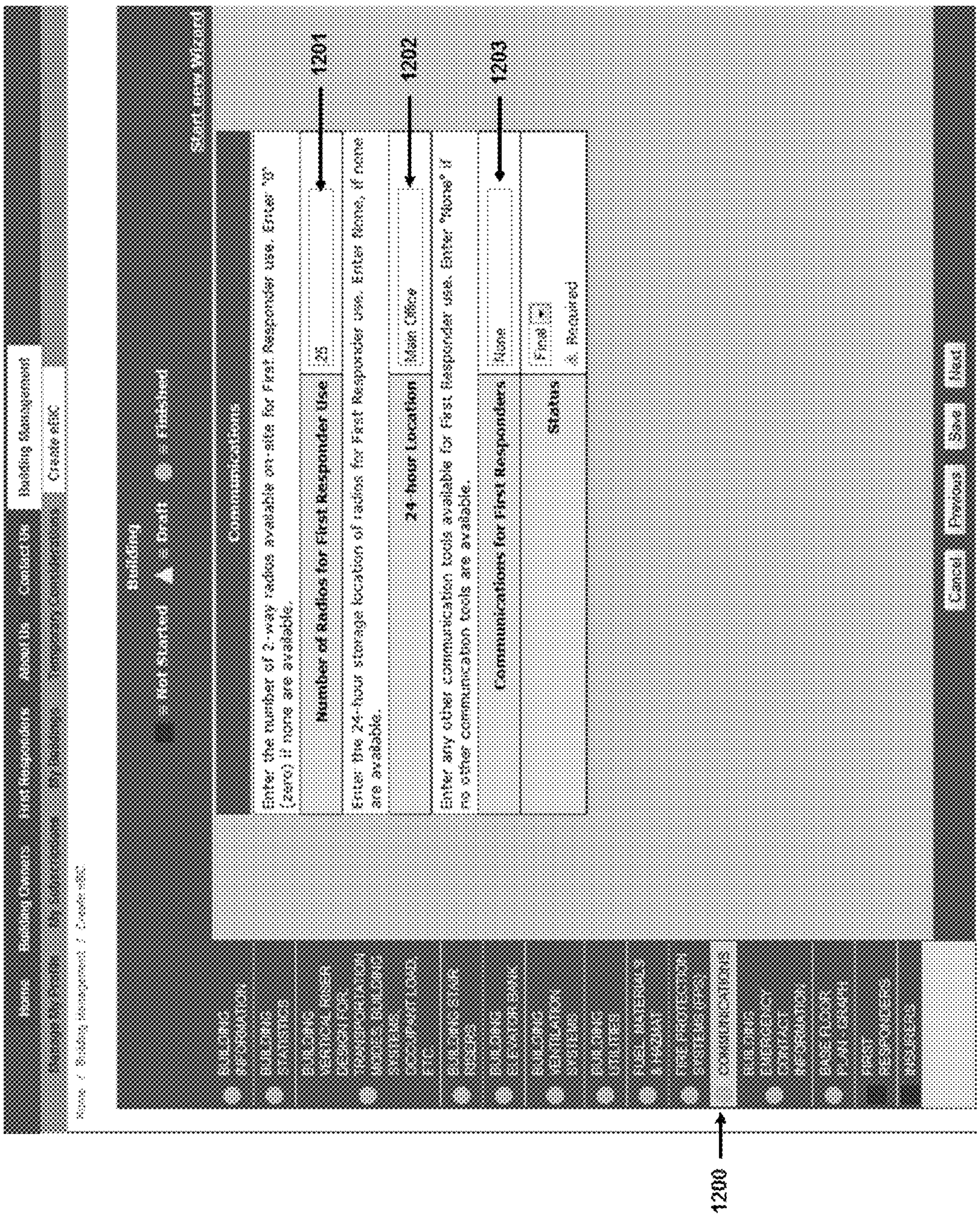
FIG. 12 is a screenshot of the Communications section.

FIG. 12 is a screenshot of the Communications section which captures communication devices and/or tools available for First Responder use.

1200. Communications—Click here to open the Communications section.

1201. Number of Radios for First Responder Use—Enter the number of 2-way radios available on-site for first responder use in this field of the form. Enter "0" (zero) if none are available.

1202. 24-Hour Location—Enter the 24-hour storage location of radios for First Responder use. Enter NONE, if none are available.

1203. Communications for First Responders—Enter any other communication tools available for First Responder use. Enter "None" if no other communication tools are available.

Figure 13:
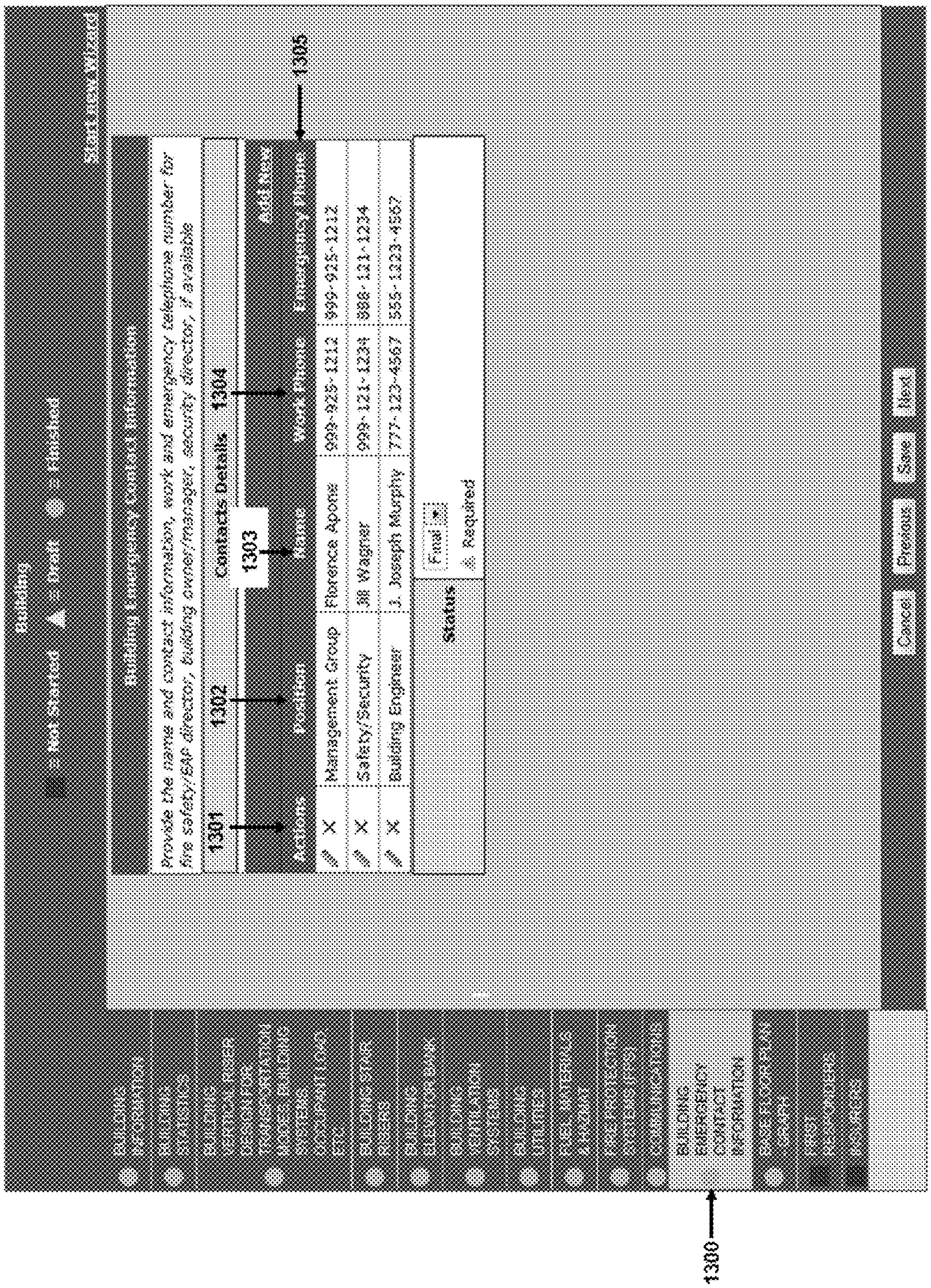
FIG. 13 is a screenshot of the Building Emergency Contact Information section.

FIG. 13 is a screenshot of the Building Emergency Contact Information section which captures the name and contact information for those qualified to help in the event of an emergency for that building.

1300. Building Emergency Contact Information—Click here to open the Building Emergency Contact Information section.

1301. Actions—Controls for editing or deleting building emergency contact information.

1302 through 1305. Summary table view of emergency contact information.

FIG. 13-A is a screenshot of the Building Emergency Contact Information form.

1306. Add New—Click here to open the Contacts Details form.

1307. Position—Type the person's title or position in this field of the form.

1308. Name—Type name of emergency contact here.

1309. Work Phone—Enter person's work phone number here.

1310. Emergency Phone—Enter person's designated emergency phone number here.

1311. Email—Enter email address of emergency contact person here.

1312. Submit—Click submit to save the information entered into data entry form and remain in the Building Emergency Contact Information section.

1313. Cancel—Click here to cancel an entry made into Contacts Details form and remain in the Building Emergency Contact Information section.

Figure 14:
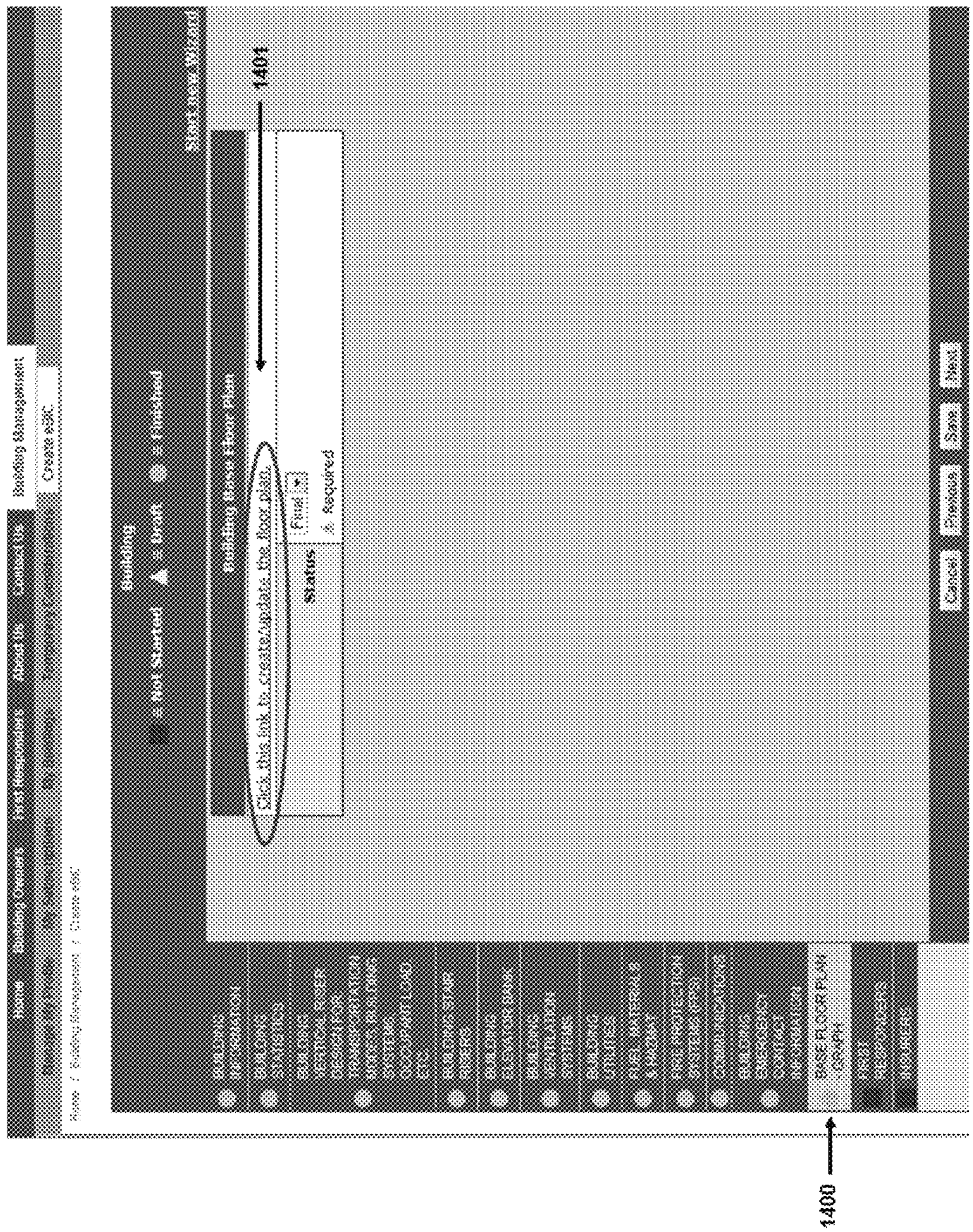
FIG. 14 is a screenshot of the Building Base Floor Plan section.

FIG. 14 is a screenshot of the Building Base Floor Plan section which provides user interface to create a floor plan for markup or update an existing floor plan.

1400. "Base Floor Plan—Graph"—Click here to open the Building Base Floor Plan section.

1401. Click this link to create/update the floor plan—Clicking this link takes user to a floor plan tool interface that allows user to choose floor plan out of computer files and mark it up with icons provided. See item 1407 for instructions in how to use floor plan tool.

FIG. 14-A shows results after user has chosen a floor plan file and used the icons on the right of page to mark it up.

1402. Choose File—Upload control for uploading building evacuation plan for mark up. The floor plan image file format needs to be either .jpg, .gif, or .png.

1403. Buttons that user can click to either Save floor plan, Save & Exit (which saves work and returns user to beginning of Base Floor Plan section), or Cancel which does not save floor plan and returns user to beginning of Base Floor Plan section.

1404. Floor plan indicators/icons used to graphically show information about or near the building such as the building: Exposures [1, 2, 3, and 4]; Sides [A, B, C, and D]; places adjacent to building, compass indicator, primary entrance, etc.

1405. This shows an example of an uploaded floor plan that has been marked up using the eBIC floor plan tool.

FIG. 14-B is a continued screenshot of the floor plan tool page showing the rest of the icons available for marking up image as well as user instructions for using the tool.

1406. Continuation of the rest of the floor plan tool icons used for marking up image to graphically show information about or near the building such as elevator banks, stair riser information (e.g., Access, Fire Tower), fire department information (e.g., Fire Command Center, Sprinkler/Standpipe, etc.).

Figure 15:
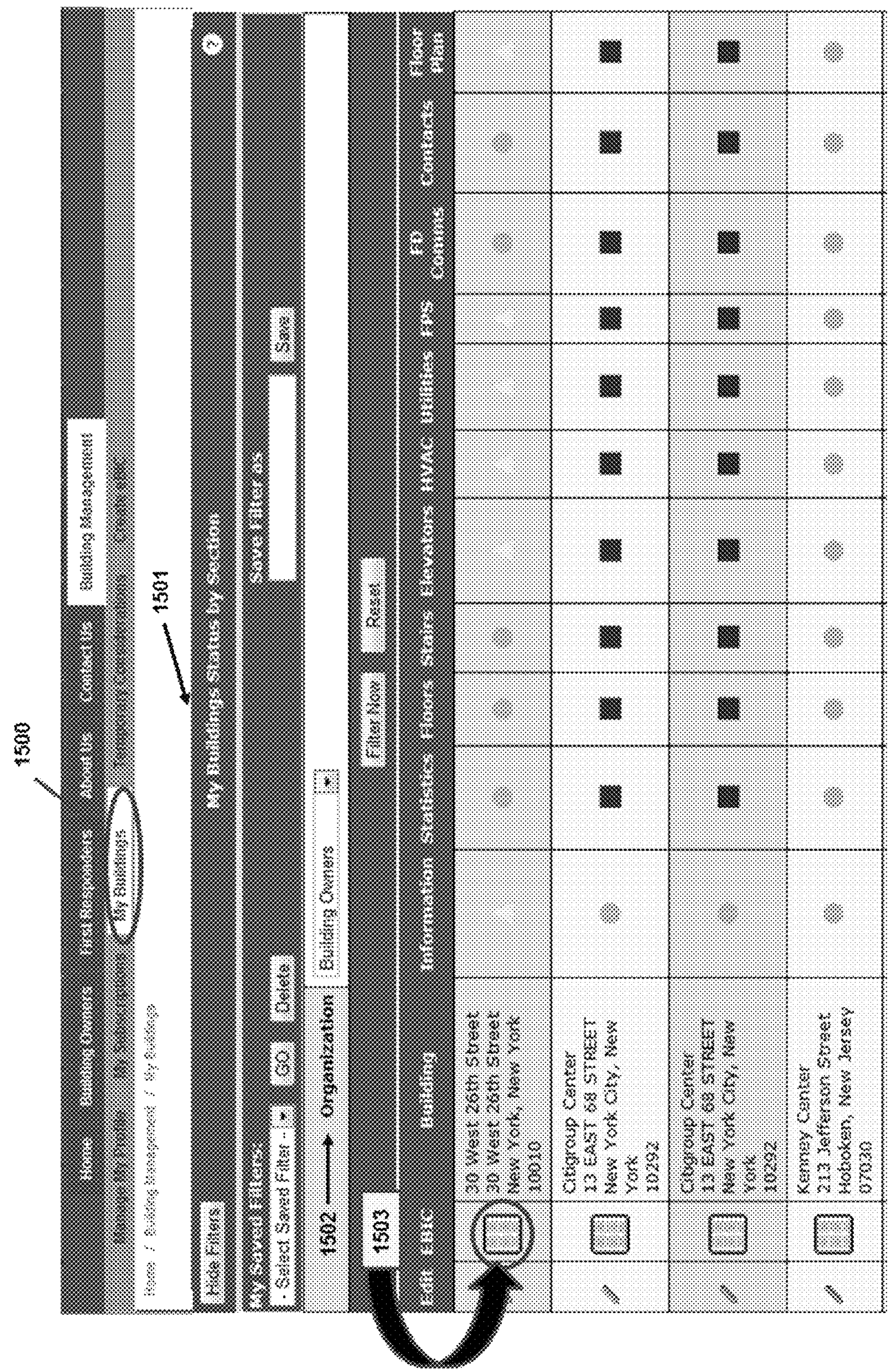
FIG. 15 is a screenshot of the My Buildings page.

1407. Instructions are displayed on this page to assist user in utilizing this floor plan tool: (1) Select floor plan image, (2) Select any placemark type by clicking on it, release click, move mouse over to floor plan image and click inside image (Click again to deselect, (3) If "Label" appears on the placemark then double click to change the label, (4) Resizable placemarks have a marker when mouse moves over them, (5) Hold CTRL key together with click to remove placemark, (6) Click+Mouse+drag=moves the placemark within image FIG. 15 is a screenshot of the My Buildings page which shows the My Buildings Status by Section table. The "My Buildings" interface enables user to see the status of completion for each section of wizard for each building and provides a link for editing building information (which takes user back to wizard for that building). Also, user may click a link that launches the card or eBIC for any building of interest from this interface.

1500. My Buildings—Click this tab to be taken to the My Buildings page. To edit or update an existing eBIC for a building simply click on "My Buildings".

1501. My Buildings Status by Section—Each section of the wizard is represented by a column in this table and indicates user's completion status: whether user has finished the section, or has not yet started the section, or is still working on it as a draft. This table includes all the building names and addresses represented in the rows along with controls for returning to the wizard for editing and a link to launch the printable eBIC.

1502. Organization—Select the organization of interest from the dropdown menu to bring up the list of buildings associated with that organization.

1503. Click this icon to launch a printable card known as the electronic Building Information Card or eBIC. The eBIC application takes essential building data entered into wizard for a building and the data entered regarding temporary considerations and impairments, and converts that information into an easy to read graphic view format resulting in the eBIC that also includes a cross vertical view of the building. See FIGS. 15-A through FIG. 15-C to see an example of an eBICard.

FIG. 15-A through FIG. 15-C are screenshots of the entire resulting eBIC for a building. FIG. 15-A through FIG. 15-B shows the first section of the card which includes easy- to-read table summary views of information. FIG. 15-B shows the eBIC's graphic cross vertical view of the building information. FIG. 15-C shows the marked up floor plan.

FIG. 15-D is a screenshot that further highlights the various parts of the My Buildings Status by Section table.

1505. Clicking this pencil icon allows user to edit the information for this building by returning user to the wizard. (see FIG. 15-E).

FIG. 15-E shows the wizard that is displayed when user clicks the pencil icon in the My Buildings Status by Section table (see FIG. 15-D, item 1505).

Figure 16:
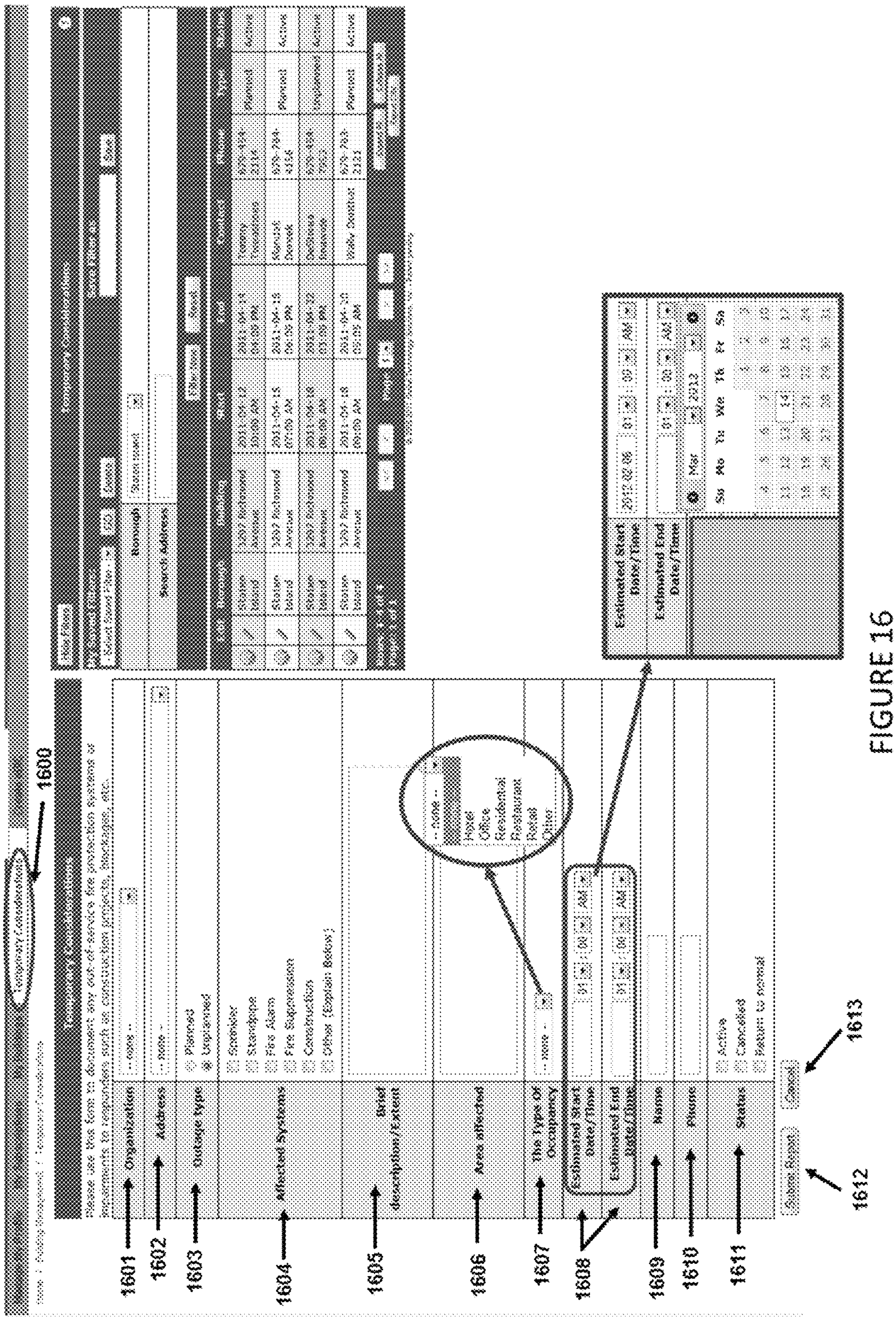
FIG. 16 is a screenshot of the Temporary Considerations [TC] page.

FIG. 16 is a screenshot of the Temporary Considerations [TC] page which is a split-screen interface that includes a Temporary Considerations form and an eBIC Fire Protection System (FPS) Out-Of-Service (OOS) viewer. The information collected is then automatically included in the eBIC. Information captured in this form includes any out-of-service fire protection system(s) or construction projects along with an estimated start date and end date for the type of outage or impairment. When First Responders log in they have access to the temporary considerations information entered by building owner and can use that information when utilizing the eBIC in generating operations guidelines and response plans. The eBIC OOS viewer (on the right side of the Temporary Considerations page) displays summary and detail information about out-of-service systems and impairments (from construction projects) for each building and includes a filtering interface that allows end-users to quickly get to the information they need.

1600. Temporary Considerations—Click this tab to go to the Temporary Considerations page

1601. Organization—Select organization of interest (which brings up all the building addresses tied to that organization in the Address dropdown menu).

1602. Address—Click here to choose address of building

1603. Outage Type—User chooses whether the Out Of Service (OOS) outage is Planned or Unplanned by clicking on the applicable radio button.

1604. Affected Systems—User clicks in checkbox next to each system that is affected. FPS items to choose from include sprinkler, standpipe, fire alarm, fire extinguishing systems, construction, and other.

1605. Brief Description/Extent—Briefly describe the problem with the systems affected and/or the impairments due to construction projects by typing it here. Also type the extent or basically the scope, range, size or degree of the out-of-service systems and impairments. This field especially must be completed if user has selected "Other" in the Affected Systems segment of form.

1606. Area Affected—Describe the entire area affected by typing it into this field box.

1607. The Type of Occupancy—Select the type of primary occupancy (of affected area) from the dropdown menu. Menu items include: none, Hotel, Office, Residential, Restaurant, Retail, or Other.

1608. Estimated Start Date/Time—Click in the blank box to bring up calendar interface to choose month, year, and day of estimated start date and do the same for the next segment for end date. Click in the dropdown buttons to the right to choose the estimated start time and then do the same in next segment to choose the estimated end time.

1609. Name—Name of person who is primary contact or responsible party for this building.

1610. Phone—Type phone number here (of the person entered in Name field).

1611. Status—Select whether the temporary consideration is active, cancelled, or has returned to normal by clicking in appropriate checkbox.

1612. Submit Report—Click here to save data entered into form. Upon clicking this button the information is also made available in the eBIC OOS viewer on the right (see FIG. 16-A and FIG. 16-B).

1613. Cancel—Cancels or clears information entered into form

FIG. 16-A is a screenshot of the eBIC OOS viewer which includes a summary table of the Temporary Considerations data along with the ability to display and print details of any one record. This viewer also contains filter controls which allows end-users to quickly get to the information they need.

1614. Hide Filters—"Hide Filters" toggles with "Show Filters" to hide and show the filter options.

1615. Save Filter As—Typing in a name in the "Save Filter As" field and clicking the "Save" button saves to the "My Saved Filters:" dropdown (item 1614).

1616. My Saved Filters—Includes a dropdown list of saved filters that user has saved for each table display or instance. User may select a saved filter from the "My Saved Filters:" dropdown and click "Go" to run the filter or click "Delete" to delete the filter

1617. Borough—This is a filter control for user to narrow their search by choosing a particular borough from the drop-down menu. This field in the eBIC application is customizable to be City or Name of Building, for example, instead of Borough.

1618. Search Address—This is another type of filter option (called a Text Search Filter) in which user types the search address and clicks "Filter Now" to quickly get to the information needed with a more streamlined search parameter.

1619. Filter Now—Click "Filter Now" button to run the filter parameters set in the filter options located just above it.

1620. Reset—Clicking this button clears all entered values from filter controls and resets the data table to the default display.

1621. Click on (the pencil icon) to edit the Temporary Considerations information for this building. Clicking this button automatically fills the Temporary Considerations form (on left side of screen) with the information for this building for user to make changes or additions. Once user clicks the Submit button, the updated information is automatically updated in the eBIC OOS viewer.

1622. This is the "Show Details" magnifying glass button which is represented by a magnifying glass icon in far left column for each row. Upon clicking, the details of the record (or row) are displayed in a Table. In this example, the magnifying glass was clicked next to "Anderson Building" ($2^{nd}$ row in table) to display the resulting details in a Table format as shown in item 1621. "Show Details" toggles with "Hide Details".

1623. Click this "Hide Details" magnifying glass button represented by an upside down magnifying glass icon, to close the detail view for that record.

1624. Print Button—Click when you want to print the details for that particular record.

FIG. 16-B is a screenshot of a close up view of the Out-Of-Service Temporary Considerations viewer. User has the option to see detailed view of each record (or row) and has the option to see summary view of data. User also has the option to export the Temporary Considerations data results to a Comma Separated Value (CSV) file format.

1625. Click on the "Expand All" button to show details of all rows of results set in a table which may then be viewed by scrolling up and down. This is helpful when searching for something as it saves time to view already expanded details as you scroll instead of having to open each record (or row) one at a time to search.

1626. Click on the "Collapse All" button to set the results window back to the summary level. The "Collapse All" button hides the details of all rows of results set.

1627. Export CSV—Allows you to export the eBIC OOS Viewer data results to a CSV file format such as MS Excel.

Figure 17:
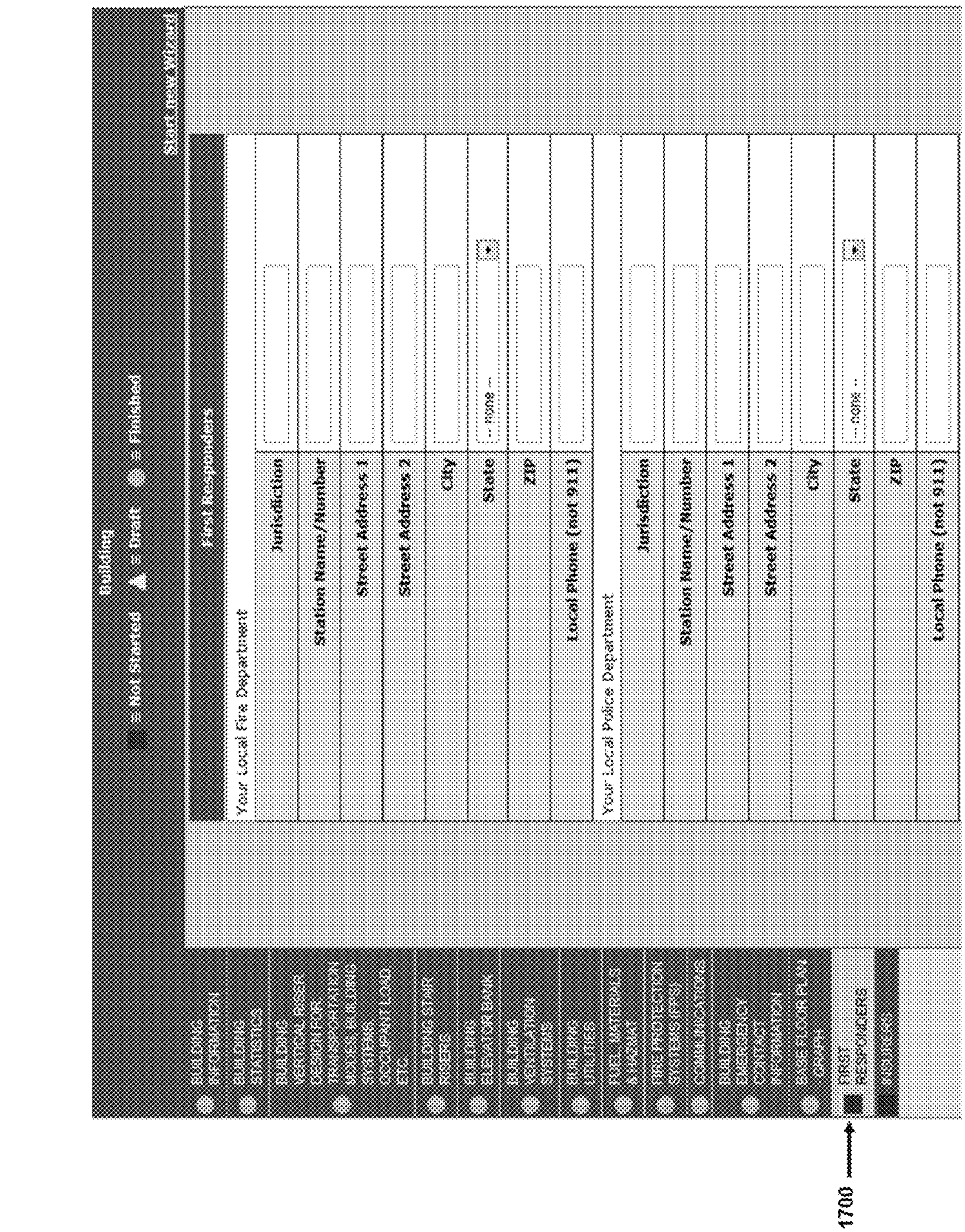
FIG. 17 is a screenshot of the First Responders section of wizard.

FIG. 17 is a screenshot of the First Responders section of wizard. This is where building owners choose their local First Responders with whom to share their building(s) information. The result is that upon logging into eBIC application, First Responders (who have been chosen) has access to that building owner's building(s) information. The First Responders section includes a data entry form that collects contact information including jurisdiction and station name/number for local Fire Department, local Police Department, and local Office of Emergency Management (OEM).

1700. First Responders—Click here to open the First Responders section of wizard.

FIG. 17-A is a screenshot of the continuation of First Responders data entry form. At the end of the form is an option for building owners to indicate whether or not to allow their building(s) information to be shared with federal response agencies in the event of an emergency.

1701. Share with Federal Agencies?—User indicates whether or not to allow sharing of their building information with federal response agencies by clicking a Yes or No radio button.

Figure 18:
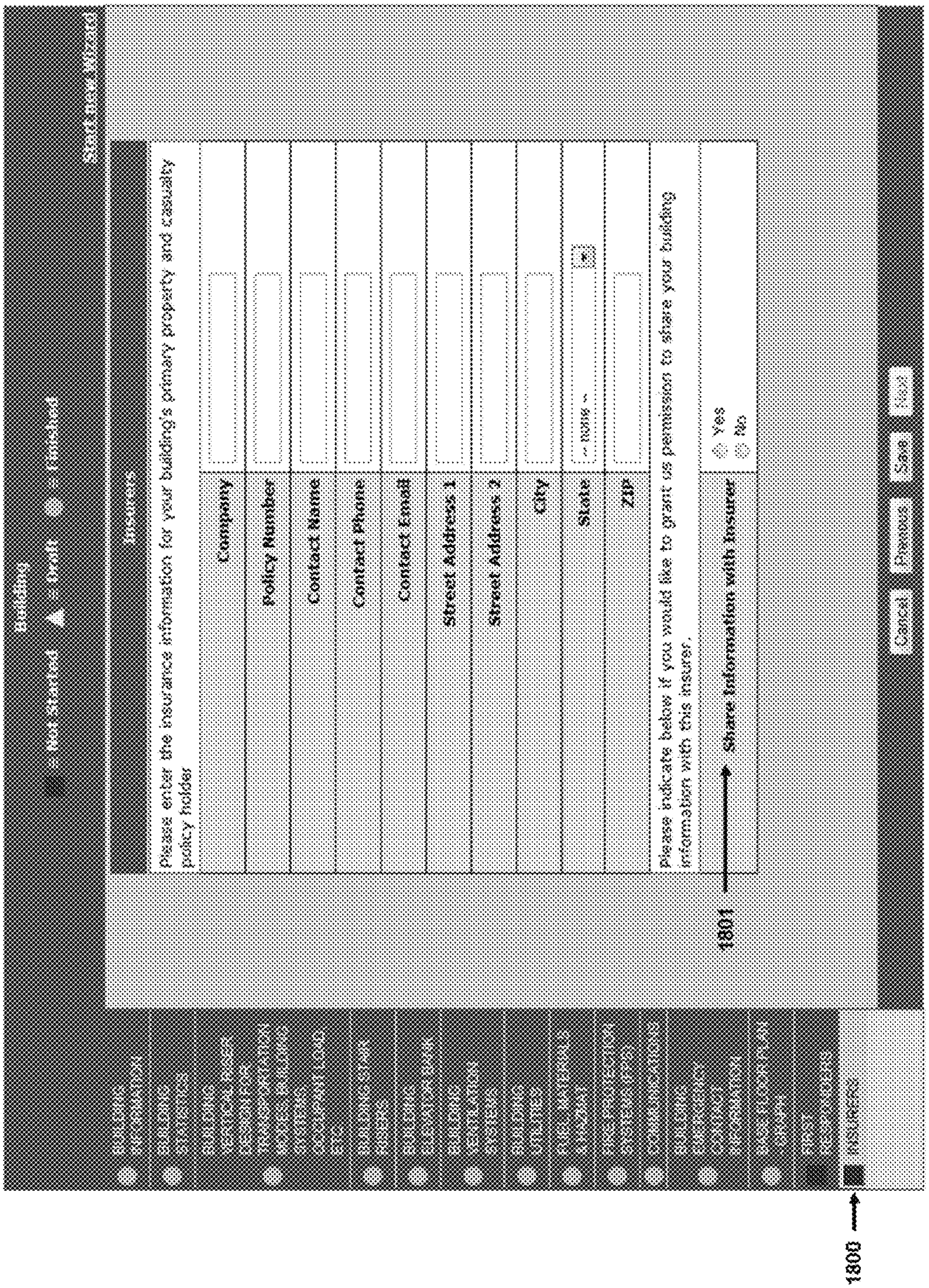
FIG. 18 is a screenshot of the Insurers section of wizard.

FIG. 18 is a screenshot of the Insurers section of wizard. User enters the insurance information for the building's primary property and casualty policy holder into the data entry form shown here. The form collects insurance company name, policy number, and contact information.

1800. Insurers—Click here to open the Insurers section of wizard.

1801. Share Information with Insurer?—User indicates whether or not to grant permission to share their building information with the insurer by clicking a Yes or No radio button.

Figure 19:
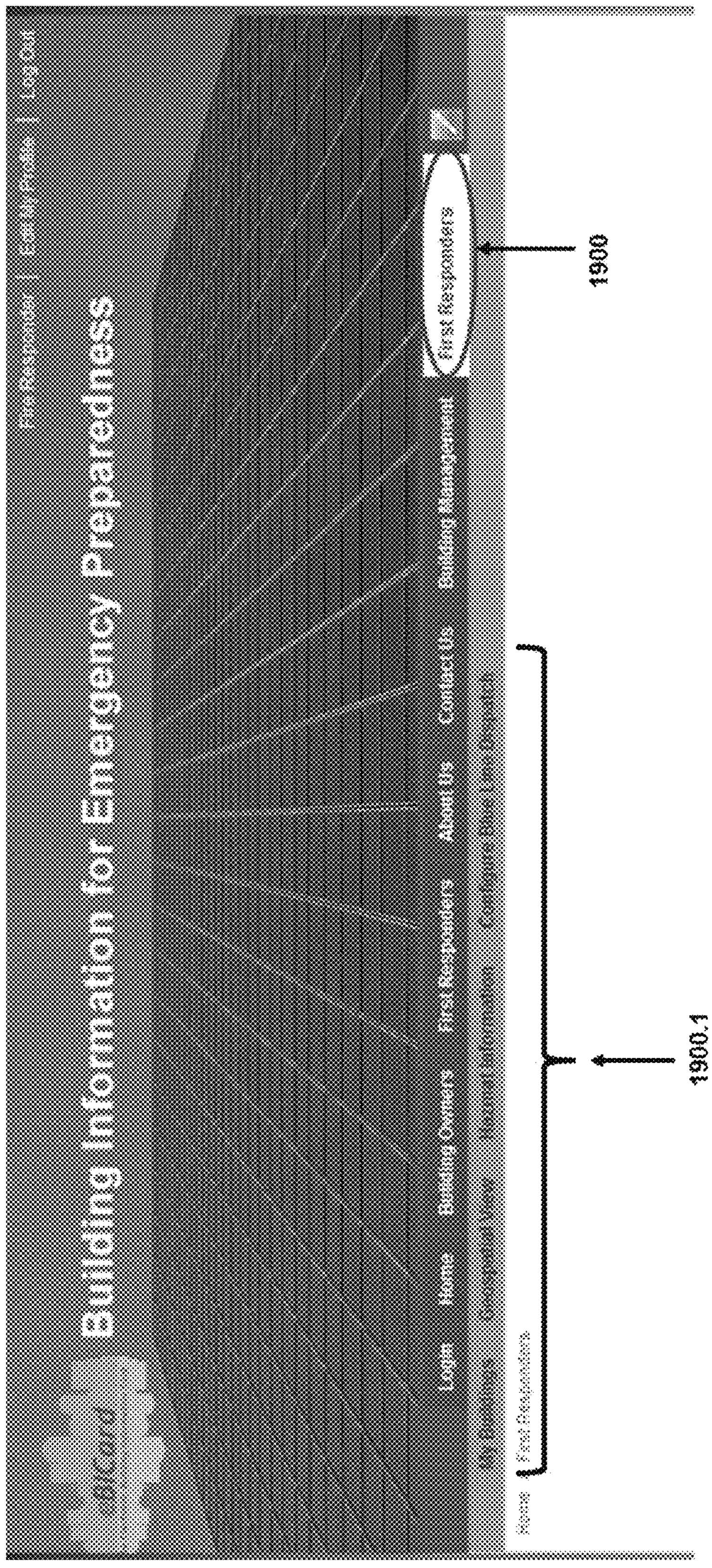
FIG. 19 is a screenshot of the First Responders page.

The following is applicable when a First Responder logs into the eBIC:

FIG. 19 is a screenshot of the First Responders page that is displayed after a First Responder logs in. The First Responder page is made up of 4 subpages: My Buildings; Geospatial View; Hazmat Information; and Configure Blue Line Dispatch.

1900. First Responders—Click here to open the First Responders page which contains four action subpages: My Buildings; Geospatial View; Hazmat Information; and Configure Blue Line Dispatch.

1900.1 Shows the four subpages of First Responders page: My Buildings; Geospatial View; Hazmat Information; and Configure Blue Line Dispatch.

FIG. 19-A is a screenshot of the My Buildings page of First Responders which contains the Building Status by Section viewer. This viewer allows First Responder to see summary level data for each building that includes the status of data entry completion for each section in wizard (data entered by building owner); along with status of completion of vetting and quality assurance of collected data and status of completion of the Operations Guidelines form both of which are tasks to be completed by First Responder. Furthermore, this viewer provides a filter interface for searching specific records; an eBIC button that opens the eBICard for that building; and a First Responder button (represented by a Fireman hat icon) that takes user to the Operations page that includes a split-screen interface for completing vetting and quality assurance of collected data and for completing the Operations Guidelines for that building. (See FIG. 19-F).

1901. My Buildings—Click this tab to go to the My Buildings page

1902. This is the filters segment which allows user to set filter parameters for getting specific data quickly and contains the following options:

Hide Filters—"Hide Filters" toggles with "Show Filters" to hide and show the filter options.

Save Filter As—Typing in a name in the "Save Filter As" field and clicking the "Save" button saves to the "My Saved Filters:" dropdown.

My Saved Filters—Includes a dropdown list of saved filters that user has saved for each table display or instance. User may select a saved filter from the "My Saved Filters:" dropdown and click "Go" to run the filter or click "Delete" to delete the filter State—This is a filter control for user to narrow their search by choosing a particular State from the dropdown menu. After choosing state, user has the option to narrow their search by then choosing a City in the dropdown menu.

Filter Now—Click "Filter Now" button to run the filter parameters set in the filter options located just above it.

Reset—Clicking this button clears all entered values from filter controls and resets the data table to the default display.

1903. The column headers for this table view include EBIC link, FDLink, Building, Information, Statistics, Floors, Stairs, Elevators, HVAC, Utilities, Hazmat, FPS, FD Comms, Contacts, Floor Plan, FD Ops, and FD Vetted.

1904. Click the building view icon to open the eBIC for this building. FIG. 19-B through FIG. 19-E show the eBIC that is displayed and is specific to the building in this row when the icon is clicked. Note: When user right-clicks with mouse on this eBIC icon, then the Blue-Line Dispatch menu displays (see FIG. 22-C). Blue-Line Dispatch Card is an eBIC that includes only the items that the First Responder has chosen. First Responder can set up various Blue-Line Dispatch Cards by using the form on the Configure Blue-Line Dispatch page where items to be included in card are selected.

FIG. 19-B shows first part of eBICard for this example (item 1904).

FIG. 19-C is a screenshot of the continuation of the eBICard for this example.

FIG. 19-D is a screenshot of the continuation of the eBICard for this example.

FIG. 19-E is a screenshot of the continuation of the eBICard for this example.

FIG. 19-F is a screenshot of the Operations interface that is displayed when user clicks the helmet icon from the Building Status By Section viewer.

1905. This is the emergency responder link helmet from the Building Status By Section viewer that when clicked opens the Operations interface shown in item 1906.

1906. This shows the Operations page which is made up of a split-screen interface with the comprehensive building information displayed on the left in a scrollable frame and the Vetting/Quality Assurance and Operations Guidelines forms in scrollable frames on the right.

FIG. 19-G is a close up of the first section of the comprehensive building information viewer on the left side of the Operations interface.

FIG. 19-H is a continuation of the comprehensive building information viewer on the left side of the Operations interface that is seen as user scrolls down the page.

FIG. 19-I is a continuation of the comprehensive building information viewer on the left side of the Operations interface that is seen as user scrolls down the page.

FIG. 19-J is a continuation of the comprehensive building information viewer on the left side of the Operations interface that is seen as user scrolls down the page.

FIG. 19-K is a continuation of the comprehensive building information viewer on the left side of the Operations interface that is seen as user scrolls down the page.

FIG. 19-L is a continuation and final segment of the comprehensive building information viewer on the left side of the Operations interface that is seen as user scrolls down the page.

FIG. 19-M is a screenshot of the two forms that make up the right side of the Operations split-screen interface. For this example, a member of the Fire Department has logged in and The Fire Department (FD) Operations Guidelines tab has been clicked which opens that form (shown in this figure) and next to that is the Vet Building Information tab which, when clicked, opens the form used by first responders for vetting and quality assurance. The Field Operations Guide For Building form, shown in this figure, provides an operational response planning tool wherein the First Responding Agencies can complete a plan in a split-screen interface with the comprehensive building information displayed on the left in a scrollable frame, and the response plan template displayed on the right in a scrollable frame providing a very intuitive and easy-to-use interface for pre-planning purposes. This particular Operations Guidelines form is tailored for use by Fire Department First Responders. The eBIC application automatically displays customized Operations Guidelines forms for other First Responding agencies such as Police, OEM and Emergency Medical Services (EMS), according to user log in rules. (Refer to FIG. 19-F for screenshot of full view of split-screen interface).

1907. FD Operations Guidelines—Click this tab to open the Field Operations Guide For Building form. This template is for First Responders to create their Field Operations Guide for the Building. The following is provided in the template to explain purpose of completing this guideline form: "Along with the eBICard for each of the following Public Agencies such as: Fire; OEM; EMS; Police Departments are able to vet the building for any emergency response that provides the First Responder with critical tactical considerations for a man-made or natural disaster prior to an incident. Pre-Incident Planning Guidelines: A pre-incident plan within the National Incident Management System (NIMS) framework assists the incident commander (IC) with an incident action plan (IAP) to enhance the overall fireground strategy, tactics, risk management and First Responder safety."

1908. $1^{st}$ Alarm Units Assigned—In this first segment of the Operations Guidelines form, the user lists the $1^{st}$ alarm fire units that are assigned to this address for an incident response. This segment provides a form for data entry as well as a summary view table that includes the unit type and designator.

1909. Add New—Click here to open the Alarm Units form. This form enables emergency responder to select Unit Type, assign a Unit Designator, and add any pertinent comments.

1910. Unit Type—Select Unit Type from the dropdown menu which includes the following types: None, Engine, Ladder, Rescue, Squad, Hazmat, Foam, or Other.

1911. Designator—Type name of alarm unit here.

1912. Comment—Type any pertinent comments in this box.

1913. Submit—Click here to save data entered into form (which is then added to summary table).

1914. Cancel—Cancels or clears information entered into form

1915. Summary view table that displays unit type and unit designator and includes an action column that contains controls for editing or deleting alarm unit information.

FIG. 19-N is a screenshot of the continuation of the Field Operations Guide For Building template. This area of the form captures names of the Chief Officers, Fire Apparatus Access information, and Engine Operations information.

1916. Type the Chief Officer(s) names in these two fields.

1917. Fire Apparatus Access—Type instructions and details that provide the best approach to this address and include any considerations that may hinder fire apparatus access close to building.

1918-1922. Segments in the rest of the form include Engine Operations, Ladder Operations, Battalion Chief Duties, Special Unit Consideration, and EMS Consideration. These segments are text fields allowing responder to type lengthy guidelines, instructions, descriptions and considerations as necessary. The following is the eBIC's online guidance/help included on this form to assist first responder in completing the rest of the form:

Safety and Precautions:

This section is for tactical concerns such as search rope methods, thermal imaging camera, etc. And for unique features within the building or the area around the building that may be a potential risk to firefighters and/or occupants during an emergency incident. For example: Truss roof construction—lightweight metal; 1500 gallon above-ground oil tank in basement, Side-D; an open shaft-way on roof, Side-A; heavy mechanical equipment on roof, Side-B; low exterior obstructions, Side-C, etc.

Special Instructions for Operations:

For example: assign responding unit(s) specific tasks such as lengthy hose line stretch, forcible entry, ladder placement, water supply, foam application, etc.

General Operations for: Refer to standard fire department operational procedures except as noted for the premises.

1918. Engine Operations—Text field for entering information according to online guidance/help where first responder types specific instructions, considerations, and guidelines with regard to engine operations. For example: Lines not to be stretched due to complexity of the building. Confirm best route to fire from closest available hose bed, etc.

FIG. 19-O is a screenshot of the continuation of the Field Operations Guide For Building form.

1919. Ladder Operations—Text field for entering information according to online guidance/help where first responder types specific instructions, considerations, and guidelines with regard to ladder operations.

1920. Battalion Chief Duties—Text field for entering information according to online guidance/help where first responder types specific instructions, considerations, and guidelines with regard to battalion chief duties. For example: Consider NIMS branches by sectoring the building for search coordination, etc.

1921. Special Unit Considerations—Text field for entering information according to online guidance/help where first responder types specific instructions, considerations, and guidelines with regard to special unit considerations. For example: Special tasks for Units such as: Rescue, Squad, Hazmat, Foam, Rehab, Mobile Communications, Mobile Command, Mobile Air, Water Tender, Thawing and Marine.

FIG. 19-P is a screenshot of the continuation of the Field Operations Guide For Building form.

1922. EMS Consideration—Text field for entering information according to online guidance/help where first responder types specific instructions, considerations, and guidelines with regard to EMS consideration. For example: Assign an ALS unit below the Operations floor to Staging and/or Rehab floor in a high-rise building, etc.

FIG. 19-Q is a screenshot of the last segment of the Field Operations Guide For Building form. This figure shows the Building Additional Information sub form which collects any additional information and enables the responder to upload a file.

1923. Add New—Click here to open the Building Additional Information form, which is the last segment of the Operations Guidelines template.

1924. Type—Select the type of building information to be added from the dropdown menu. Menu items include: None, Engine, Ladder, Rescue, Squad, Hazmat, Foam, or Other.

1925. Title—First Responder may type any title or subject in this field to help describe contents of information included in this form.

1926. Body—First Responder may type whatever is necessary here to provide any extra guidance, instructions, or supplemental reference information for this building.

1927. FileUpload—Click button labeled "Choose File" to upload a file. First Responder may upload diagrams, pictures or any other supplemental information that is helpful in the emergency response plan for building.

1928. Submit—Click here to submit information entered into form.

1929. Cancel—Click here to cancel or clear information entered, close form, and return to summary view.

FIG. 19-R is a screenshot of the Vet Building Information interface which includes the eBIC Vetting Form. Generally, this interface provides means for First Responder to verify the completeness and accuracy of building information that was entered into the eBIC. Following the entry of the Building Information to create eBIC, a Quality Assurance and Vetting interface is provided (shown in this Figure) wherein the First Responder Agencies can review and document any data issues (to then be shared with building owner) in a split-screen interface, with the comprehensive building information displayed on the left in a scrollable frame, and the quality assurance checklist template displayed on the right in a scrollable frame, providing a very intuitive and easy-to-use interface for information vetting purposes. This form is standardized for use by any First Responder Agency.

1930. Vet Building Information—Click this tab to open the eBIC Vetting Form.

1931. Vetting Complete—Click the YES or NO radio button to indicate whether the vetting has been completed or not; or, choose "In Process" if you need to save your work and complete the vetting at a later time.

1932. Your Name—Person who is actually preparing this form must type their first and last name in this text box.

1933. Date and Time of Vetting—Click in the blank box to bring up calendar interface to choose month, year, and day of vetting. Click in the dropdown buttons to the right to choose the vetting time. This must be updated each time user goes in to make any changes.

1934 through 1945—Information that was entered into the eBIC wizard is reviewed by scrolling through the Comprehensive Building Information Viewer on the left. When user is satisfied that an item is accurate and complete, then that item's box is clicked to indicate that the item's information is correct. Click the box in the Incorrect column to indicate when item is inaccurate or incomplete and include explanation with number of item in text box where indicated. Click the N/A box for any item that is intentionally blank or not applicable.

1934. Information—First Responder reviews the information displayed on the left in the Building Information section (shown in FIG. 19-F) and checks information for accuracy. For each item that is correct, user clicks in checkbox next to that item in the interface on the right.

1935. Statistics—First Responder reviews the information displayed on the left in the Building Statistics section (shown in FIG. 19-F) and checks information for accuracy. For each item that is correct, user clicks in checkbox next to that item in the interface on the right.

FIG. 19-S is a screenshot of the continuation of the form used for vetting and quality assurance purposes.

1936. Vertical Riser Design—First Responder reviews the information displayed on the left in the Vertical Riser Design section (shown in FIG. 19-G) and checks information for accuracy. For each item that is correct, user clicks in checkbox next to that item in the interface on the right.

1937. Stairwell Info—First Responder reviews the information displayed on the left in the Building Stairwells Summary (FIG. 19-H) and checks information for accuracy. For each item that is correct, user clicks in checkbox next to that item in the interface on the right.

1938. Elevator Banks—First Responder reviews the information displayed on the left in the Building Elevator Banks Summary section (shown in FIG. 19-I) and checks information for accuracy. For each item that is correct, user clicks in checkbox next to that item in the interface on the right.

FIG. 19-T is a screenshot of the continuation of the form used for vetting and quality assurance purposes.

1939. Ventilation Systems—First Responder reviews the information displayed on the left in the Ventilation Systems section (shown in FIG. 19-J) and checks information for accuracy. For each item that is correct, user clicks in checkbox next to that item in the interface on the right.

1940. Building Utilities—First Responder reviews the information displayed on the left in the Building Utilities section (shown in FIG. 19-J) and checks information for accuracy. For each item that is correct, user clicks in checkbox next to that item in the interface on the right.

1941. Hazardous Materials—First Responder reviews the information displayed on the left in the Hazardous Materials section (shown in FIG. 19-K) and checks information for accuracy. For each item that is correct, user clicks in checkbox next to that item in the interface on the right.

FIG. 19-U is a screenshot of the continuation of the form used for vetting and quality assurance purposes.

1942. Fire Protection Systems (FPS)—First Responder reviews the information displayed on the left in the Fire Protection Systems Summary section (shown in FIG. 19-K through FIG. 19-L) and checks information for accuracy. For each item that is correct, user clicks in checkbox next to that item in the interface on the right.

1943. Communications—First Responder reviews the information displayed on the left in the Communications section (shown in FIG. 19-L) and checks information for accuracy. For each item that is correct, user clicks in checkbox next to that item in the interface on the right.

1944. Emergency Contacts—First Responder reviews the information displayed on the left in the Building Emergency Contacts section and checks information for accuracy. For each item that is correct, user clicks in checkbox next to that item in the interface on the right.

FIG. 19-V is a screenshot of the continuation of the form used for vetting and quality assurance purposes.

1945. Building Base Floor Plan—Graph—Review uploaded floor plan by clicking the link in the viewer to the left and ensure markups are correct.

1946. Temporary Considerations & FPS Impairments—First Responder reviews the information displayed on the left in the Temporary Considerations & FPS Impairments and checks information for accuracy. For each item that is correct, user clicks in checkbox next to that item in the interface on the right.

Figure 20:
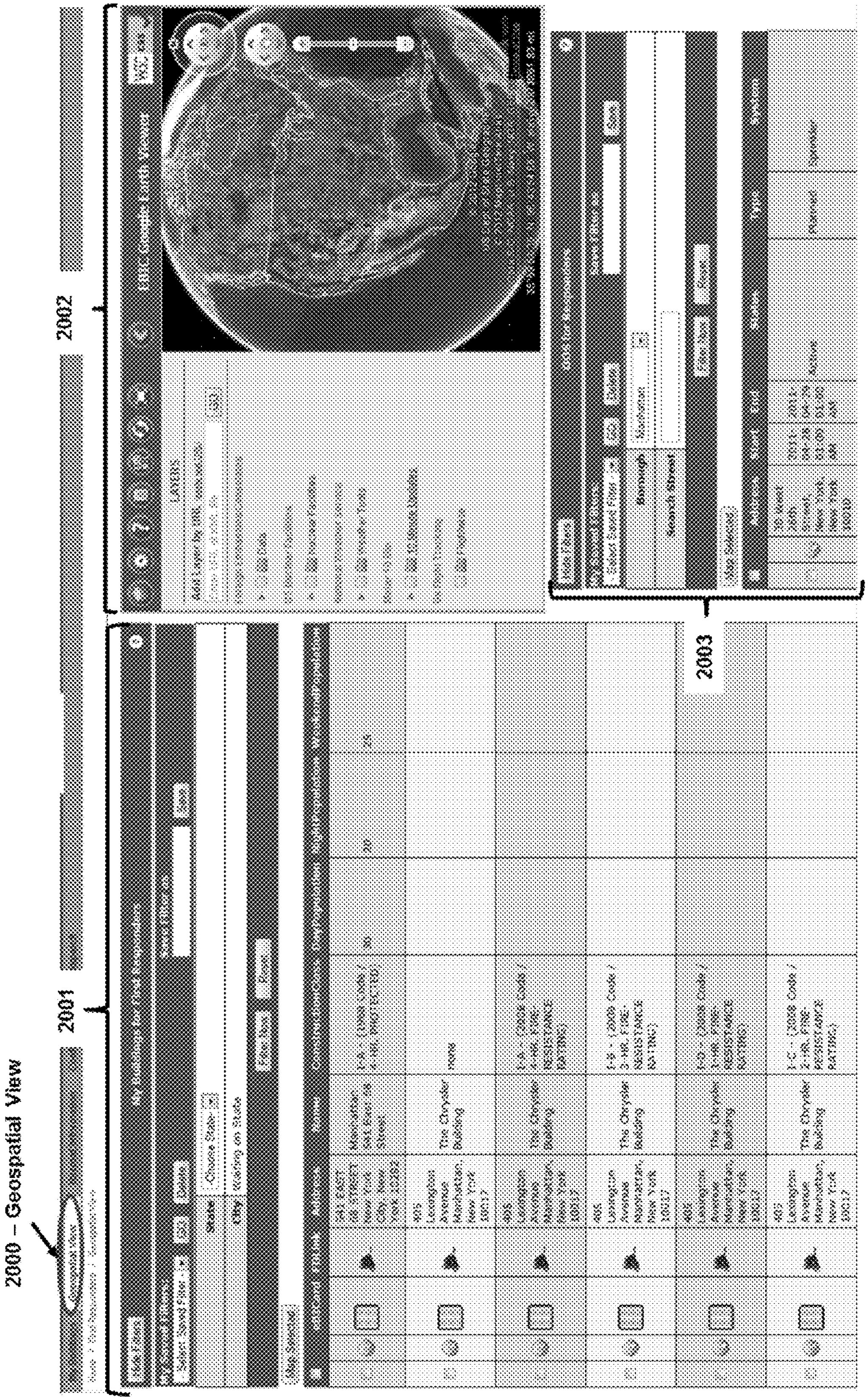
FIG. 20 is a screenshot of the Geospatial View page.

FIG. 20 is a screenshot of the Geospatial View page which is made up of three segments including the "My Buildings for First Responders" viewer, eBIC Google Earth Viewer, and the "Out-of-Service (OOS) for First Responders" viewer.

2000. Geospatial View—Click here to go to the Geospatial View page.

2001. My Buildings For First Responders—This interface provides choice of summary or detailed view of information for each building including Address, Name, Construction Class, Day Population count, Night Population count, and Weekend Population. This viewer also provides filter options, eBIC link (which opens eBIC for building), FDLink (which takes user back to the Operations split-screen interface), and a Mapping tool that enables First Responder to select one or more buildings from the table and plot their locations on the Google Earth interface to the right.

2002. eBIC Google Earth Viewer—This user interface enables First Responder to map locations of selected records containing specific information from "My Buildings . . . " viewer (item 2001) and from "OOS For First Responders" viewer (item 2003). The locations are automatically plotted on the Google Earth Viewer map (which is tied to viewers on same page) and represented by icons specific to type of information when mapping tool is used. "My Buildings For First Responders" viewer plots red push pin icons and the "OOS For First Responders" plots a red circle with white bar icon.

Also, First Responder can view various details on a balloon that is displayed when user clicks on icon in the map. The Google Earth Viewer is tied into NOAA by ZIP code for Atmospheric, wind, and other weather related information.

2003. OOS For First Responders—This viewer provides choice of summary or detailed information for every building that has an out of service system, construction project, or anything else that could result in impairments to response efforts. Main information provided includes the address, start date/time and end date/time of temporary property condition or system outage, status of this temporary consideration, whether condition is planned or unplanned, and the system(s) affected. This viewer also provides filter options and a Mapping tool that enables First Responder to select one or more buildings from the table and plot their locations on the Google Earth interface located above it.

FIG. 20-A is a close up screenshot of the "My Buildings For First Responders" viewer.

2004. Filter options segment—This viewer contains filter controls which allow end-users to quickly get to the information they need.

2005. Map Selected—This is the mapping tool segment of viewer. User clicks in box(es) in this far left column to select record(s) for mapping and then clicks the "Map Selected" button to plot the locations of selected records into the eBIC Google Earth Viewer.

2006. eBICard—Click icon in this column to open eBICard for a building.

2007. FDLink—Click this link to go to the Operations split-screen interface for the building in that row.

2008. This is the "Show Details" magnifying glass button which is represented by a magnifying glass icon in column for each row. Upon clicking, the details of the record (or row) are displayed in a pop-up window. In this example, the magnifying glass was clicked next to "541 EAST 68 STREET" (1st row in table) to display the resulting details in a pop-up window format as shown in FIG. 20-B.

FIG. 20-B is a screenshot of the resulting details in a pop-up window Blue-Line Dispatch format that displays when user clicks the magnifying glass in the table of the My Buildings for First Responders viewer. In this example, the magnifying glass was clicked next to "541 EAST 68 STREET" (1st row in table) to display the pop-up window shown in this figure.

2009. Details—Details view for any record in "My Buildings For First Responders" are displayed in a pop-up window as shown here in this example.

2010. This printer icon is available on every details view for each record. User clicks the printer icon in order to print only the details displayed for that record.

FIG. 20-C is a screenshot of an example of how the mapping tool works. First, user clicked in checkbox in far left column in the row containing the building of interest. Next, user clicked on the "Map Selected" button and the location of selection was automatically plotted in the eBIC Google Earth Viewer as shown in this figure.

FIG. 20-D is a continuation of the example begun in FIG. 20-C and shows the eBIC Google Earth Viewer close up. In this example, user has clicked the zoom-in button inside the map and has also clicked the red push pin icon to display the balloon which contains information about the location. In the balloon is general information about the building along with the exact latitude and longitude of location.

2011. Various details are shown inside this balloon which displays upon clicking icon on the map.

FIG. 20-E is a close up screenshot of the right side of the Geospatial View page which is made up of the eBIC Google Earth Viewer and the OOS For Responders interface.

2012. Shows the filter options/controls for the OOS For Responders viewer.

FIG. 20-F is a close up screenshot of the OOS For First Responders interface and is an example of how the mapping tool works.

2013. First, user clicked in checkbox in far left column in the row containing the building of interest. Next, user clicked on the "Map Selected" button and the location of selection was automatically plotted in the eBIC Google Earth Viewer as shown in FIG. 20-G.

FIG. 20-G is a continuation of the example begun in FIG. 20-F and shows the eBIC Google Earth Viewer close up.

2014. After user clicked on the "Map Selected" button, the location of selection was automatically plotted in the eBIC Google Earth Viewer as shown in this figure.

FIG. 20-H is a further continuation of the example begun in FIG. 20-F and shows the eBIC Google Earth Viewer close up.

2015. In this example, user has clicked the zoom-in button inside the map and has also clicked the red circle icon to display the balloon which contains information about the location including out of service/temporary building condition type and system(s) affected. Also in the balloon is general information about the building along with exact latitude and longitude of location.

FIG. 20-I is a screenshot of details view of a record from "OOS For First Responders" interface that is displayed after user clicks the magnifying glass. The details view is displayed in a table format. To hide or close the details just click the upside down magnifying glass for that record.

FIG. 21 is a screenshot of the Hazmat Information page which is a split-screen interface that provides Hazmat Reports on the left and the ability to map aggregate hazardous materials information with type of material and quantity on the right.

2100. Hazmat Information—Click here to open the Hazmat Information interface.

FIG. 21-A shows a close-up screenshot of the Hazmat Report interface which provides filter options, a mapping tool that is tied to the Google Earth Viewer on the right, and choice of detailed or summary view of hazardous materials storage information.

2101. Summary view of Hazmat Report data which includes a column for applicable diamond shape hazards symbol, building address, name of materials that are stored on the premises, and quantity of stored materials. (Where applicable as a result of data entry in eBIC wizard, the eBIC application, in accordance to the National Fire Protection Association (NFPA) labeling system, creates a diamond shape symbol made up of four colors to represent four different hazards. The ranking numbers in each diamond range from 0 (minimal hazard) to 4 (severe hazard). Special symbols and letters are found in the white section of the diamond such as "OX" for "oxidizer" or "~~W~~" for "Use no water". The resulting diamond symbol, when applicable, is displayed in the eBICard in addition to the Hazmat Reporting section.)

2102. The Hazmat Report interface provides a mapping tool in which user clicks checkbox(es) in far left column next to record(s) of interest and then clicks the "Map Selected" button to plot the hazardous materials information onto the eBIC Google FIG. 21-B is a close-up screenshot of the eBIC Google Earth Viewer located to the right of the Hazmat Report interface on the Hazmat Information page.

FIG. 21-C is a screenshot of how the Hazmat Report mapping tool works with the eBIC Google Earth Viewer.

2103. In this example, the user clicked the checkbox (in far left column) to select the record to be mapped. Next, the user clicked the "Map Selected" button and the hazmat information was then automatically plotted, according to building address, on the eBIC Google Earth Viewer to the right. The hazmat information is represented by a Hazmat diamond symbol icon on the map.

2104. When user clicked the diamond symbol icon on the map, a balloon was displayed (shown here) containing various information including: the type and quantity of materials stored on premises of building; building address; latitude and longitude of location; and a diamond shape hazards label when applicable.

Figure 22:
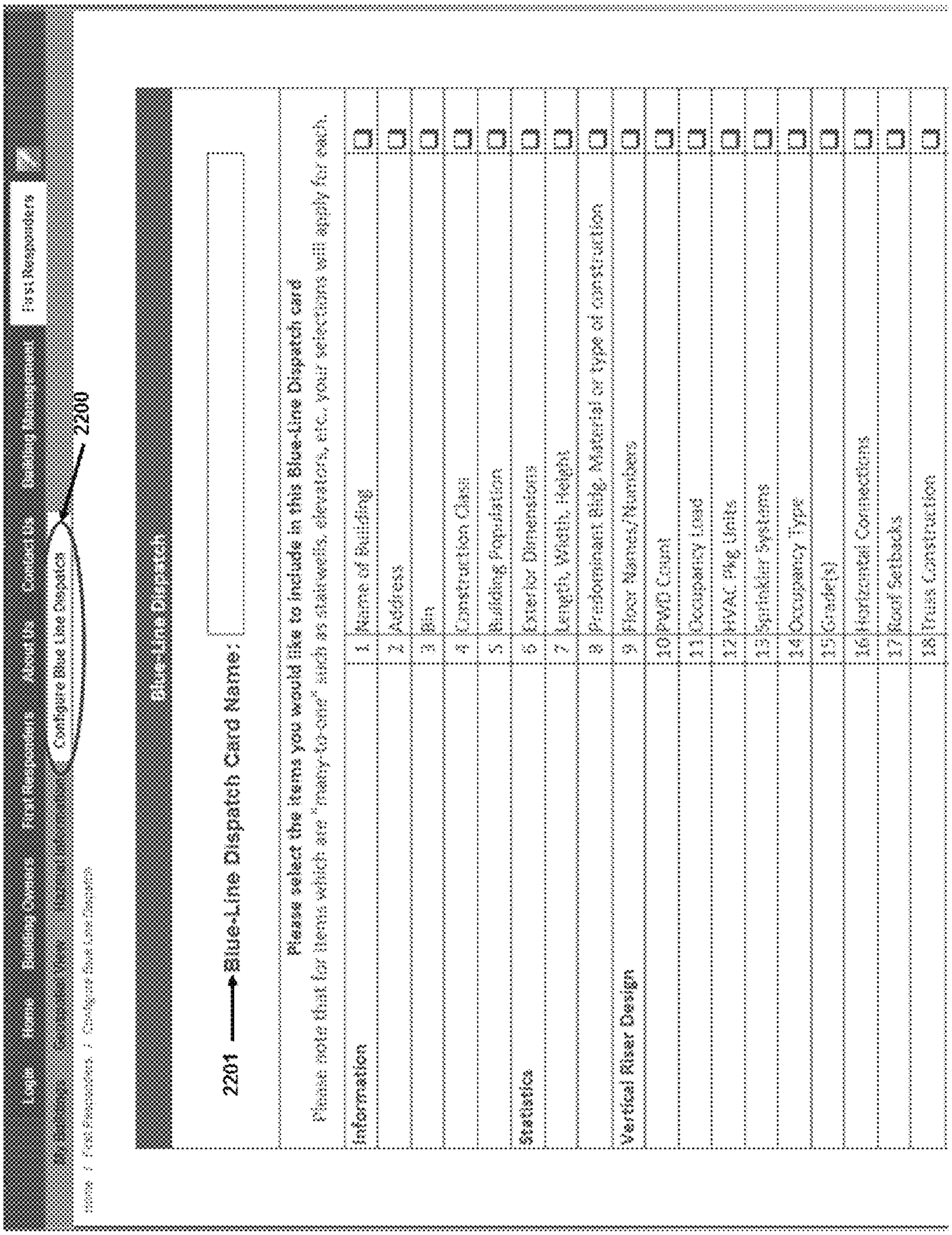
FIG. 22 is a screenshot of the "Configure Blue Line Dispatch" page.
Figure 23:
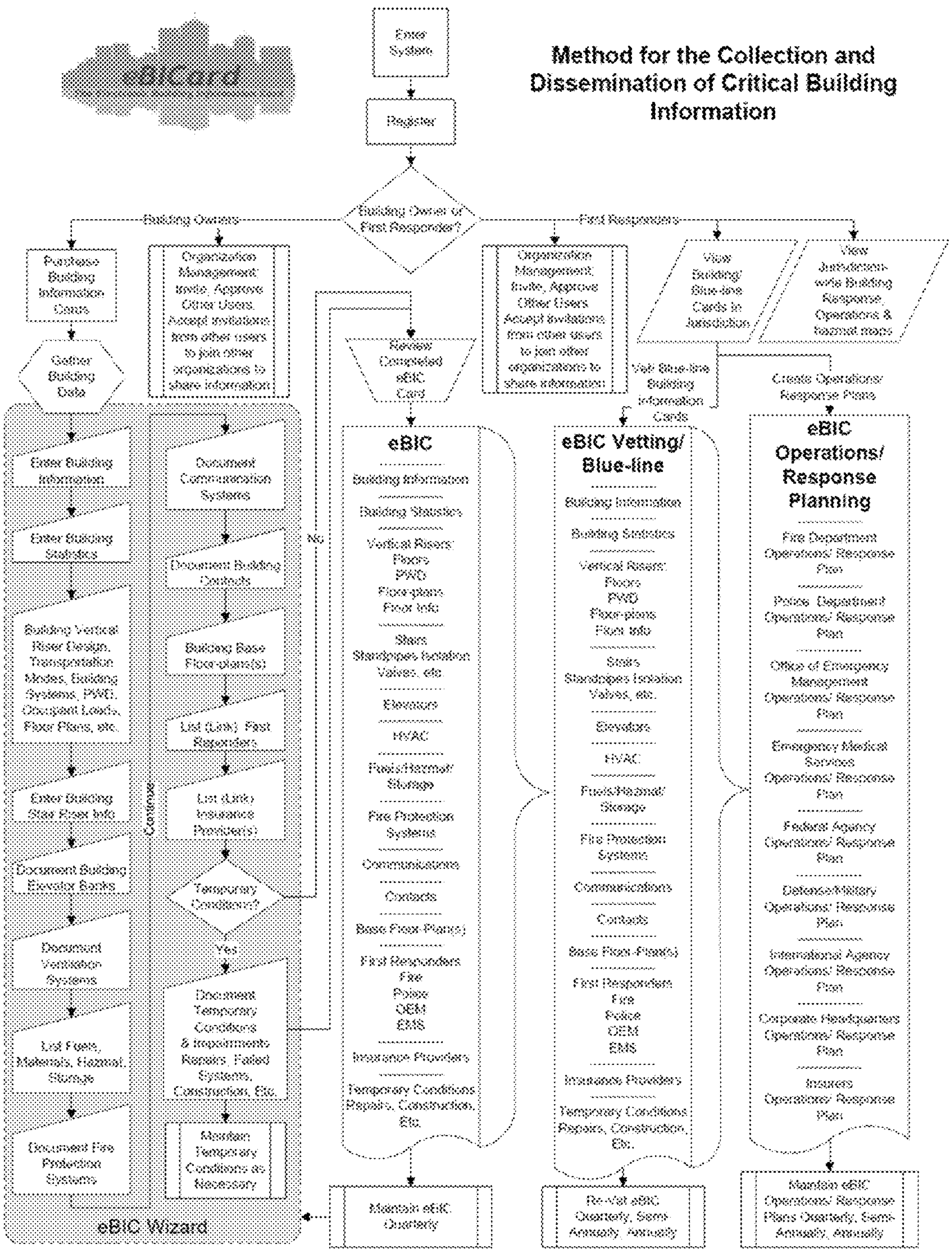
FIG. 23 is a system overview.

FIG. 22 is a screenshot of the "Configure Blue Line Dispatch" page.

2200. Configure Blue Line Dispatch—Click here to go to the Configure Blue Line Dispatch page. This is where First Responders create Blue-Line Dispatch Cards. This shows the Blue-Line Dispatch form where First Responders select only the critical items that they want included on the Blue-Line Dispatch Card (which is a customized electronic Building Information Card (eBIC)); thereby, providing easy viewing of the most critical information that is tailored to that particular responding agency for an initial emergency call. The form is made up of all the sections and items from the building wizard (with the exception of First Responders and Insurers) and includes the items from the Temporary Considerations section. User must create a name for the Blue-Line Dispatch Card and type it into the text box (item 2201). The name of the Blue-Line Dispatch Card is added to the Blue-Line menu options which is displayed when user right-clicks on the eBIC icon in the My Buildings/Buildings Status by Section table.

2201. Blue-Line Dispatch Card Name—User types the name of the Blue-Line Dispatch card here, preferably a name that indicates category and function, e.g., Fire Response or Elevator Inspection. This Blue-Line card can be applied to any building of interest by simply right-clicking on the eBIC icon in the My Buildings/Buildings Status by Section table.

FIG. 22-A is a screenshot of the continuation of the Blue-Line Dispatch form FIG. 22-B is a screenshot of the continuation of the Blue-Line Dispatch form.

FIG. 22-C is a screenshot of how to access Blue-Line options for an eBIC for any particular building of interest and includes a close-up view of the Blue-Line menu.

2202. When user moves mouse over this eBIC link and right-clicks, then the Blue-Line menu is displayed as shown here. The Blue-Line menu is made up of all the Blue-Line Dispatch Cards created from using the interface on the Configure Blue Line Dispatch page. When user selects a Blue-Line card from this menu, the eBIC (with Blue-Line Dispatch items only) is launched for the building in that row to offer user an abbreviated and customized version of an eBIC. (See also item 1904).

The invention claimed is:

1. A computer-implemented method for an electronic building information (eBIC) system, comprising:

providing, by a server to a first client computer system over a network, a first application interface configured to acquire, from a first user, building data regarding a building;

providing, by the server to a second client computer system over the network, a second application interface configured to display, to a second user that is distinct from the first user, the building data that was acquired from the first user;

receiving, at the server, a verification of accuracy of the building data from the second user; and creating a field operations guide for a first responder that is unique to the building based on the verified building data;

wherein receiving, at the server, the verification of accuracy of the building data from the second user comprises:

displaying the building data to the first responder in a first portion of a split-screen interface, wherein a quality assurance checklist is displayed in a second portion of the split screen interface;

receiving, from the first responder, notification of one or more issues with the building data based on the quality assurance checklist; and notifying the first user regarding the one or more issues.

2. The method of claim 1, wherein the building data comprises: stairwell information, elevator information, heating ventilating and air conditioning (HVAC) system information, and fire protection and extinguishing system information.

3. The method of claim 1, wherein the first user is an owner of the building.

4. The method of claim 1, wherein the second user is a first responder comprising one of a police department, emergency and medical services (EMS), an office of emergency management (OEM), and a fire department.

5. The method of claim 1, further comprising receiving a selection, from the first user, of one or more first responders, wherein the selected first responders are granted access to the building information.

6. The method of claim 1, wherein the building data further comprises:

a cross vertical view of the building;

a graphic view format of the building;

a map viewer format of the building in its surrounding geographic area; and a database of building components including a collection and organization of building data with the ability to represent aggregations of building data within the map viewer.

7. The method of claim 1, wherein the building data comprises hazardous materials storage information.

8. The method of claim 7, further comprising receiving, by the server, a location and a material safety data sheet (MSDS) for a hazardous material that is located in the building from the first user.

9. The method of claim 1, further comprising, after creating the field operations guide, receiving temporary condition information of the building that affects the field operations guide, wherein the temporary condition information comprises a start date and an end date.

10. The method of claim 9, wherein the temporary condition information comprises information regarding an outage of a fire protection system of the building.

11. The method of claim 9, wherein the temporary condition information comprises information regarding a construction project of the building.

12. The method of claim 1, further comprising, based on an emergency situation occurring involving the building, displaying an eBIC card comprising the field operations guide to the first responder.

13. The method of claim 12, wherein the displaying of the eBIC card is customized based on a type of the first responder.

14. The method of claim 12, wherein the eBIC card further comprises current weather conditions.

15. A computer system for an electronic building information (eBIC), comprising a server configured to:

provide, to a first client computer system over a network, a first application interface configured to acquire, from a first user, building data regarding a building;

provide, to a second client computer system over the network, a second application interface configured to display, to a second user that is distinct from the first user, the building data that was acquired from the first user;

receive, at the server, a verification of accuracy of the building data from the second user; and create a field operations guide for a first responder that is unique to the building based on the verified building data;

wherein receiving, at the server, the verification of accuracy of the building data from the second user comprises:

displaying the building data to the first responder in a first portion of a split-screen interface, wherein a quality assurance checklist is displayed in a second portion of the split screen interface;

receiving, from the first responder, notification of one or more issues with the building data based on the quality assurance checklist; and notifying the first user regarding the one or more issues.

* * * * *